United States Patent

Li et al.

(10) Patent No.: US 12,711,597 B2
(45) Date of Patent: Aug. 18, 2026

(54) SYSTEM AND METHOD FOR MULTI-MODAL HYPERSPECTRAL IMAGE GENERATION WITH CROSS-MODAL ATTENTION AND ADAPTIVE QUALITY ASSURANCE

(71) Applicant: AtomBeam Technologies Inc., Moraga, CA (US)

(72) Inventors: Zhu Li, Overland Park, KS (US); Paras Maharjan, Kansas City, MO (US); Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/225,997

(22) Filed: Jun. 2, 2025

(65) Prior Publication Data

US 2025/0315932 A1 Oct. 9, 2025

Related U.S. Application Data

(63) Continuation-in-part of application No. 18/981,623, filed on Dec. 15, 2024, now Pat. No. 12,322,070, (Continued)

(51) Int. Cl.

| | |
|---|---|
| ***G06V 10/82*** | (2022.01) |
| ***G06T 3/40*** | (2006.01) |
| ***G06T 7/00*** | (2017.01) |
| ***G06T 7/20*** | (2017.01) |
| ***G06V 10/30*** | (2022.01) |
| ***G06V 10/58*** | (2022.01) |
| ***G06V 10/74*** | (2022.01) |

(52) U.S. Cl.

CPC .............. *G06T 7/0002* (2013.01); *G06T 3/40* (2013.01); *G06T 7/20* (2013.01); *G06V 10/30* (2022.01);

(Continued)

(58) Field of Classification Search

None

See application file for complete search history.

(56) References Cited

U.S. PATENT DOCUMENTS

| | | | |
|---|---|---|---|
| 10,580,170 | B2 | 3/2020 | Robles-Kelly |
| 2021/0364355 | A1 | 11/2021 | Ben-Shahar et al. |

(Continued)

FOREIGN PATENT DOCUMENTS

| | | | |
|---|---|---|---|
| WO | 2023164271 | A1 | 8/2023 |

OTHER PUBLICATIONS

Zhou, H., Lian, Y., Li, J., Cao, X., & Ma, C. (2025). Computational spectral imaging reconstruction via a spatial-spectral cross-attention-driven network. Journal of the Optical Society of America A, 42(2), 139-150. (Year: 2025).*

(Continued)

*Primary Examiner* — Ian L Lemieux

(74) *Attorney, Agent, or Firm* — GALVIN PATENT LAW LLC; Brian R. Galvin

(57) ABSTRACT

A system and method are disclosed for generating hyperspectral images from multi-modal sensor data including RGB, LiDAR, thermal, and near-infrared inputs. Training data includes hyperspectral images and corresponding multi-modal measurements. Spectral band grouping is performed based on correlation coefficients. A multi-modal decomposition network with cross-modal attention mechanisms generate reconstructed hyperspectral images by fusing complementary sensor information. A fine-tuning network creates reconstructed RGB images. A comprehensive quality assurance system analyzes spectral consistency, cross-modal coherence, and fusion artifacts to generate quality metrics. Missing data compensation strategies handle corrupted sensor inputs using information from other modalities. The system includes temporal integration for (Continued)

video sequences and multi-resolution processing for different sensor resolutions. Quality metrics guide network weight adjustments to improve reconstruction accuracy while maintaining robustness to sensor failures and environmental variations.

18 Claims, 27 Drawing Sheets

Related U.S. Application Data which is a continuation-in-part of application No. 18/627,451, filed on Apr. 5, 2024, now Pat. No. 12,190,573.

(52) U.S. Cl.
CPC ............ *G06V 10/58* (2022.01); *G06V 10/761* (2022.01); *G06V 10/82* (2022.01); *G06T 2207/10036* (2013.01); *G06T 2207/20084* (2013.01); *G06T 2207/30168* (2013.01)

(56) References Cited

U.S. PATENT DOCUMENTS

2022/0366536 A1 11/2022 Li et al.
2022/0405972 A1 12/2022 Sartor et al.
2024/0096080 A1 3/2024 Deshpande et al.
2024/0290008 A1 8/2024 Panetta et al.
2026/0011133 A1* 1/2026 Kim .................. G06V 10/7715

OTHER PUBLICATIONS

Qi, B., Zhang, Y., Nie, T., Yu, D., Lv, H., & Li, G. (Mar. 10, 2025). A novel infrared and visible image fusion network based on cross-modality reinforcement and multi-attention fusion strategy. Expert Systems with Applications, 264, 125682. (Year: 2025).*

Brenner, M., Reyes, N. H., Susnjak, T., & Barczak, A. L. (2026). MM5: Multimodal image capture and dataset generation for RGB, depth, thermal, UV, and NIR. Information Fusion, 126, 103516. (Year: 2026).*

Kalamkar, S. (2023). Multimodal image fusion: A systematic review. Decision Analytics Journal, 9, 100327. (Year: 2023).*

Tran, K. B., Carballo, A., & Takeda, K. (2025). T360Fusion: Temporal 360 Multimodal Fusion for 3D Object Detection via Transformers. Sensors, 25(16), 4902. (Year: 2025).*

Arad, Boaz et al; "NTIRE 2020 Challenge on Spectral Reconstruction from an RBG Image", arXiv:2005.03412v1, May 2020.

Lin, Yi-Tun & Finlayson, Graham D .; "Physically Plausible Spectral Reconstruction from RGB Images," arXiv:2001.00558v1, Jan. 2020.

Lorenzo, Pablo Ribalta et al; "Hyperspectral Band Selection Using Attention-Based Convolutional Neural Networks," IEEE Access, vol. 8, pp. 42384-42403, Mar. 2020.

* cited by examiner

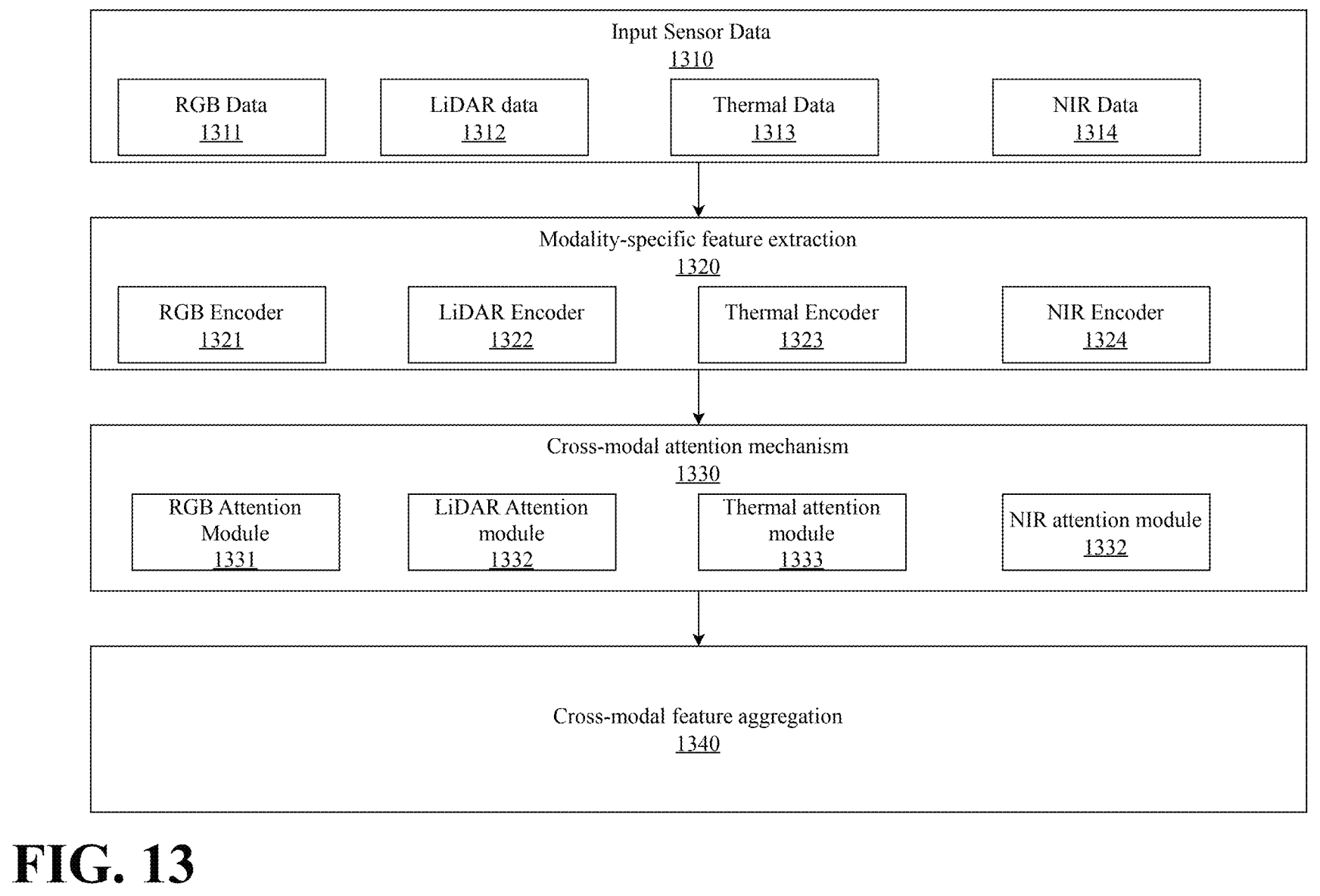

Input Sensor Data 1310

RGB Data 1311

LiDAR data 1312

Thermal Data 1313

NIR Data 1314

Modality-specific feature extraction 1320

RGB Encoder 1321

LiDAR Encoder 1322

Thermal Encoder 1323

NIR Encoder 1324

Cross-modal attention mechanism 1330

RGB Attention Module 1331

LiDAR Attention module 1332

Thermal attention module 1333

NIR attention module 1332

Cross-modal feature aggregation 1340

FIG. 13

SYSTEM AND METHOD FOR MULTI-MODAL HYPERSPECTRAL IMAGE GENERATION WITH CROSS-MODAL ATTENTION AND ADAPTIVE QUALITY ASSURANCE

CROSS-REFERENCE TO RELATED APPLICATIONS

Priority is claimed in the application data sheet to the following patents or patent applications, each of which is expressly incorporated herein by reference in its entirety:

Ser. No. 18/981,623

Ser. No. 18/627,451

BACKGROUND OF THE INVENTION

Field of the Art

The present invention is in the field of multi-modal hyperspectral image processing, and more particularly is directed to systems and methods for generating hyperspectral images from diverse sensor modalities using cross-modal attention mechanisms, adaptive fusion techniques, and comprehensive quality assurance with missing data compensation.

Discussion of the State of the Art

Hyperspectral imaging is an imaging technique used in various fields such as remote sensing, agriculture, environmental monitoring, forensics, food manufacturing, and medical imaging. Unlike traditional imaging techniques which capture data in three color bands (red, green, and blue), hyperspectral imaging collects and processes information across hundreds or even thousands of narrow contiguous spectral bands. Each pixel in a hyperspectral image contains a spectrum of information across the electromagnetic spectrum, providing detailed spectral signatures for different materials or substances. The spectral information allows for more precise identification and analysis of objects or substances based on their spectral characteristics. Hyperspectral images provide a wealth of information about the composition and properties of the objects or scenes being imaged, making them valuable tools for applications ranging from geological surveys to food quality assessment and disease diagnosis.

However, traditional hyperspectral imaging systems face significant limitations including high equipment costs, complex acquisition procedures, and sensitivity to environmental conditions. Direct acquisition of hyperspectral images typically requires specialized and expensive sensors, making hyperspectral imaging inaccessible for many applications. Additionally, single-sensor approaches are often insufficient to capture the full complexity of real-world scenes, particularly when dealing with challenging conditions such as varying illumination, partial occlusions, or dynamic environments. These limitations have created a need for alternative approaches that can generate high-quality hyperspectral images using more readily available sensor technologies.

Multi-modal sensing approaches, which combine information from different types of sensors such as RGB cameras, LiDAR scanners, thermal imagers, and near-infrared sensors, offer a promising solution to these challenges. Each sensor modality provides complementary information about the scene: RGB sensors capture detailed color and texture information; LiDAR provides precise structural and depth data; thermal sensors detect temperature distributions and material properties; and NIR sensors offer material-specific spectral characteristics. However, effectively combining information from these diverse sensor types presents significant technical challenges, including handling different spatial and temporal resolutions, managing varying data quality across modalities, compensating for missing or corrupted sensor data, ensuring temporal consistency in video sequences, and maintaining spectral accuracy across dynamic environmental conditions.

Furthermore, conventional approaches to multi-sensor fusion often employ simple concatenation or weighted averaging techniques that fail to capture the complex interdependencies between different sensing modalities. These approaches do not adequately account for the varying reliability of different sensors under different conditions, nor do they effectively leverage the complementary nature of multi-modal information to enhance reconstruction quality. Existing methods lack sophisticated cross-modal attention mechanisms that can intelligently determine which sensor modalities should influence specific spectral bands under varying conditions. Additionally, current approaches do not provide comprehensive quality assurance frameworks that can validate reconstruction accuracy across multiple dimensions simultaneously, including spectral consistency, cross-modal coherence, and physical plausibility constraints.

Current multi-modal fusion systems also lack robust mechanisms for handling sensor failures, missing data, or corrupted sensor inputs, which are common in real-world deployment scenarios. When individual sensors malfunction or provide unreliable data, existing systems either fail entirely or produce significantly degraded results. There is a critical need for adaptive compensation strategies that can maintain reconstruction quality even when some sensor modalities are unavailable or compromised. Furthermore, existing approaches do not adequately address the temporal dimension in video sequences, where maintaining spectral and spatial consistency across frames while adapting to scene changes presents additional complexity.

Another significant limitation of current approaches is their inability to process sensors with different spatial resolutions effectively. Multi-modal sensor systems often combine high-resolution RGB cameras with lower-resolution thermal or NIR sensors, creating challenges in spatial alignment and information fusion. Existing methods struggle to preserve fine spatial details from high-resolution sensors while effectively incorporating lower-resolution complementary information. Additionally, current quality assurance methods are typically limited to single-modality assessment and do not provide comprehensive evaluation of cross-modal consistency and fusion effectiveness.

Overall, hyperspectral imaging can provide detailed information about the composition and properties of the imaged objects or areas, making hyperspectral imaging an important tool for a wide variety of industries and applications, but existing approaches are limited by cost, complexity, inadequate cross-modal fusion capabilities, insufficient quality assurance frameworks, lack of robust missing data compensation, and the challenges of effectively integrating multi-modal sensor information while maintaining temporal consistency and handling varying spatial resolutions across different sensor types.

SUMMARY OF THE INVENTION

Accordingly, there is disclosed herein, systems and methods for generating hyperspectral images from multi-modal sensor data including RGB (red-green-blue), LiDAR, thermal, and near-infrared (NIR) inputs with comprehensive multi-modal quality assurance. A set of data includes training hyperspectral images and their corresponding multi-modal sensor measurements. A spectral band grouping is performed on the training hyperspectral images based on a correlation coefficient of spectral bands. A multi-modal decomposition network with cross-modal attention mechanisms is used to generate a reconstructed hyperspectral image by intelligently fusing information from all available sensor modalities. A fine-tuning network with temporal consistency capabilities is used to create reconstructed RGB images. A comprehensive quality assurance subsystem evaluates spectral consistency, cross-modal coherence, and physical plausibility while providing missing data compensation strategies. The difference between input and reconstructed images across multiple modalities is used to adjust one or more weights of one or more of the networks, thereby improving the accuracy and efficacy of reconstructed hyperspectral images while maintaining robustness to sensor failures and environmental variations.

In traditional hyperspectral image acquisition, dedicated hardware, such as a hyperspectral camera, may be used. A hyperspectral camera can include special-purpose hardware, making it potentially expensive and/or difficult to use or maintain. Additionally, single-sensor approaches are inadequate for complex real-world scenarios involving varying illumination, partial occlusions, dynamic environments, and temporal sequences. That is, due to the limitations of imaging technologies, acquiring hyperspectral images can be more difficult than acquiring RGB images. For example, conventional spectrometers often operate in a spectral or spatial scanning manner, which can be time consuming. Furthermore, the hyperspectral cameras and/or other spectroscopy equipment can be quite expensive and complex, making it unsuitable for use in various scenarios. Multi-modal sensor systems, while offering complementary information, present significant challenges in cross-modal fusion, temporal consistency, missing data handling, and multi-resolution processing.

Disclosed embodiments address the aforementioned problems and shortcomings by performing multi-modal spectral super-resolution techniques utilizing cross-modal attention mechanisms and adaptive fusion neural networks. Once the neural networks are trained, reconstructed hyperspectral images can be obtained from readily available multi-modal sensor inputs including RGB cameras, LiDAR scanners, thermal imagers, and NIR sensors, thereby simplifying the task of obtaining hyperspectral images while providing superior reconstruction quality through intelligent sensor fusion. Disclosed embodiments alleviate the need for excessive special-purpose hardware, provide robust operation in challenging conditions with missing or corrupted sensor data, and can greatly reduce the overall cost of acquiring hyperspectral images while maintaining high accuracy through comprehensive quality assurance and adaptive processing capabilities.

According to a preferred embodiment, a system for multi-modal hyperspectral image generation with comprehensive quality assurance, comprising: a computing device comprising at least a memory and a processor; a spectral band grouping module comprising a first plurality of programming instructions that, when operating on the processor, cause the computing device to: obtain a training hyperspectral image; identify a plurality of spectral bands in the training hyperspectral image; compute a correlation coefficient of each spectral band of the plurality of spectral bands to at least one other spectral band of the plurality of spectral bands; and form a plurality of spectral domain groups based on the computed correlation coefficients; a multi-modal data acquisition module comprising programming instructions to obtain and preprocess data from RGB cameras, LiDAR scanners, thermal imagers, and NIR sensors with temporal synchronization and spatial registration; a decomposition module comprising a second plurality of programming instructions that, when operating on the processor, cause the computing device to: obtain the plurality of spectral domain groups from the spectral band grouping module; obtain multi-modal sensor data comprising RGB, LiDAR, thermal, and NIR inputs; perform cross-modal attention calculations between the multi-modal sensor data to determine feature relationships; provide the multi-modal sensor data and plurality of spectral domain groups to a first neural network, wherein the first neural network includes at least one convolutional block, at least one residual block, and cross-modal attention mechanisms; and obtain as an output of the first neural network, a reconstructed hyperspectral image, based on the multi-modal sensor data; a missing data compensation module comprising programming instructions to detect missing or corrupted data regions in the multi-modal sensor data and apply compensation strategies using information from other modalities; and a quality assurance subsystem comprising a third plurality of programming instructions that, when operating on the processor, cause the computing device to: obtain the multi-modal sensor data, the reconstructed hyperspectral image, and a reconstructed RGB image; analyze a spectral consistency of the reconstructed hyperspectral image; perform cross-modal consistency evaluation between different sensor modalities; evaluate a RGB reconstruction accuracy between original and reconstructed RGB images; detect fusion artifacts specific to multi-modal processing; analyze a plurality of noise characteristics in the reconstructed hyperspectral image and the reconstructed RGB image; calculate reference-based and reference-free quality metrics; generate a plurality of quality scores based on the spectral consistency, cross-modal consistency, RGB reconstruction accuracy, and noise characteristics; compare the plurality of quality scores against a predetermined quality threshold; and update the first neural network based on the quality score comparisons, is disclosed.

According to another preferred embodiment, a method for multi-modal hyperspectral image generation with comprehensive quality assurance, comprising steps of: obtaining a training hyperspectral image; identifying a plurality of spectral bands in the training hyperspectral image; computing a correlation coefficient of each spectral band of the plurality of spectral bands to at least one other spectral band of the plurality of spectral bands; forming a plurality of spectral domain groups based on the computed correlation coefficients; obtaining multi-modal sensor data comprising RGB, LiDAR, thermal, and NIR inputs; performing cross-modal attention calculations between the multi-modal sensor data to determine feature relationships; providing the multi-modal sensor data and plurality of spectral domain groups to a first neural network, wherein the first neural network includes at least one convolutional block, at least one residual block, and cross-modal attention mechanisms; obtaining as an output of the first neural network, a reconstructed hyperspectral image, based on the multi-modal sensor data; detecting missing or corrupted data regions in the multi-modal sensor data and applying compensation strategies using information from other modalities; forwarding the multi-modal sensor data, the reconstructed hyperspectral image, and a reconstructed RGB image to a quality assurance subsystem; analyzing a spectral consistency of the reconstructed hyperspectral image; performing cross-modal consistency evaluation between different sensor modalities; evaluating a RGB reconstruction accuracy between original and reconstructed RGB images; detecting fusion artifacts specific to multi-modal processing; analyzing a plurality of noise characteristics in the reconstructed hyperspectral image and the reconstructed RGB image; calculating reference-based and reference-free quality metrics; generating a plurality of quality scores based on the spectral consistency, cross-modal consistency, RGB reconstruction accuracy, and noise characteristics; comparing the plurality of quality scores against a predetermined quality threshold; and updating the first neural network based on the quality score comparisons, is disclosed.

According to an aspect of an embodiment, the at least one residual block comprises at least two convolutional layers.

According to an aspect of an embodiment, for each convolutional layer, a corresponding kernel size for the convolutional layer is set to 3×3.

According to an aspect of an embodiment, the first neural network further comprises an activation function.

According to an aspect of an embodiment, the activation function comprises a ReLU layer.

According to an aspect of an embodiment, the second neural network comprises a self-supervised network.

According to an aspect of an embodiment, there is provided a first convolutional layer from the at least two convolutional layers that is configured to perform feature extraction.

According to an aspect of an embodiment, there is provided a second convolutional layer from the at least two convolutional layers that is configured to perform feature map dimension reduction.

According to an aspect of an embodiment, the cross-modal attention mechanisms calculate attention weights between modalities using scaled dot-product attention, enhance features from one modality using complementary information from other modalities, apply confidence weighting based on sensor reliability for each modality, and generate unified feature representations that incorporate cross-modal information.

According to an aspect of an embodiment, the system further comprises temporal fusion capabilities that select key frames for temporal reference in video sequences, track temporal features across frame sequences, maintain spectral consistency across frames, apply motion compensation techniques, and perform temporal smoothing with physical constraints.

According to an aspect of an embodiment, the compensation strategies comprise cross-modal reconstruction for complete data loss using information from available modalities, selective correction for partial corruption while preserving valid data, noise filtering for degraded data quality, and calibration adjustment for systematic sensor errors.

According to an aspect of an embodiment, the system further comprises multi-resolution processing capabilities that handle data from sensors with different spatial resolutions, perform upsampling and downsampling operations between resolution levels, align features across different resolution levels, and implement bidirectional information flow with coarse-to-fine and fine-to-coarse paths.

BRIEF DESCRIPTION OF THE DRAWING FIGURES

FIG. 13 is a diagram of a cross-modal attention mechanism showing interactions between RGB, LiDAR, thermal, and NIR sensor modalities, according to an embodiment.

Figure 1:
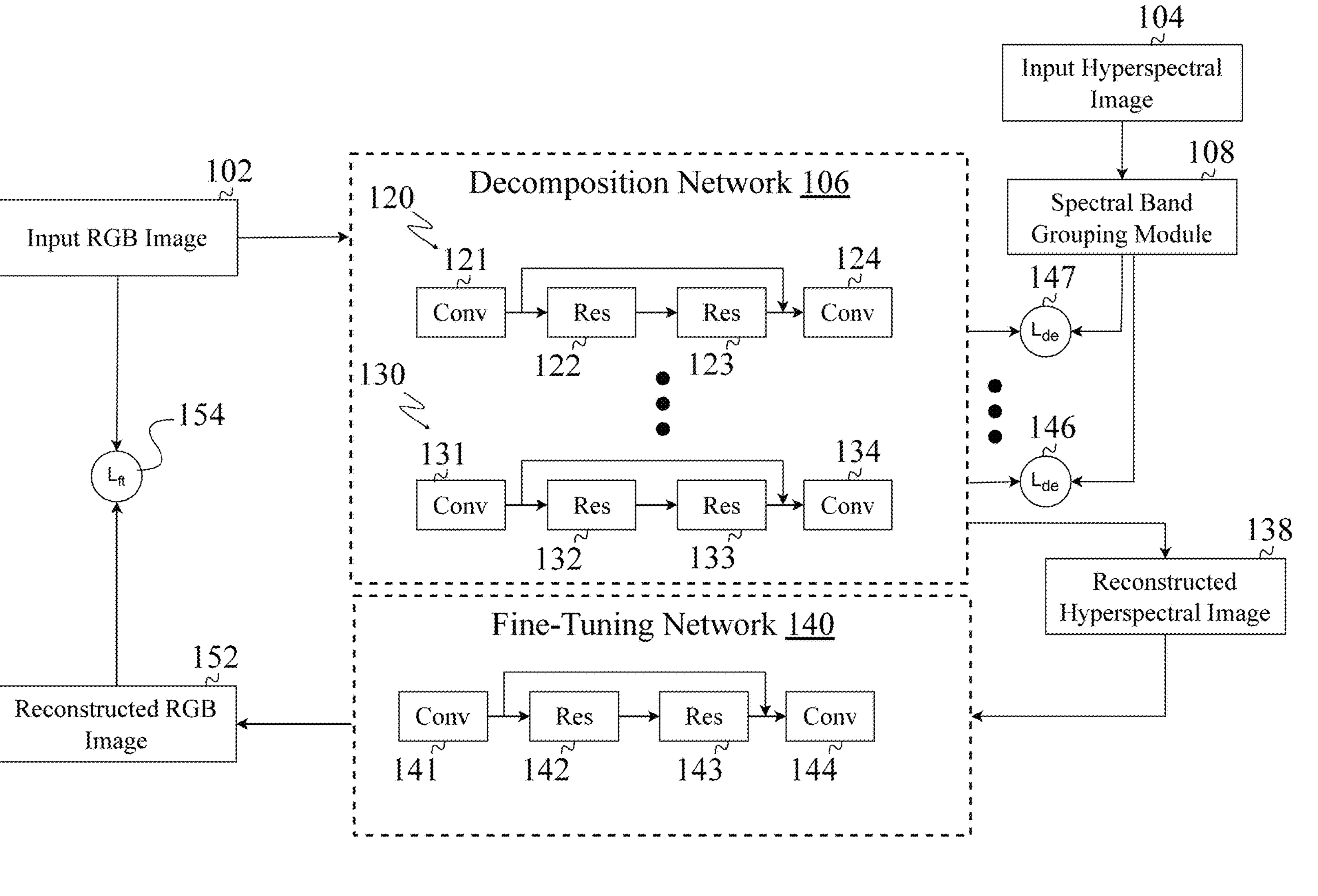
FIG. 1 is a block diagram illustrating components for hyperspectral image generation utilizing a decomposition network and a fine-tuning network, according to an embodiment.

The drawings are not necessarily to scale. The drawings are merely schematic representations, not intended to portray specific parameters of the disclosed embodiments. The drawings are intended to depict only typical embodiments of the invention, and therefore should not be considered as limiting in scope.

DETAILED DESCRIPTION OF THE INVENTION

Commercially available digital cameras are capable of capturing RGB (red-green-blue) images by mapping the spectrum of acquired image data to the red, green, and blue spectral bands, leaving much of the available spectrum ignored. In contrast, hyperspectral images often contain in excess of ten spectral bands. This rich spectral information is beneficial for numerous computer vision functions, such as facial recognition and object tracking. However, direct acquisition of hyperspectral images from spectrometers and/or hyperspectral cameras can be costly and time consuming.

Disclosed embodiments address the aforementioned issues with a novel approach that includes reconstructing hyperspectral images from corresponding RGB images by taking advantage of spectral super-resolution algorithms. Disclosed embodiments utilize multiple neural networks to improve the modeling of the complex mapping relationship between RGB images and their corresponding hyperspectral images. This enables the use of conventional RGB image acquisition devices that are plentiful, fast, and economical, for the data acquisition component of disclosed embodiments. Then, the processing of the conventional RGB image data performed by disclosed embodiments generates an accurate reconstructed hyperspectral image, enabling the efficient use of hyperspectral images in a wide variety of applications.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "pixel" refers to the smallest controllable element of a digital image. It is a single point in a raster image, which is a grid of individual pixels that together form an image. Each pixel has its own color and brightness value, and when combined with other pixels, they create the visual representation of an image on a display device such as a computer monitor or a smartphone screen.

The term "neural network" refers to a computer system modeled after the network of neurons found in a human brain. The neural network is composed of interconnected nodes, called artificial neurons or units, that work together to process complex information.

The term "hyperspectral image" refers to an image in which each pixel of the image includes multiple (generally more than three) spectral bands from across the electromagnetic (EM) spectrum.

Conceptual Architecture

Figure 7:
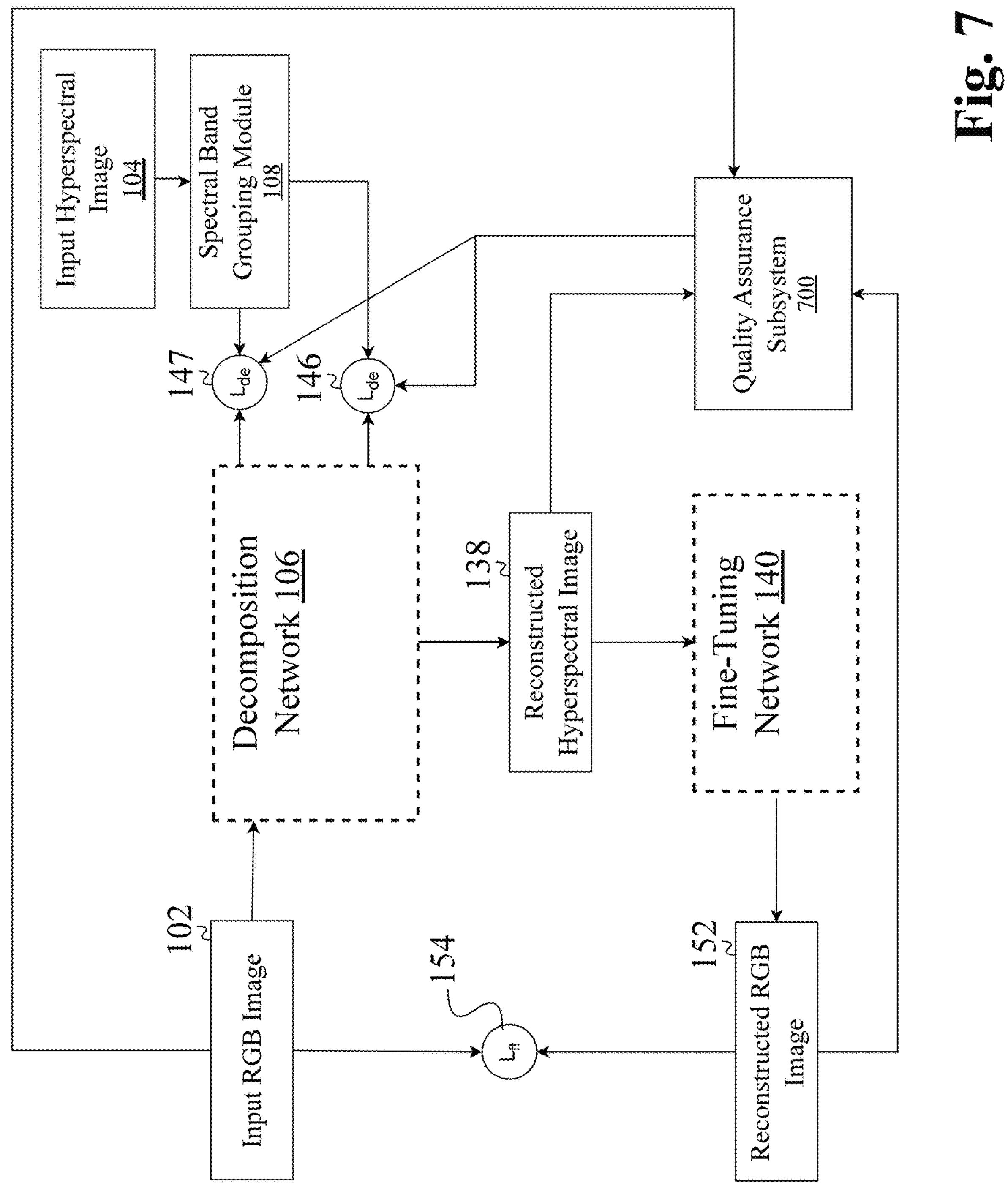
FIG. 7 is a block diagram a system for hyperspectral image generation utilizing a decomposition network and a fine-tuning network with quality assurance, according to an embodiment.

FIG. 7 is a block diagram a system for hyperspectral image generation utilizing a decomposition network and a fine-tuning network with quality assurance, according to an embodiment. The input RGB image 102 is an RGB version of hyperspectral image 104. In one or more embodiments, the input RGB image 102 may be in a bayer format. Images in the bayer format may comprise multiple sets of four pixels. Each set includes a red pixel, a blue pixel, and two green pixels. This arrangement is based on the fact that the human eye is more sensitive to green light than to red or blue.

Input hyperspectral image 104 may include multiple spectral bands. In embodiments, the input hyperspectral image can include between 10 to 32 spectral bands. Other embodiments may include more or fewer spectral bands. In one or more embodiments, the input hyperspectral image comprises 31 spectral bands ranging from 400 nm to 700 nm with a 10 nm interval.

Input hyperspectral image 104 is input to spectral band grouping module 108. Spectral band grouping module 108 can include instructions and/or functions that including but not limited to computing a correlation coefficient of each spectral band of the plurality of spectral bands to at least one other spectral band of the plurality of spectral bands or forming a plurality of spectral domain groups based on the computed correlation coefficients.

Decomposition network 106 generates a reconstructed hyperspectral image 138 based on the input RGB image 102 and spectral band grouping information. The reconstructed hyperspectral image 138 is then input to the fine-tuning network 140, which generates a reconstructed RGB image 152. The reconstructed RGB image 152 is compared with the input RGB image 102, with differences embodied in a corresponding loss function for the fine-tuning network 140, represented as $L_{ft}$, indicated at 154.

A quality assurance subsystem 700 receives three inputs: the input RGB image 102, the reconstructed hyperspectral image 138, and the reconstructed RGB image 152. The subsystem analyzes spectral consistency by computing correlation coefficients between adjacent spectral bands in the reconstructed hyperspectral image 138. It also evaluates noise levels and performs artifact detection across the reconstructed images. The subsystem compares the reconstructed RGB image 152 with the input RGB image 102 using pixel-wise comparison and structural similarity metrics.

The quality assurance subsystem 700 generates quality metrics that are used to adjust the weights of both the decomposition network 106 and fine-tuning network 140. These adjustments are represented by the loss functions $L_{de}$ indicated at 146 and 147. The quality metrics provide additional guidance beyond the basic RGB comparison, ensuring both spectral accuracy and image quality in the reconstruction process. This comprehensive quality assessment helps maintain the integrity of the hyperspectral image generation while minimizing artifacts and noise in the output.

In one or more embodiments, the quality assurance subsystem 700 implements predetermined quality thresholds for spectral consistency, noise levels, and RGB accuracy. When these thresholds are not met, the subsystem provides specific feedback signals to guide the adjustment of network weights, enabling targeted improvements in the reconstruction process. This feedback loop ensures continuous refinement of the network's performance and maintains high-quality output in the generated hyperspectral images.

Figure 8:
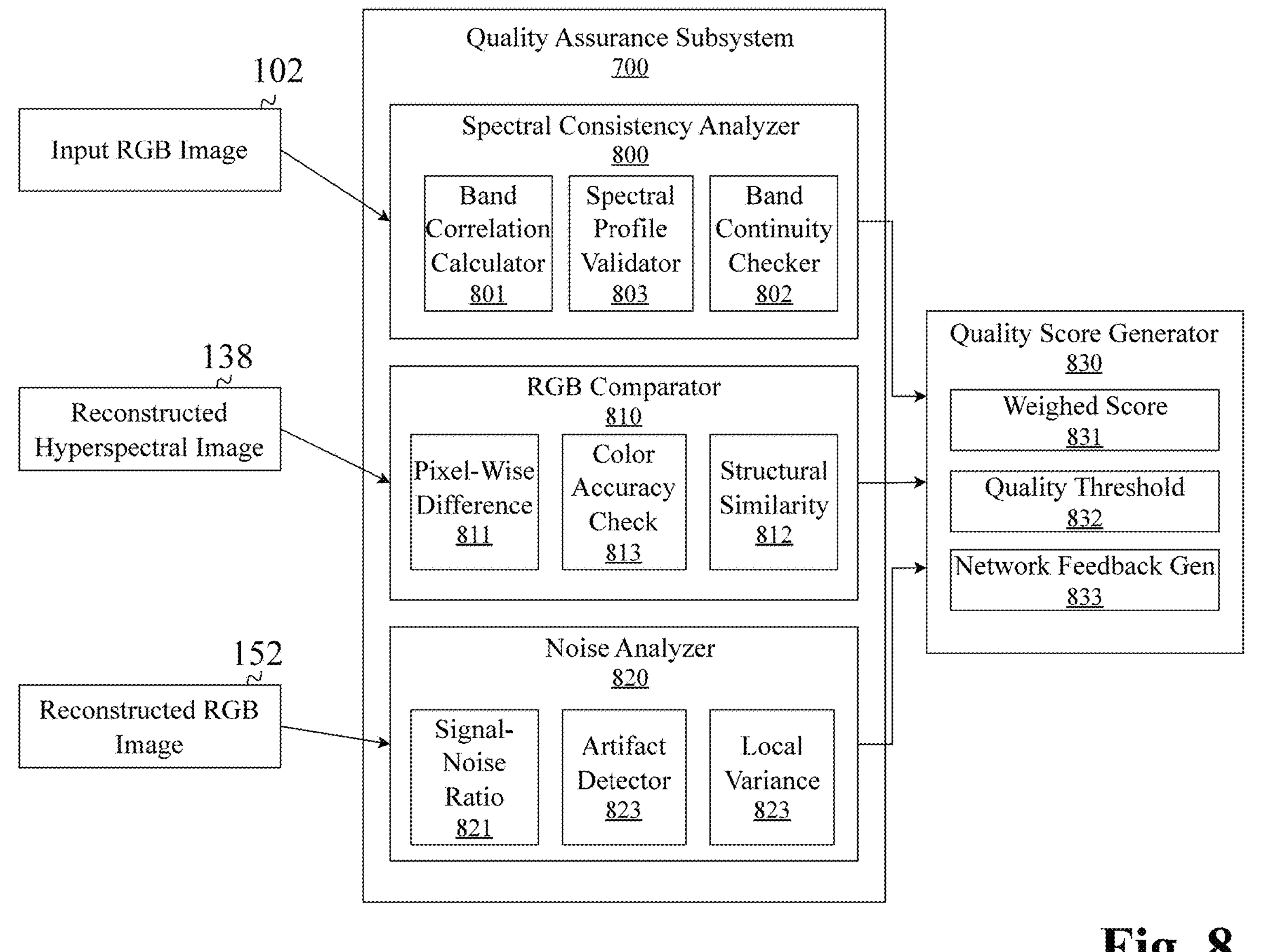
FIG. 8 is a block diagram illustrating a component for hyperspectral image generation utilizing a decomposition network and a fine-tuning network with quality assurance, a quality assurance subsystem, according to an embodiment.

FIG. 8 is a block diagram illustrating a component for hyperspectral image generation utilizing a decomposition network and a fine-tuning network with quality assurance, a quality assurance subsystem, according to an embodiment. The subsystem comprises a plurality of components, including but not limited to a spectral consistency analyzer 800, an RGB comparator 810, a noise analyzer 820, and a quality score generator 830, each performing specialized analysis functions to ensure the quality of the hyperspectral image generation process.

A spectral consistency analyzer 800 evaluates the spectral characteristics of the reconstructed hyperspectral image. A band correlation calculator 801 computes correlation coefficients between adjacent spectral bands, quantifying the relationship between neighboring wavelengths. This correlation analysis helps identify discontinuities or anomalies in the spectral reconstruction. In one embodiment, the correlation computation is performed by flattening each spectral band into a one-dimensional array and calculating the Pearson correlation coefficient between adjacent bands. When the correlation falls below a predetermined threshold, the system flags these locations as potential anomalies requiring further analysis or correction. A band continuity checker 802 examines the smoothness of transitions between spectral bands, ensuring that the reconstructed spectrum maintains natural gradations without artificial discontinuities. In one embodiment this examination is accomplished by calculating first and second derivatives between spectral bands, where the first derivative measures the rate of change between bands, and the second derivative identifies sudden changes in this rate. The system computes smoothness scores using these derivatives and flags locations where the smoothness exceeds a defined threshold, indicating potentially problematic transitions.

A spectral profile validator 803 analyzes the overall shape and characteristics of the spectral signatures, comparing them against expected patterns for various materials and surfaces. This validation, in one embodiment, may be performed using Dynamic Time Warping (DTW), a technique that allows flexible matching of spectral shapes against a database of known spectral signatures for various materials. The DTW algorithm can identify anomalous profiles that don't match expected patterns while accounting for variations in spectral intensity, providing similarity scores that quantify how well each reconstructed profile matches known patterns. The combined analysis from these components enables both qualitative assessment and quantitative measurement of the spectral reconstruction quality, providing specific metrics that can be used to adjust the neural network weights during training and validation.

An RGB comparator 810 performs a comprehensive analysis of the RGB reconstruction accuracy through a plurality of possible approaches. In one embodiment, a pixel-wise difference calculator 811 computes direct numerical differences between corresponding pixels in the reconstructed and input RGB images, providing a baseline measure of reconstruction accuracy. This calculation may be performed by computing Mean Squared Error (MSE) and Peak Signal-to-Noise Ratio (PSNR) between the images. The MSE is calculated by squaring the difference between each corresponding pixel value and averaging over all pixels, while PSNR is derived using the logarithmic relationship between the maximum possible pixel value and the MSE, typically expressed in decibels. In another embodiment, a structural similarity analyzer 812 evaluates the preservation of image features and patterns, ensuring that the spatial structure of the original image is maintained in the reconstruction. This evaluation may employ the Structural Similarity Index Measure (SSIM) algorithm, which analyzes local windows of the images using a combination of luminance comparison (using local mean intensity), contrast comparison (using local standard deviation), and structure comparison (using local normalized pixels). The SSIM computation includes Gaussian weighting for each window and operates at multiple scales to capture both fine and coarse image structures.

In another embodiment, a color accuracy checker 813 specifically focuses on the fidelity of color reproduction, examining how well the reconstructed image preserves the original color relationships and intensities. This examination is conducted in multiple color spaces, including RGB, to comprehensively assess color accuracy. The color checker may also analyze color histogram distributions and color moment statistics (mean, standard deviation, and skewness) for each color channel to ensure consistent color reproduction across the entire image. RGB comparator 810 may utilize any plurality of these approaches to achieve its comprehensive analysis. When more than one approach is used, the approaches findings are compounded to provide a comprehensive quantitative assessment of reconstruction quality, generating scores that can be weighted and combined to guide the fine-tuning process of the neural networks.

A noise analyzer 820 assesses the quality of the reconstructed images through multiple metrics. A signal-to-noise ratio (SNR) calculator 821 quantifies the relationship between the desired image content and unwanted variations or noise. This quantification may be performed using a multi-scale approach where the image is decomposed into frequency bands using wavelet transformation, allowing separate noise analysis at different spatial scales. The SNR is calculated for each spectral band using the ratio between the mean signal power and the noise power estimate, derived from the wavelet coefficients at each decomposition level.

Additionally, a blind/referenceless image spatial quality evaluator may be employed to provide a no-reference quality score based on statistical features of the locally normalized luminance coefficients. An artifact detector 822 identifies and characterizes any reconstruction artifacts or anomalies that may appear in the output images. This detection process in one embodiment uses a convolutional neural network trained on common reconstruction artifacts (blocking, ringing, blurring) to generate artifact probability maps. The detector also utilizes gradient analysis to identify sharp transitions or discontinuities that may indicate reconstruction errors, and performs frequency domain analysis using Fourier transforms to detect periodic artifacts or unusual frequency patterns.

A local variance analyzer 823 examines spatial variations across different regions of the images to identify areas of potential quality degradation or inconsistent reconstruction. This examination is conducted by calculating local statistical measures within sliding windows across the image, including variance, entropy, and higher-order moments. The analyzer employs adaptive thresholding based on local content characteristics to identify regions with abnormal variation patterns, and uses a multi-resolution approach to capture both fine-scale noise and larger-scale structural variations. The system may also compute spatial frequency response (SFR) measurements to evaluate the preservation of fine details and edges across different image regions, providing a comprehensive assessment of spatial quality consistency.

A quality score generator 830 integrates the outputs from all analysis components to produce final quality metrics and feedback signals. A weighted score calculator 831 combines the various quality metrics using predetermined weights to generate a comprehensive quality score. This combination process implements an adaptive weighting scheme where each metric's weight is dynamically adjusted based on its statistical reliability and historical performance. The weights are updated using a moving average of metric consistency scores. In one embodiment, quality score generator 830 may employ Bayesian optimization to periodically refine these weights based on correlations between metric values and final reconstruction quality. A quality threshold validator 832 compares these scores against established thresholds to determine if the reconstruction meets quality standards. The validation process utilizes a multi-threshold approach where different aspects of quality (spectral, spatial, and color accuracy) have individual threshold requirements, derived from statistical analysis of high-quality reconstructions. The validator implements a hierarchical decision tree where primary quality indicators must meet strict thresholds while secondary metrics have more flexible bounds that adapt to image content complexity.

A network feedback generator 833 creates specific feedback signals for adjusting the weights of both the decomposition network and fine-tuning network based on the quality analysis results. These feedback signals may be generated through a gradient-based approach where quality metrics are transformed into loss terms that can directly influence network optimization. The generator may compute partial derivatives for each network weight with respect to the quality score, enabling targeted weight adjustments. It also implements an importance sampling mechanism to prioritize adjustments that have historically led to the most significant quality improvements, using a reinforcement learning approach to optimize the feedback strategy over time. The feedback signals are normalized and scaled based on the current training phase and network sensitivity to prevent oscillation or overshooting in the weight adjustment process.

In operation, the quality assurance subsystem processes all three input images simultaneously through its various analyzers. Spectral consistency analyzer 800 focuses primarily on the reconstructed hyperspectral image 138, ensuring the spectral reconstruction maintains physical validity and consistency. RGB comparator 810 works with both the input RGB image 102 and reconstructed RGB image 152 to validate the accuracy of the RGB reconstruction process. Noise analyzer 820 examines both the hyperspectral and RGB reconstructions to identify and quantify any quality issues.

The feedback signals generated by the network feedback generator 833 are used to adjust the weights of the neural networks in the main system. These adjustments are made through the loss functions to optimize both the spectral reconstruction accuracy and the RGB reproduction quality. The quality threshold validator 832 ensures that the reconstruction meets predetermined quality standards before the results are accepted, providing a quality control mechanism for the entire hyperspectral image generation process.

FIG. 1 is a block diagram illustrating components for hyperspectral image generation utilizing a decomposition network and a fine-tuning network, according to an embodiment. An input hyperspectral image 104 and corresponding input RGB image 102 are used as training data for decomposition network 106. The input RGB image 102 is an RGB version of the hyperspectral image 104. In one or more embodiments, the input RGB image 102 may be in a Bayer format. A Bayer raw image is a type of image format that may be used in digital cameras and other imaging devices. Images in the Bayer format may comprise multiple sets of four pixels. Each set includes a red pixel, a blue pixel, and two green pixels. This arrangement is based on the fact that the human eye is more sensitive to green light than to red or blue. One or more embodiments may utilize other formats for the input RGB image. In one or more embodiments, the input RGB image 102 may include bitmaps, tagged image file format (TIFF), and/or other raw formats.

The input hyperspectral image 104 can include multiple spectral bands. In embodiments, the input hyperspectral image can include between 10 to 32 spectral bands. Other embodiments may include more or fewer spectral bands. In one or more embodiments, the input hyperspectral image comprises 31 spectral bands ranging from 400 nm to 700 nm with a 10 nm interval.

The input hyperspectral image 104 is input to spectral band grouping module 108.

Spectral band grouping module 108 can include instructions and/or functions, that when executed by a processer, perform functions including computing a correlation coefficient of each spectral band of the plurality of spectral bands to at least one other spectral band of the plurality of spectral bands; and forming a plurality of spectral domain groups based on the computed correlation coefficients.

Figure 2:
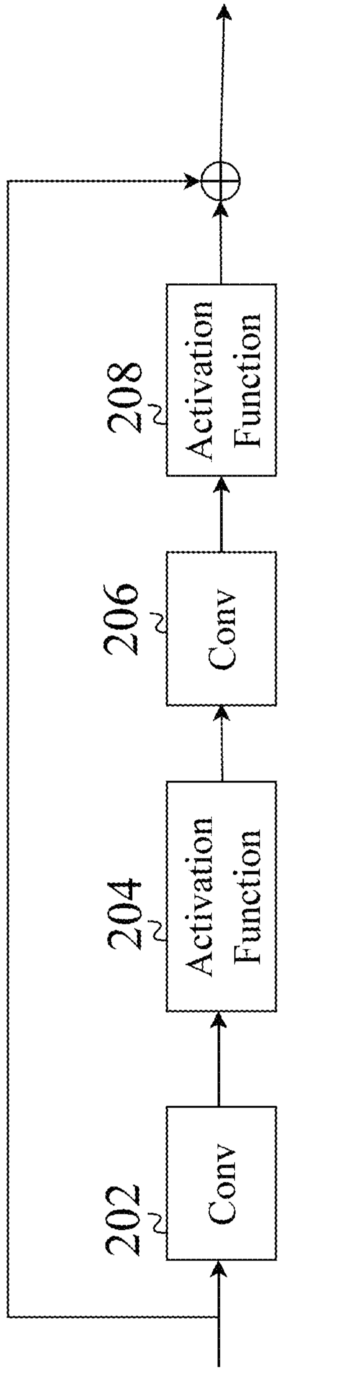
FIG. 2 is a block diagram showing additional details of a residual block shown in FIG. 1, according to an embodiment.

One or more embodiments can enable reconstructing a hyperspectral image denoted as:

$$Y \in R^{w \times h \times L}$$

from its corresponding RGB image which is denoted as:

$$X \in R^{w \times h \times 3}$$

Where L represents the number of spectral bands in the hyperspectral image, where L is greater than three, and w and h denote the width and height of the two images, respectively. In one or more embodiments, for any two bands in the hyperspectral image, the bands are vectorized to create two vectors. Then, a correlation coefficient for the two vectors is computed. The correlation coefficient is a measure that quantifies the degree to which two sets of data are related or how they vary together. For each spectral band, there is a corresponding neural network in the decomposition network 106. As shown in FIG. 1, there are two neural networks 120 and 130. However, in practice, there are L neural networks, where L represents the number of spectral bands in the hyperspectral image. Neural network 120 includes convolutional block 121, residual block 122, residual block 123, and convolutional block 124, which may be interconnected as shown in FIG. 1. Similarly, neural network 130 includes convolutional block 131, residual block 132, residual block 133, and convolutional block 134, which may be interconnected as shown in FIG. 1. For each spectral band, there is a corresponding loss function for the decomposition network 106, represented as $L_{de}$, indicated at 146 and 147. Once the decomposition network 106 is initially trained with input hyperspectral images, the corresponding input RGB image is input into decomposition network 106. The output of the decomposition network 106 is the reconstructed hyperspectral image 138. The reconstructed hyperspectral image 138 is then input to a second neural network, which is fine-tuning network 140. Fine tuning network 140 includes convolutional block 141, residual block 142, residual block 143, and convolutional block 144, which may be interconnected as shown in FIG. 1. The output of the fine-tuning network 140 is reconstructed RGB image 152. The reconstructed RGB image 152 is compared with the input RGB image 102. Differences between the reconstructed RGB image 152 and the input RGB image 102 are determined, and are embodied in a corresponding loss function for the fine-tuning network 140, represented as $L_{ft}$, indicated at 154. In one or more embodiments, the second neural network (fine-tuning network 140) comprises a self-supervised network FIG. 2 is a diagram indicating additional details of the neural network architecture shown in FIG. 1, according to an embodiment. In particular, FIG. 2 shows additional details of a residual block such as shown at 122 in FIG. 1. The residual block includes a convolutional block 202. The convolutional block can include one or more convolutional layers. In embodiments, each convolutional layer/block includes a set of learnable filters (also known as kernels) that are applied to the input data. In one or more embodiments, for one or more convolutional layers, a corresponding kernel size for the convolutional layer is set to 3×3. Each kernel/filter is convolved with the input data to produce a feature map, which highlights the presence of particular patterns or features in the input. The convolution operation involves sliding the filter over the input data, performing element-wise multiplication and summing the results to produce a single value in the output feature map. In one or more embodiments, the first neural network (decomposition network 106) further comprises an activation function. The output of convolutional block 202 is fed to activation function 204. In one or more embodiments, the activation function 204 includes a non-linear activation function. In one or more embodiments, the activation function 204 includes a ReLU (Rectified Linear Unit). In one or more embodiments, the activation function 204 includes a Leaky ReLU (Rectified Linear Unit). The Leaky ReLU (Rectified Linear Unit) is a type of activation function used in artificial neural networks. It is similar to the standard ReLU function but allows a small, non-zero gradient when the input is negative, instead of setting the gradient to zero. In one or more embodiments, the Leaky ReLU activation function is defined as follows:

$$f(x) = \begin{cases} x, & \text{if } x > 0 \\ \alpha x, & \text{otherwise} \end{cases}$$

Where α is a small constant, such as 0.01, that determines the slope of the function for negative inputs. This can serve to reduce the probability of developing inactive neurons during training and/or operational use of the neural network.

The output of the activation function 204 can be input to another convolutional block 206. The output of convolutional block 206 can be fed to an additional activation function 208. In one or more embodiments, the activation function 208 can include a sigmoid function. The sigmoid function can be used to introduce non-linearity into the network. In one or more embodiments, the sigmoid function is defined as:

$$f(x) = \frac{1}{1 + e^{-x}}$$

Where e is the base of the natural logarithm. The sigmoid function has a characteristic S-shaped curve that maps any real value to a value between 0 and 1. This property makes it suitable for a wide variety of machine learning applications. In one or more embodiments, the activation function 208 can include a ReLU function instead of, or in addition to, the sigmoid function. Other embodiments can include a Tanh (hyperbolic tangent) activation function, softmax activation function, swish activation function, and/or other suitable activation function. In one or more embodiments, residual blocks can comprise at least two convolutional layers. In one or more embodiments, a first convolutional layer from the at least two convolutional layers is configured to perform feature extraction. In one or more embodiments, a second convolutional layer from the at least two convolutional layers is configured to perform feature map dimension reduction.

Figure 3:
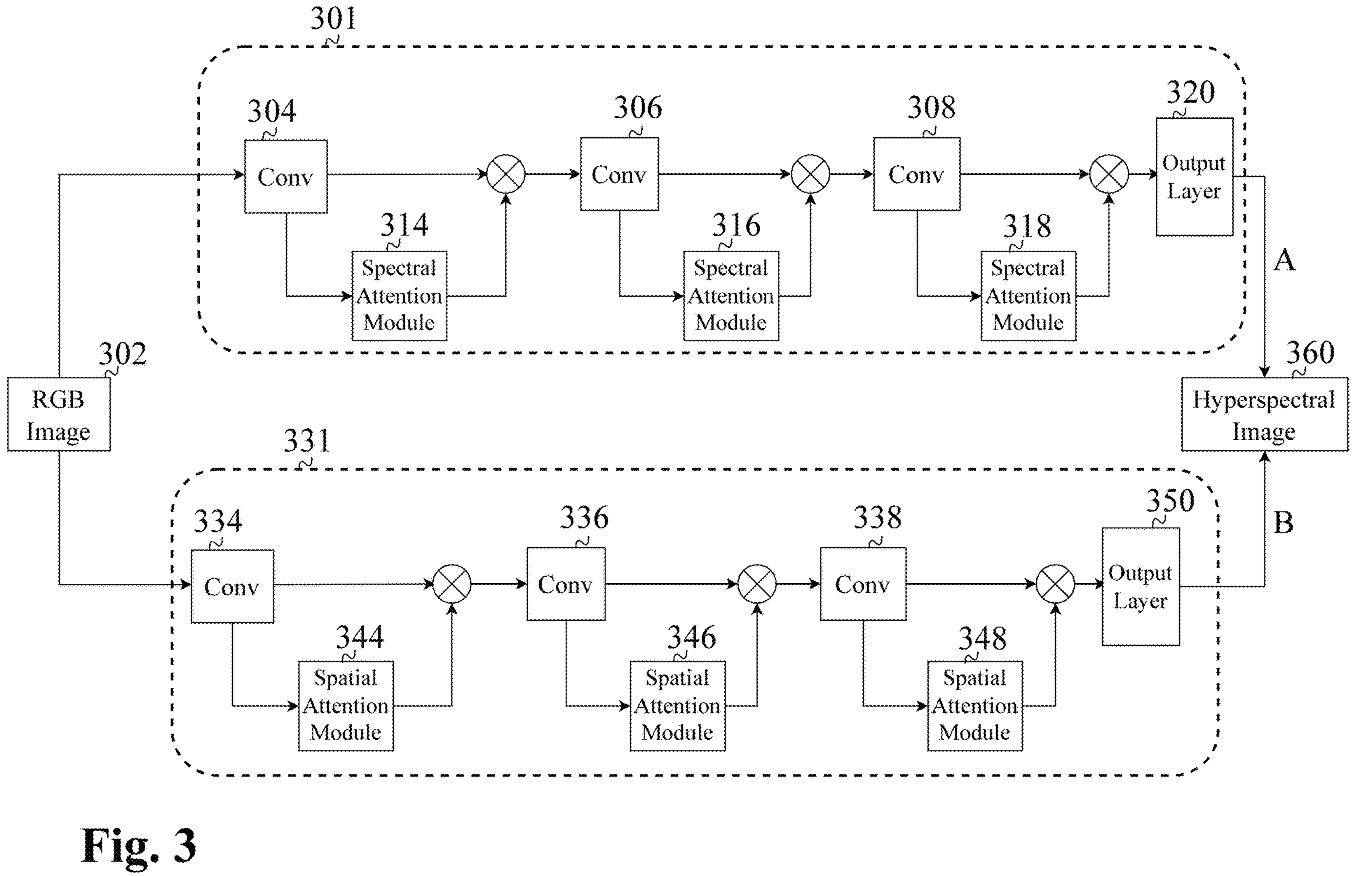
FIG. 3 is a diagram of a dual branch attention network, according to an embodiment.

FIG. 3 is a diagram of a dual branch attention network, according to an embodiment. In one or more embodiments, the decomposition network (106 of FIG. 1), and/or the fine-tuning network (140 of FIG. 1) may be implemented using a dual branch attention network instead of, or in addition to, the neural networks shown in FIG. 1. The dual branch attention network shown in FIG. 3 enables one or more embodiments to extract spectral and spatial features simultaneously from hyperspectral images. In one or more embodiments, small cubes are first cropped from the hyperspectral image and then fed into the dual branch attention network of FIG. 3, in order to extract features. An RGB image 302 is input to a first neural network 301, and also simultaneously input to a second neural network 331. The first neural network 301 is for processing spectral information, and includes convolutional block 304, spectral attention module 314, convolutional block 306, spectral attention module 316, convolutional block 308, spectral attention module 318, and output layer 320, which may be interconnected as shown in FIG. 3. The second neural network 331 is for processing spatial information, and includes convolutional block 334, spatial attention module 344, convolutional block 336, spatial attention module 346, convolutional block 338, spatial attention module 348, and output layer 350, which may be interconnected as shown in FIG. 3.

The attention modules shown in FIG. 3 can include a neural network architecture that focuses on learning to selectively pay attention to certain parts of the input RGB data. The attention modules of disclosed embodiments can dynamically weight the importance of different input elements such as spectral band information for a given pixel. This enables disclosed embodiments to identify relevant information while filtering out noise or irrelevant details, improving its performance on the task of generating a hyperspectral image from an input RGB image. The output from output layer 320 and output layer 350 are combined with respective weighting parameters A and B to generate a hyperspectral image 360 that is based on input RGB image 302.

In one or more embodiments, a first training phase can include pretraining the first neural network 301, and the second neural network 331 independently. A second training phase can then include providing a weighted summation layer and fine-tuning the entire network.

Figure 4:
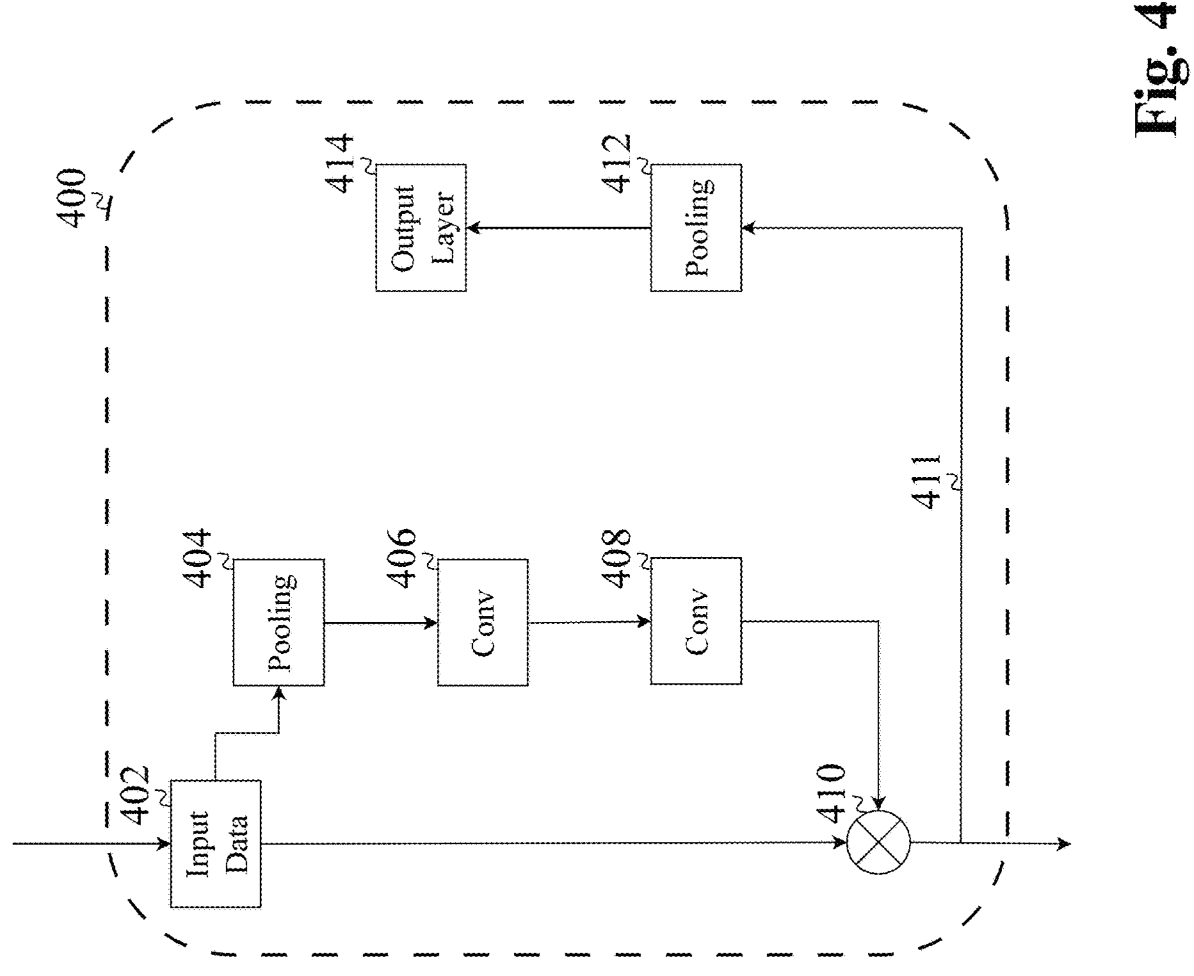
FIG. 4 is a diagram indicating details of a spectral attention module, according to an embodiment.

FIG. 4 is a diagram indicating details of a spectral attention module 400, according to an embodiment. Input data 402 can include hyperspectral image information of multiple channels. The input data 402 may be expressed as a feature map F of the form:

$$F^L \in G(C,H,W)$$

where C represents the channel number, H represents an input image height, and W represents an input image width, and where:

$$L \in \{1,2,3\}$$

The hyperspectral image information can be input to pooling layer 404, followed by convolutional block 406 and convolutional block 408. The pooling layer serves to reduce spatial dimension. The convolutional block 406 and convolutional block 408 can be implemented as 1-D convolutional layers to generate a spectral attention map. In one or more embodiments, a sigmoid function and/or ReLU function may be used as part of the convolutional block 406 and/or convolutional block 408. Elementwise multiplication can be performed by the element indicated at 410. The resulting output branch 411 connects to pooling layer 412. In one or more embodiments, pooling layer 412 can include a max-pooling layer. Pooling layer 412 can be followed by a fully connected output layer 414. The output branch 411 serves to provide supervised information for the spectral attention module, enabling a discriminative ability of a refined feature map. Moreover, the output branch 411 can serve to incorporate a regularization term to a loss function, which can help alleviate undesirable overfitting during the network training process.

Figure 5:
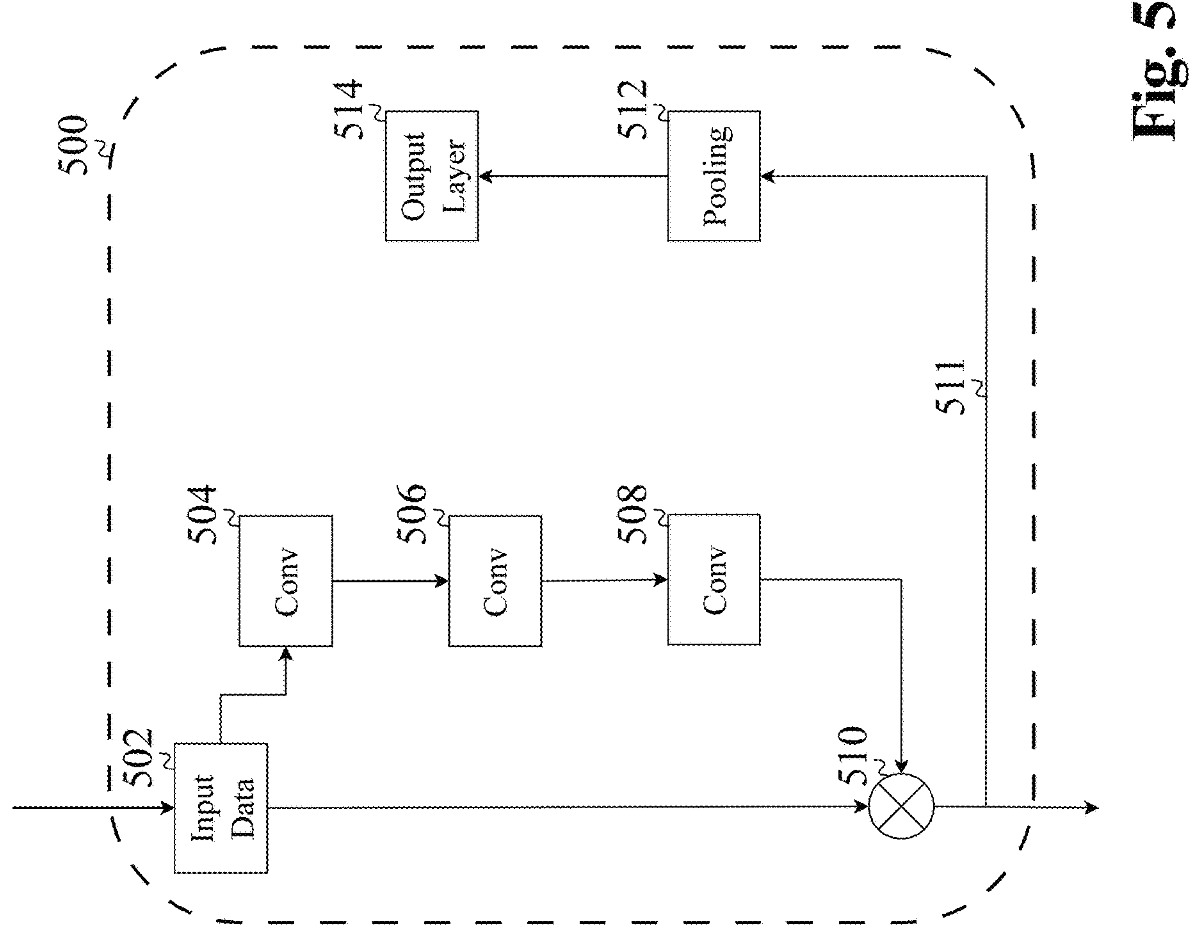
FIG. 5 is a diagram indicating details of a spatial attention module, according to an embodiment.

FIG. 5 is a diagram indicating details of a spatial attention module 500, according to an embodiment. Input data 502 can include hyperspectral image information of multiple channels. The input data 502 may be expressed as a feature map F of the form:

$$F^L \in G(C,H,W)$$

where C represents the channel number, H represents an input image height, and W represents an input image width, and where:

$$L \in \{1,2,3\}$$

The hyperspectral image information can be input to convolutional block 504, followed by convolutional block 506 and convolutional block 508. In one or more embodiments, convolutional block 504 can include a 1×1 convolutional layer to aggregate information along the channel direction of the feature map, resulting in a 2-D feature map. The convolutional block 506 and convolutional block 508 can include 2-D convolutional layers to generate a spatial attention map. In one or more embodiments, one or more of the convolutional blocks 504, 506, and 508 may also include padding operators. The padding operators can serve to avoid the change of spatial sizes. Elementwise multiplication can be performed by the element indicated at 510. The resulting output branch 511 connects to pooling layer 512. In one or more embodiments, pooling layer 512 can include an adaptive max-pooling layer. In one or more embodiments, the pooling layer 512 can be followed by output layer 514.

Figure 12:
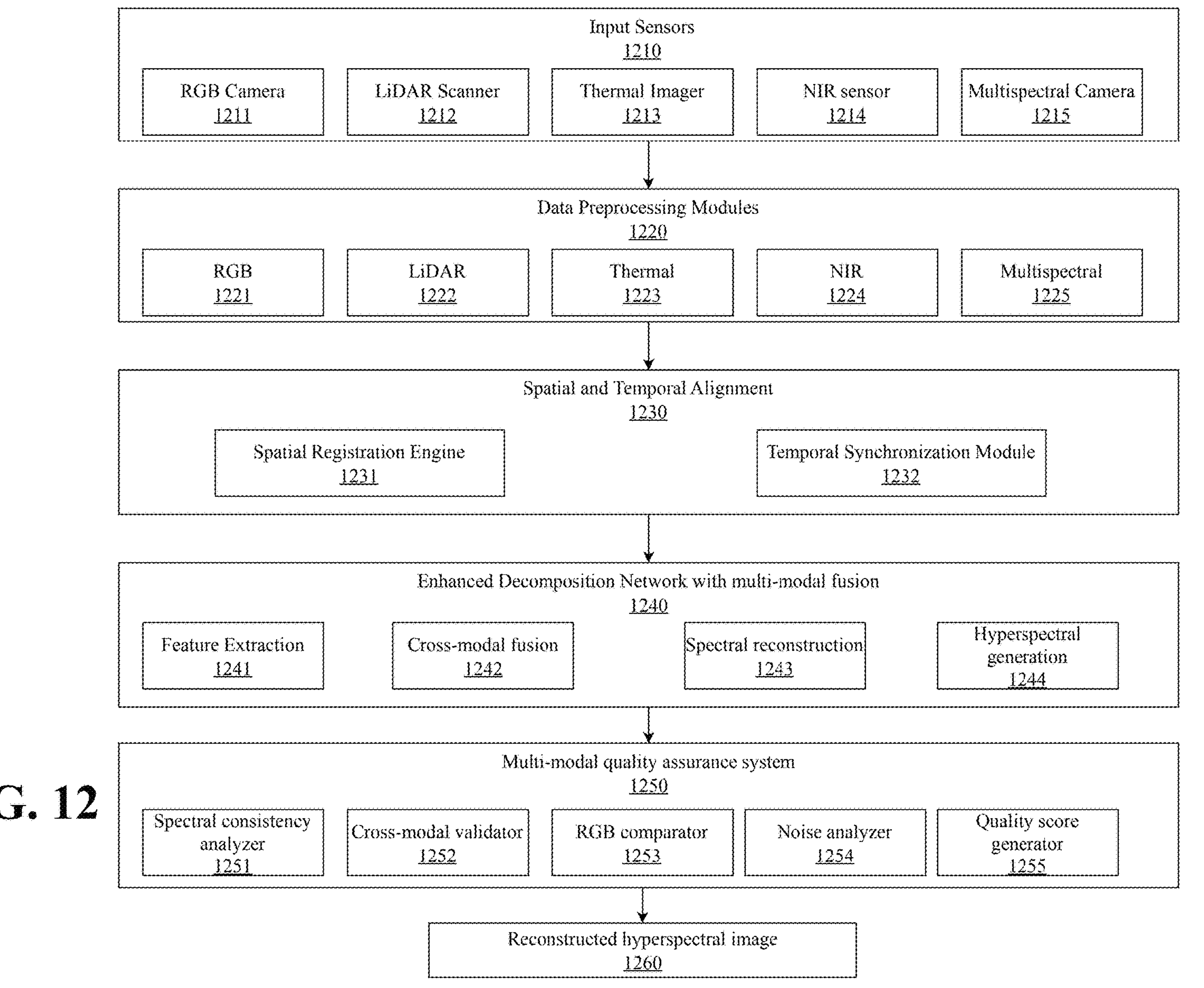
FIG. 12 is a block diagram illustrating a multi-modal hyperspectral image generation system with cross-modal attention and quality assurance, according to an embodiment.

FIG. 12 illustrates a comprehensive multi-modal hyperspectral image generation system that extends the basic RGB-to-hyperspectral reconstruction by incorporating multiple sensor modalities. The system includes parallel data acquisition from multiple input sensors 1210, comprising RGB cameras 1211, LiDAR scanners 1212, thermal imagers 1213, NIR sensors 1214, and multispectral cameras 1215. Each sensor data stream undergoes specialized preprocessing 1220 through dedicated modules (1221-1225) that handle modality-specific calibration and noise reduction. The spatial and temporal alignment module 1230 ensures proper registration between different sensor viewpoints and acquisition times through spatial registration engine 1231 and temporal synchronization module 1232. The enhanced decomposition network 1240 incorporates multi-modal fusion capabilities through feature extraction 1241, cross-modal fusion 1242, spectral reconstruction 1243, and hyperspectral generation 1244. The multi-modal quality assurance subsystem 1250 provides comprehensive quality assessment through spectral consistency analyzer 1251, cross-modal validator 1252, RGB comparator 1253, noise analyzer 1254, and quality score generator 1255. The final output is a reconstructed hyperspectral image 1260 with significantly improved accuracy compared to single-modality approaches.

FIG. 13 details the cross-modal attention mechanism that enables rich interactions between different sensor modalities. The mechanism processes input data from multiple sensors 1310, including RGB data 1311, LiDAR data 1312, thermal data 1313, and NIR data 1314, through modality-specific feature extraction 1320 using specialized encoders (1321-1324). The core cross-modal attention mechanism 1330 consists of four parallel attention modules (1331-1334) that calculate attention weights using scaled dot-product attention formulas. These weights determine how features from one modality influence another, with bidirectional attention enabling comprehensive cross-modal information exchange. The resulting cross-modal features 1340 capture synergies between different sensor types while adapting dynamically to varying scene conditions and sensor reliability.

Figure 14:
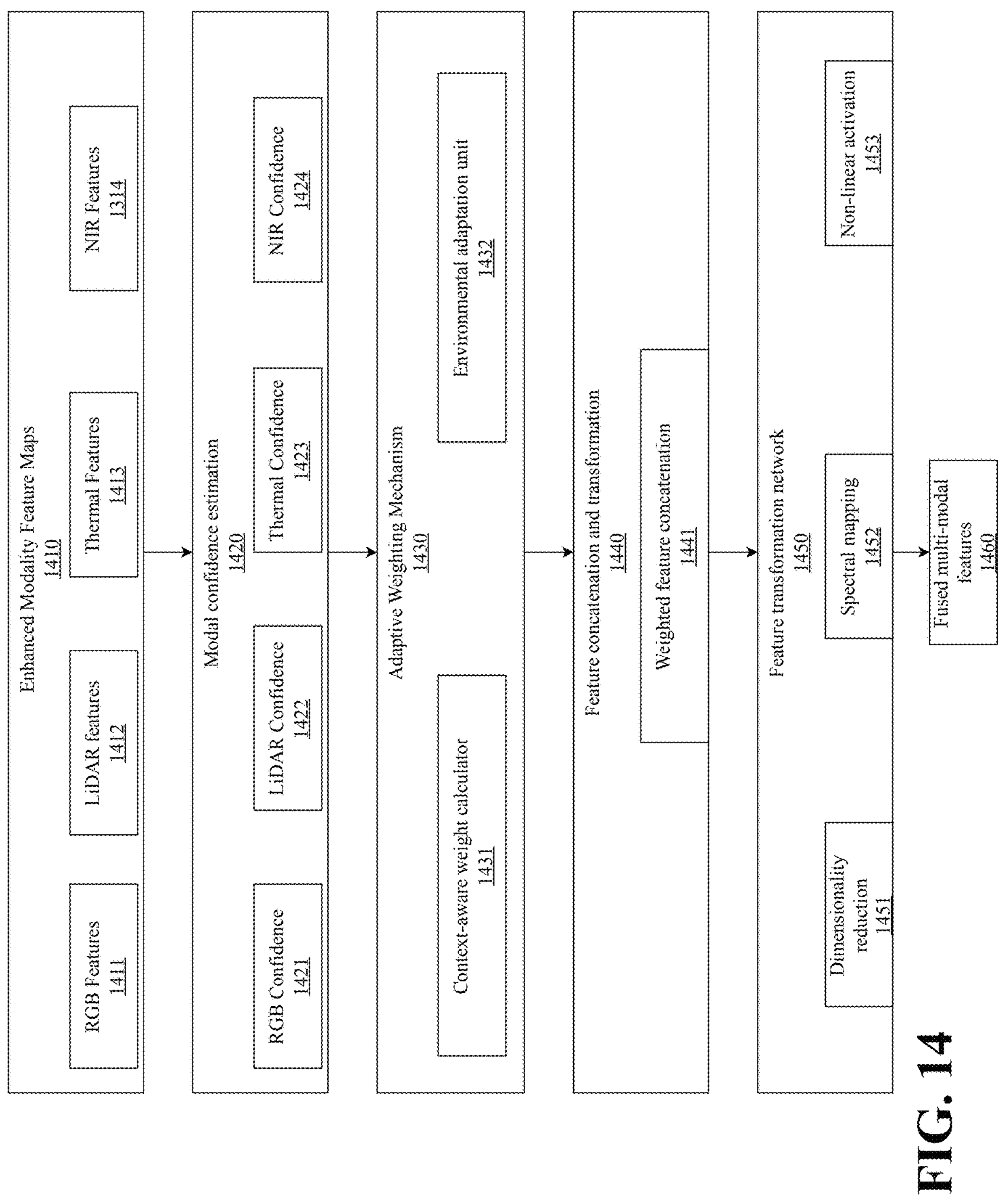
FIG. 14 is a block diagram of a modality fusion network with confidence estimation and adaptive weighting, according to an embodiment.

FIG. 14 illustrates the detailed architecture of the modality fusion network, a critical subsystem in the multi-modal hyperspectral image generation system that intelligently combines information from diverse sensor modalities. The network begins with enhanced modality feature maps 1410 derived from the cross-modal attention mechanism, each carrying complementary information: RGB features 1411 containing color and texture information, LiDAR features 1412 encoding depth and structural information, thermal features 1413 representing temperature distributions, and NIR features 1414 capturing material-specific reflectance properties. These feature maps are simultaneously routed to the modal confidence estimation module 1420, which evaluates the reliability and information quality of each modality through specialized confidence estimators. The RGB confidence estimator 1421 analyzes image quality and luminance distribution to determine the reliability of visible light information, particularly assessing areas affected by shadows, highlights, or noise. The LiDAR confidence estimator 1422 evaluates point cloud density and calculates depth uncertainty metrics to identify regions where depth information may be unreliable, such as reflective surfaces or areas with sparse point returns. The thermal confidence estimator 1423 examines thermal contrast and gradient patterns to determine the reliability of temperature data, accounting for thermal noise and environmental factors that might affect measurement accuracy. The NIR confidence estimator 1424 calculates signal-to-noise ratios and assesses reflectance quality to identify regions where near-infrared data provides valuable material discrimination capabilities. The confidence scores from these estimators feed into the adaptive weighting mechanism 1430, which dynamically determines the contribution of each modality to the final fusion. The context-aware weight calculator 1431 computes modality weights ($\omega_1$, $\omega_2$, $\omega_3$, $\omega_4$) by applying a softmax function to the product of confidence scores and learned modality coefficients, ensuring that more reliable modalities receive greater emphasis in the fusion process. Working in parallel, the environmental adaptation unit 1432 performs scene classification and lighting condition assessment to further adjust these weights based on environmental factors; for instance, increasing the influence of thermal data in low-light conditions or enhancing LiDAR contributions in textureless regions. The resulting modality-specific weights are applied to their respective feature maps before entering the feature concatenation and transformation stage 1440. The Weighted Feature Concatenation unit 1441 combines the weighted modality features into a unified representation $F\_concat = [\omega_1 \cdot F\_RGB | \omega_2 \cdot F\_LiDAR | \omega_3 \cdot F\_Thermal | \omega_4 \cdot F\_NIR]$, preserving the distinct contributions of each modality while accounting for their varying reliability across the spatial domain. This concatenated feature representation then passes through the feature transformation network 1450, which begins with a Dimensionality Reduction module 1451 that employs 1×1 convolutions, channel attention mechanisms, and feature compression techniques to reduce the high-dimensional concatenated features to a more compact representation while preserving essential information. The spectral mapping module 1452 then analyzes band correlations and applies spectral residual blocks with physical constraints to map the compressed features into a spectral domain representation that aligns with the target hyperspectral bands. Finally, the non-linear activation module 1453 applies ReLU or Leaky ReLU activation functions, batch normalization, and dropout regularization to introduce non-linearity, normalize feature distributions, and prevent overfitting, respectively. The output of this transformation process is a set of fused multi-modal features 1460 that incorporates the complementary strengths of all available sensor modalities, weighted according to their confidence and environmental relevance, and transformed into a representation specifically optimized for hyperspectral reconstruction. This adaptive fusion approach significantly enhances the spectral reconstruction quality by leveraging the unique strengths of each modality while mitigating their individual weaknesses, resulting in more accurate and robust hyperspectral image generation across diverse imaging conditions.

Figure 15:
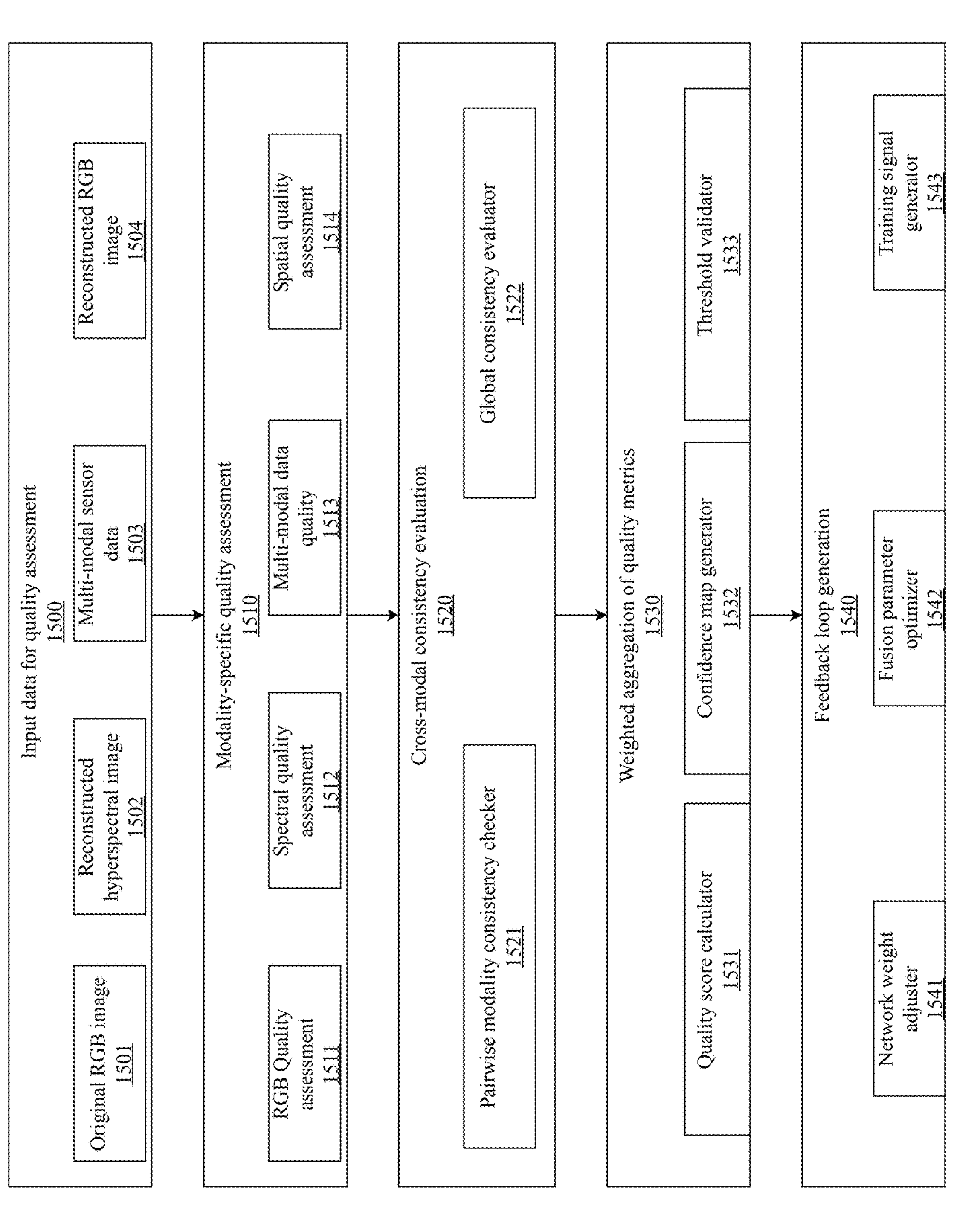
FIG. 15 is a block diagram of a multi-modal quality assessment framework with cross-modal consistency evaluation, according to an embodiment.

FIG. 15 illustrates the multi-modal quality assessment framework, a comprehensive evaluation system that systematically assesses the quality of hyperspectral reconstruction results through multiple complementary analysis approaches before accepting or rejecting the final output, according to an embodiment. The framework operates through a hierarchical evaluation process that examines both individual modality performance and cross-modal consistency to ensure robust quality assessment across diverse sensor types and environmental conditions.

The framework begins with input data for quality assessment 1500, which comprises four essential data sources that provide comprehensive coverage of the reconstruction process. The original RGB image 1501 serves as the primary reference for color accuracy evaluation and provides ground truth data for comparative analysis. The reconstructed hyperspectral image 1502 represents the main output of the multi-modal reconstruction process and contains the spectral information that must be validated for accuracy and consistency. The multi-modal sensor data 1503 encompasses the raw data from the plurality of imaging devices, including RGB cameras, LiDAR scanners, thermal imagers, and NIR sensors, that provided the initial inputs to the reconstruction system. The reconstructed RGB image 1504 is generated by the fine-tuning network from the reconstructed hyperspectral image and serves as a consistency check to verify that the hyperspectral reconstruction can accurately reproduce the original visible spectrum information.

These input data sources feed into the modality-specific quality assessment module 1510, which evaluates the quality of each sensing modality independently through specialized assessment components tailored to the unique characteristics and potential failure modes of each sensor type. The RGB quality assessment unit 1511 performs comprehensive evaluation of visible spectrum data by computing peak signal-to-noise ratio (PSNR) and structural similarity index (SSIM) metrics between the original and reconstructed RGB images, while also conducting detailed color accuracy analysis across different lighting conditions and scene types to identify potential color reproduction errors. The spectral quality assessment unit 1512 analyzes the spectral characteristics of the reconstructed hyperspectral image by evaluating band-to-band correlations to ensure smooth spectral transitions, measuring band consistency metrics to verify spectral signature accuracy, and comparing reconstructed spectra against known material signatures to detect anomalies or physically implausible spectral profiles. The multi-modal data quality unit 1513 applies sensor-specific quality metrics to evaluate how effectively information from each sensor modality has been incorporated into the reconstruction, including specialized measurements for LiDAR point cloud density, thermal measurement accuracy, and NIR reflectance consistency, along with comprehensive noise level assessments across all modalities. The spatial quality assessment unit 1514 examines the spatial characteristics of the reconstructed images by measuring edge preservation to ensure sharp boundaries between objects are maintained, evaluating texture consistency to preserve fine spatial details, and assessing geometric accuracy to verify proper spatial registration between modalities.

The outputs from the modality-specific assessments flow into the cross-modal consistency evaluation module 1520, which examines relationships and coherence between different sensing modalities to identify potential fusion artifacts or inconsistencies that might not be apparent when examining individual modalities in isolation. The pairwise modality consistency checker 1521 performs targeted evaluation of specific modality combinations through multiple specialized assessment channels. RGB-Spectral consistency analysis ensures that color information derived from RGB sensors properly aligns with corresponding spectral signatures in the reconstructed hyperspectral image, identifying discrepancies that might indicate reconstruction errors or calibration issues. LiDAR-Thermal registration assessment verifies proper spatial alignment between structural information from LiDAR sensors and temperature data from thermal imagers, detecting misregistration that could compromise reconstruction accuracy. NIR-RGB material consistency evaluation confirms that material properties are consistently represented across both visible and near-infrared spectral ranges, identifying potential inconsistencies in material classification or spectral reconstruction.

The global consistency evaluator 1522 performs higher-level assessment of overall coherence across all modalities through comprehensive analysis approaches. Multi-modal fusion coherence analysis ensures seamless integration of information from all available sensor modalities by detecting fusion artifacts, evaluating the smoothness of transitions between regions dominated by different modalities, and assessing the overall harmony of the fused representation. Physical plausibility verification examines the reconstruction results against known physical laws and material properties to detect results that violate fundamental principles of electromagnetic radiation, thermodynamics, or material science. Spectral-spatial information alignment confirms that spatial features properly correspond to spectral characteristics, ensuring that object boundaries identified in spatial data align with spectral discontinuities and that material transitions are consistently represented across both spatial and spectral domains.

The individual quality metrics from all assessment components are passed to the weighted aggregation of quality metrics module 1530, which combines diverse quality measures into comprehensive scores that provide unified quality assessment. The quality score calculator 1531 computes a weighted sum of individual quality metrics using the mathematical formulation $Q=\Sigma w_i \cdot q_i$, where the weights $w_i$ are learned parameters that have been optimized to reflect the relative importance of each metric based on extensive validation studies and their correlation with perceptual quality assessments. The confidence map generator 1532 creates a spatial distribution of quality metrics that identifies specific regions within the reconstructed image where quality may be compromised, generating pixel-level or region-level confidence scores that indicate areas requiring additional attention or potential reprocessing. The threshold validator 1533 compares the aggregated quality scores against predetermined thresholds that have been established based on application requirements, user quality expectations, and statistical analysis of high-quality reconstruction examples to determine whether the current reconstruction meets minimum acceptable standards for the intended application.

Based on the aggregated quality metrics and threshold validation results, the feedback loop generation module 1540 creates targeted optimization signals designed to improve the reconstruction process through specific parameter adjustments. The network weight adjuster 1541 generates gradients for neural network weight updates using the mathematical relationship $\partial W/\partial t=-\eta\cdot\nabla Q\_quality$, where n represents the learning rate and $\nabla Q\_quality$ represents the gradient of quality metrics with respect to network parameters, enabling targeted optimization that addresses specific quality deficiencies identified by the assessment framework. The fusion parameter optimizer 1542 adapts the modal weighting coefficients used in the multi-modal fusion process to emphasize more reliable sensor modalities while reducing the influence of those exhibiting quality issues, implementing dynamic reweighting strategies that respond to real-time quality assessment results. The training signal generator 1543 modifies the loss functions used during neural network training to place greater emphasis on improving areas of weakness identified by the quality assessment, implementing adaptive loss weighting that prioritizes correction of the most significant quality deficiencies.

The feedback signals generated by module 1540 are distributed through three distinct optimization pathways that target different components of the reconstruction system for coordinated improvement. Feedback to the decomposition network enables refinement of the core spectral reconstruction algorithms to improve the accuracy of hyperspectral band generation from multi-modal sensor inputs. Feedback to the fusion network enhances the strategies used to combine information from different sensor modalities, optimizing the balance between different sensor contributions based on their assessed reliability and information content. Feedback to the fine-tuning network refines the final output processing to improve overall reconstruction quality and consistency between hyperspectral and RGB representations.

This comprehensive multi-modal quality assessment framework provides several significant technical advantages over conventional single-modality quality evaluation approaches. The framework enables robust quality assessment across diverse sensor types and environmental conditions by incorporating modality-specific expertise while maintaining global consistency evaluation. The hierarchical assessment structure allows for both detailed analysis of individual components and comprehensive evaluation of system-level performance, providing fine-grained feedback for targeted improvements while maintaining overall system optimization. The adaptive feedback mechanisms ensure continuous improvement of reconstruction quality through targeted parameter adjustments based on comprehensive quality analysis, enabling the system to learn and adapt from quality assessment results to improve future reconstruction performance.

Figure 16:
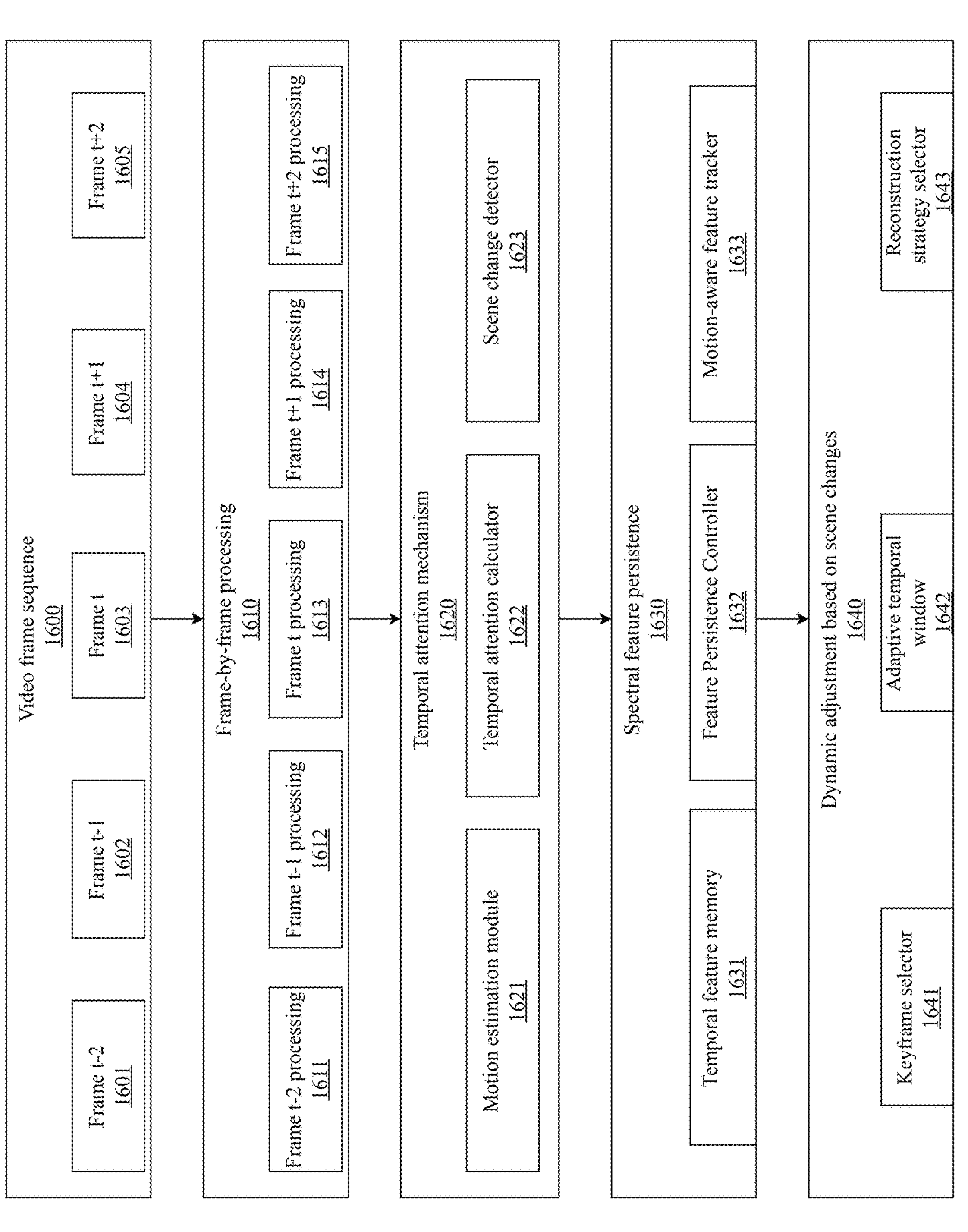
FIG. 16 is a diagram of a temporal fusion framework for video-based hyperspectral reconstruction, according to an embodiment.

FIG. 16 illustrates the Temporal Fusion framework for Video-based Hyperspectral Reconstruction, a sophisticated system that extends static hyperspectral reconstruction techniques to video sequences by leveraging temporal coherence and continuity across frames while dynamically adapting to scene changes and motion patterns, according to an embodiment. The framework addresses the unique challenges of video processing by maintaining spectral consistency across temporal sequences while accommodating dynamic scene content, camera motion, and varying illumination conditions that occur in real-world video capture scenarios.

The framework begins with the Video Frame Sequence 1600, which provides the temporal context essential for enhanced reconstruction quality compared to processing individual frames independently. The sequence comprises multiple consecutive frames arranged in temporal order: Frame t−2 1601 representing the second frame prior to the current processing target, Frame t−1 1602 representing the immediately preceding frame, the current Frame t 1603 that serves as the primary reconstruction target, Frame t+1 1604 representing the immediately following frame, and Frame t+2 1605 representing the second frame following the current target. This five-frame temporal window provides sufficient context for robust temporal analysis while maintaining computational efficiency, with the symmetric arrangement around the current frame enabling both backward and forward temporal referencing for optimal reconstruction quality.

The frame sequence feeds into the frame-by-frame processing module 1610, which performs initial individual processing of each frame to extract preliminary features and establish baseline reconstruction quality before temporal integration. Frame t−2 processing 1611, Frame t−1 processing 1612, Frame t processing 1613, Frame t+1 processing 1614, and Frame t+2 processing 1615 operate in parallel, each applying the fundamental multi-modal reconstruction techniques described in previous figures to extract preliminary spectral features from their respective frames. These processing units employ the same neural network architectures and cross-modal attention mechanisms established for static image reconstruction, but operate independently to provide a foundation of frame-specific spectral information that serves as input for subsequent temporal fusion operations. The parallel processing approach maximizes computational efficiency while ensuring that each frame receives appropriate individual attention before temporal relationships are considered.

The outputs from individual frame processing flow into the temporal attention mechanism 1620, which analyzes relationships between frames to determine optimal information propagation strategies across the temporal dimension. The motion estimation module 1621 identifies correspondences between frames through advanced computer vision techniques, calculating optical flow vectors that track pixel-level motion between consecutive frames, implementing feature matching algorithms that establish correspondences between distinctive image features across temporal neighbors, and employing robust estimation methods such as RANSAC (Random Sample Consensus) to handle occlusions, appearance changes, and temporary feature disappearances that commonly occur in dynamic video sequences.

The temporal attention calculator 1622 processes the motion estimation results to compute attention weights that determine the influence each temporal neighbor should have on the current frame's reconstruction. These weights are calculated using a modified scaled dot-product attention mechanism adapted for temporal processing: $Attention\_temporal(Q\_t, K\_\{t\pm i\}, V\_\{t\pm i\})=softmax(Q\_t\ K\_\{t\pm i\}^T/\sqrt{d\_temporal})\ V\_\{t\pm i\}$, where Q_t represents queries from the current frame t, K_{t±i} and V_{t±i} represent keys and values from temporal neighbors at offsets±i, and d_temporal is a scaling factor optimized for temporal feature dimensions. The attention weights are computed based on multiple factors including motion consistency between frames, feature similarity measures that account for gradual appearance changes, temporal distance weighting that gives preference to closer temporal neighbors, and confidence scores derived from the motion estimation quality.

The scene change detector 1623 operates in parallel with the attention calculator to identify significant alterations in scene content that require special handling to prevent temporal artifacts. The detector employs multiple detection strategies including histogram-based analysis that compares color and intensity distributions between frames, structural similarity assessment using SSIM (Structural Similarity Index Measure) calculations across multiple scales, feature point analysis that tracks the consistency of distinctive image features, and optical flow magnitude analysis that identifies regions of abnormally high motion that might indicate scene transitions. When significant scene changes are detected, the system triggers adaptive processing modes that adjust temporal integration strategies to handle the new conditions appropriately.

The information from the temporal attention mechanism feeds into the spectral feature persistence module 1630, which maintains consistent spectral signatures across the temporal dimension while allowing for natural variations due to changing illumination or viewing perspectives. The temporal feature memory 1631 implements a sophisticated storage and retrieval system that maintains previously reconstructed spectral profiles across multiple frames, creating a repository of spectral signatures organized by spatial location and temporal context. This memory system employs content-addressable storage mechanisms that enable efficient retrieval of relevant spectral information based on spatial coordinates, feature descriptors, and temporal proximity.

The feature persistence controller 1632 enforces temporal consistency constraints through advanced filtering and validation techniques that ensure spectral characteristics of materials remain stable across frames while accommodating natural variations. The controller implements adaptive Kalman filtering for spectral signature tracking, allowing gradual changes in spectral profiles while rejecting abrupt variations that might indicate reconstruction errors. Physical constraint validation ensures that temporal changes in spectral signatures remain within bounds established by material science principles, preventing non-physical spectral evolution that could compromise reconstruction accuracy. Illumination compensation algorithms account for lighting changes that naturally affect spectral measurements, distinguishing between lighting-induced variations and material property changes.

The motion-aware feature tracker 1633 propagates spectral features along estimated motion trajectories, ensuring that the system maintains spectral consistency even as objects move through the scene. The tracker employs sophisticated trajectory prediction algorithms that account for both translational and rotational motion, implements sub-pixel interpolation techniques to maintain spectral accuracy during feature propagation, and uses confidence-weighted averaging to combine spectral information from multiple temporal sources while accounting for the reliability of motion estimation results.

The dynamic adjustment based on scene changes module 1640 adapts the reconstruction strategy based on detected scene dynamics and temporal characteristics. The keyframe selector 1641 identifies frames requiring full independent reconstruction due to significant scene changes, accumulated drift in propagated features, or temporal discontinuities that break the consistency assumptions underlying temporal fusion. The selection process employs multiple criteria including scene change magnitude, feature tracking confidence, spectral consistency metrics, and temporal distance from previously selected keyframes to ensure optimal coverage of the video sequence with minimal computational overhead.

The adaptive temporal window 1642 dynamically adjusts the size and weighting of the temporal context based on scene characteristics and motion patterns. In static or slowly changing scenes, the system expands the temporal window to incorporate information from a larger number of frames, improving signal-to-noise ratio and reconstruction accuracy through increased temporal averaging. In highly dynamic scenes with rapid motion or frequent scene changes, the system contracts the temporal window to prevent motion blur artifacts and temporal inconsistencies, focusing on closer temporal neighbors with higher correlation to the current frame.

The reconstruction strategy selector 1643 chooses between different processing approaches based on comprehensive analysis of scene complexity, motion patterns, temporal consistency requirements, and computational constraints. The selector implements a decision tree that evaluates multiple factors: for scenes with minimal motion and high temporal consistency, it selects temporal propagation strategies that maximize information sharing between frames; for scenes with moderate motion and good feature tracking, it employs blended approaches that combine temporal propagation with independent reconstruction; for scenes with high motion complexity or poor temporal correlation, it defaults to enhanced independent reconstruction with minimal temporal coupling.

The framework incorporates three major information pathways that enable comprehensive temporal processing. The frame information flow carries original multi-modal sensor data through the processing pipeline, maintaining data integrity while enabling temporal analysis at each processing stage. The temporal feedback pathway allows temporal analysis results to influence frame processing decisions, enabling adaptive processing that responds to temporal characteristics and motion patterns. The adaptation signal pathway enables dynamic adjustments to modify spectral feature persistence parameters, reconstruction strategies, and temporal window characteristics based on real-time analysis of scene dynamics and processing performance. This comprehensive temporal fusion framework provides significant advantages over frame-independent processing approaches. The temporal coherence maintenance ensures that spectral signatures remain consistent across video sequences, eliminating flickering artifacts and temporal inconsistencies that would otherwise compromise the quality of hyperspectral video reconstruction. The adaptive processing strategies enable robust performance across diverse video content, from static surveillance footage to highly dynamic action sequences, by automatically adjusting processing parameters to match scene characteristics. The motion-aware feature propagation significantly improves reconstruction quality by leveraging high-quality spectral information from multiple frames while maintaining spatial accuracy through precise motion compensation. The scene change adaptation prevents temporal artifacts at scene boundaries while maintaining optimal reconstruction quality within consistent scene segments, ensuring that the system performs reliably across complete video sequences with varying content and complexity.

Figure 17:
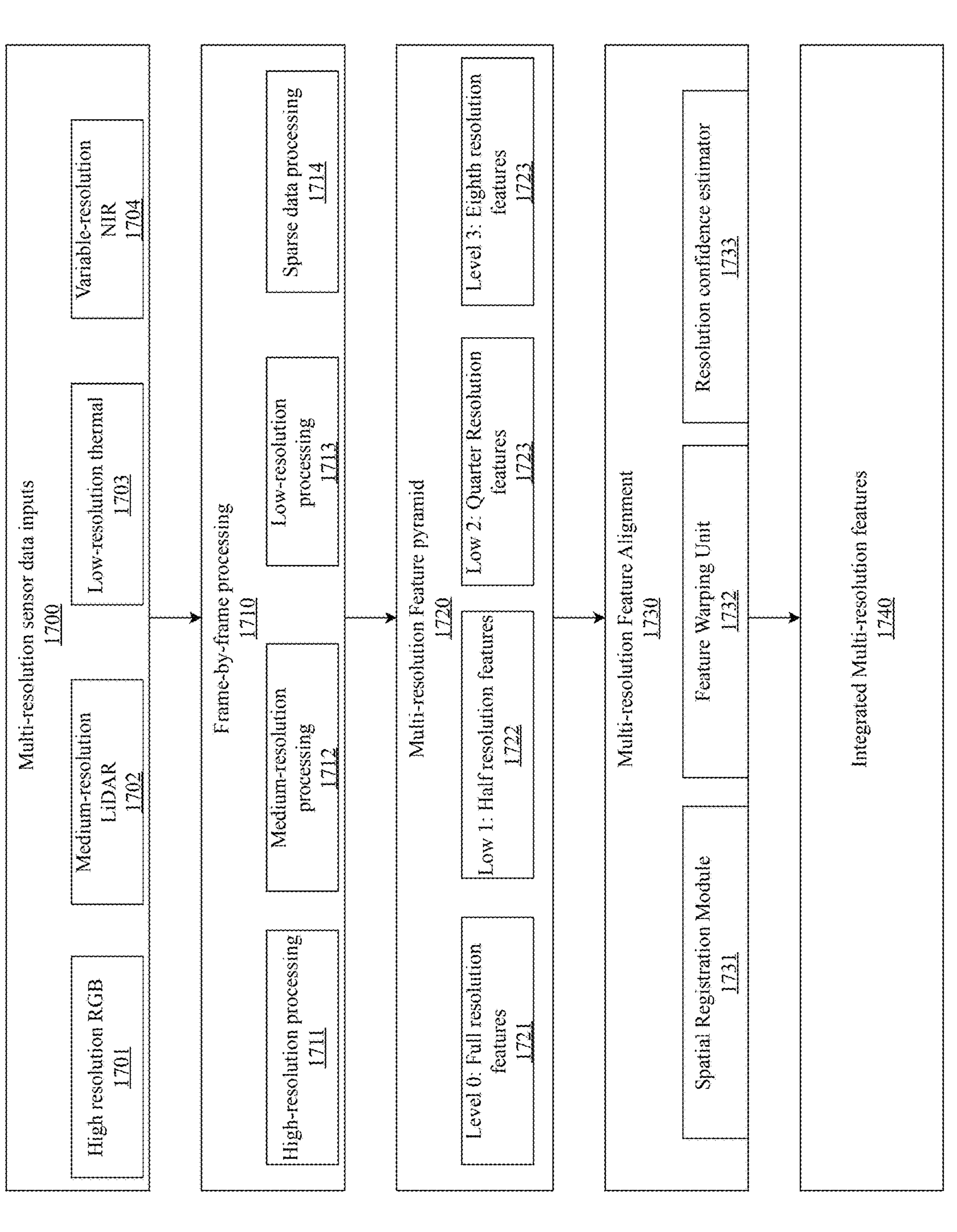
FIG. 17 is a block diagram of a multi-resolution processing pipeline for handling sensors with different spatial resolutions, according to an embodiment.

FIG. 17 illustrates the Multi-resolution Processing Pipeline, a sophisticated system that addresses the fundamental challenge of integrating sensor data with disparate spatial resolutions for enhanced hyperspectral image reconstruction by creating a unified multi-scale representation that preserves the strengths of each resolution level while enabling comprehensive cross-resolution information exchange, according to an embodiment. The pipeline overcomes the significant technical challenges inherent in combining high-resolution visual data with lower-resolution specialized sensors by implementing a hierarchical feature pyramid structure that facilitates bidirectional information flow and adaptive feature alignment across multiple spatial scales.

The pipeline begins with multi-resolution sensor data inputs 1700, comprising four primary sensor sources that provide complementary information at significantly different native spatial resolutions, each optimized for specific sensing capabilities. High-resolution RGB 1701 operates at 4K resolution (3840×2160 pixels), providing detailed color and texture information across the visible spectrum with exceptional spatial fidelity that captures fine-grained visual features, object boundaries, and surface texture details essential for accurate spectral reconstruction. Medium-resolution LiDAR 1702 operates at 1080p resolution (1920×1080 points), offering precise structural and three-dimensional depth information that provides geometric context and spatial relationships between objects in the scene, with sufficient resolution to capture architectural details and object boundaries while maintaining computational efficiency for real-time processing applications.

Low-resolution thermal 1703 operates at 640×480 resolution, capturing temperature distributions and thermal signature data across the scene that provides critical material property information and environmental context, with thermal sensors optimized for temperature sensitivity rather than spatial resolution due to the physical constraints of infrared detector technology. Variable-resolution NIR 1704 provides sparse point-based sampling with irregular spatial distribution, delivering material-specific reflectance properties in the near-infrared spectrum that are crucial for material identification and vegetation analysis, with sampling density varying based on scene content and material reflectance characteristics that determine signal quality and information content.

These heterogeneous inputs undergo initial resolution-specific processing 1710, where each modality is processed according to its unique characteristics and native resolution to extract optimal feature representations before multi-resolution integration. High-resolution processing 1711 applies specialized convolutional neural network architectures optimized for high-resolution imagery, employing multi-scale feature extraction techniques that preserve fine spatial details while extracting hierarchical features at multiple spatial scales, using techniques such as dilated convolutions and attention mechanisms to maintain computational efficiency while processing the large data volumes inherent in 4K imagery.

Medium-resolution processing 1712 extracts structural and geometric features from LiDAR point cloud data at its native 1080p resolution, employing three-dimensional convolutional operations and point cloud processing networks that capture both local geometric features and global structural patterns, with specialized algorithms for handling the unique characteristics of range data including depth discontinuities, surface normal, and geometric curvature information that provide essential spatial context for spectral reconstruction.

Low-resolution processing 1713 processes thermal imagery using thermal-specific feature extraction algorithms that account for the unique characteristics of infrared radiation and temperature measurement, employing specialized convolutional architectures designed for thermal data that emphasize temperature gradients, thermal boundaries, and heat signature patterns while compensating for the lower spatial resolution through advanced interpolation and feature enhancement techniques.

Sparse data processing 1714 handles the irregular sampling pattern of NIR data through sophisticated interpolation and gridding algorithms that transform the sparse point-based measurements onto a regular spatial grid suitable for subsequent multi-resolution processing, employing techniques such as kriging interpolation, radial basis function networks, and adaptive mesh refinement to create spatially coherent NIR feature maps while preserving the spectral fidelity of the original measurements.

The processed features feed into the multi-resolution feature pyramid 1720, a hierarchical structure that organizes information at multiple spatial scales to facilitate comprehensive multi-resolution analysis and cross-scale information exchange. The pyramid implements a systematic resolution hierarchy with bidirectional information flow that enables both coarse-to-fine and fine-to-coarse feature propagation across different spatial scales.

Level 0 1721 maintains full-resolution features at the highest spatial resolution available, primarily incorporating detailed information from the high-resolution RGB data while preserving the finest spatial details and texture information essential for accurate reconstruction of sharp edges, fine textures, and small-scale features that contribute to spectral signature accuracy. Level 1 1722 contains half-resolution features where medium-resolution modalities such as LiDAR data contribute significantly, providing a balanced representation that combines structural information from depth sensors with downsampled visual features, creating an optimal resolution for capturing object-level features and spatial relationships.

Level 2 1723 holds quarter-resolution features where lower-resolution thermal data begins to have stronger representation relative to other modalities, providing thermal context and material property information that influences spectral reconstruction across larger spatial regions while maintaining sufficient spatial resolution for meaningful thermal pattern analysis. Level 3 1724 consists of eighth-resolution features that incorporate the coarsest spatial information while providing global scene context, integrating information from all modalities at a scale suitable for scene-level analysis, global illumination estimation, and overall spectral consistency enforcement.

The pyramid implements sophisticated bidirectional information flow through carefully designed upsampling and downsampling operations. Downsampling operations create coarse-to-fine pathways that propagate contextual information from higher pyramid levels to lower levels using advanced pooling techniques including adaptive pooling, attention-weighted pooling, and learnable downsampling filters that preserve the most relevant information while reducing spatial resolution. Upsampling operations establish fine-to-coarse pathways that allow detailed features to inform and refine coarser representations through techniques such as transposed convolutions, bilinear interpolation with learned refinement, and sub-pixel convolution methods that maintain feature quality during resolution enhancement.

Each sensor modality enters the pyramid at its most appropriate resolution level based on native sensor characteristics and information content. High-resolution RGB data 1701 feeds primarily into Level 0 1721 but also contributes to other levels through the downsampling pathway, medium-resolution LiDAR data 1702 enters optimally at Level 1 1722 while contributing to adjacent levels, low-resolution thermal data 1703 feeds primarily into Level 2 1723 with upsampling contributions to finer levels, and the interpolated NIR data 1704 contributes across multiple levels based on the interpolation grid resolution and local data density.

The multi-resolution feature alignment module 1730 ensures spatial consistency and optimal information integration across the different resolution levels despite initial spatial disparities between sensor modalities. The spatial registration module 1731 performs geometric alignment of features across different resolution levels using advanced image registration techniques including feature-based registration with SIFT (Scale-Invariant Feature Transform) or ORB (Oriented FAST and Rotated BRIEF) descriptors, intensity-based registration using mutual information or normalized cross-correlation metrics, and deep learning-based registration networks that can handle complex spatial transformations and viewpoint differences between different sensor modalities.

The feature warping unit 1732 applies learnable spatial transformations to features at different resolution levels, enabling non-rigid alignment that accommodates complex spatial relationships between modalities through deformable convolution operations, thin-plate spline transformations, and optical flow-based warping techniques. These warping operations are implemented using differentiable spatial transformation networks that enable end-to-end learning of optimal alignment parameters while maintaining gradient flow for neural network training.

The resolution confidence estimator 1733 computes reliability weights for features at each resolution level based on multiple quality metrics including signal-to-noise ratio analysis specific to each resolution level, spatial consistency measures that evaluate the coherence of features across different scales, cross-modal agreement scores that assess how well features from different modalities align at each resolution level, and uncertainty quantification using techniques such as Monte Carlo dropout or ensemble methods that provide confidence estimates for feature reliability at each spatial scale.

The confidence estimation process employs mathematical formulations such as: $\text{Confidence(level\_i)}=\alpha\cdot\text{SNR(level\_i)}+\beta\cdot\text{Consistency (level\_i)}+\gamma\cdot\text{Agreement(level\_i)}$, where $\alpha$, $\beta$, and $\gamma$ are learned weighting parameters that balance the relative importance of different quality metrics based on extensive validation across diverse datasets and imaging conditions. The confidence scores are used to weight the contribution of each resolution level during feature integration, ensuring that more reliable information receives greater emphasis in the final representation.

The output of this comprehensive multi-resolution processing pipeline is the integrated multi-resolution features 1740, a unified representation that preserves and leverages the unique strengths of each resolution level while mitigating their individual limitations through intelligent cross-scale information sharing. This integrated representation maintains fine spatial details from high-resolution modalities while incorporating essential context from lower-resolution specialized sensors, creating a comprehensive feature space that supports accurate hyperspectral reconstruction across all spatial scales present in the input data.

The multi-resolution approach provides several significant technical advantages over single-resolution processing methods. The hierarchical feature pyramid enables efficient processing of mixed-resolution inputs by allowing each modality to contribute at its optimal resolution level while benefiting from cross-scale information exchange that enhances reconstruction quality beyond what could be achieved with any single resolution approach. The bidirectional information flow ensures that fine details from high-resolution sensors inform global context understanding while global patterns from lower-resolution sensors provide essential context for interpreting fine-scale features.

The adaptive feature alignment and confidence weighting mechanisms enable robust reconstruction even when different modalities provide information at vastly different spatial resolutions, automatically adjusting the processing pipeline to optimize for the available sensor configuration and data quality. The unified multi-resolution representation significantly enhances hyperspectral reconstruction quality by enabling the system to leverage complementary information across all available spatial scales, resulting in reconstructions that exhibit both fine spatial detail and global spectral consistency that would be impossible to achieve through single-resolution processing approaches.

Figure 18:
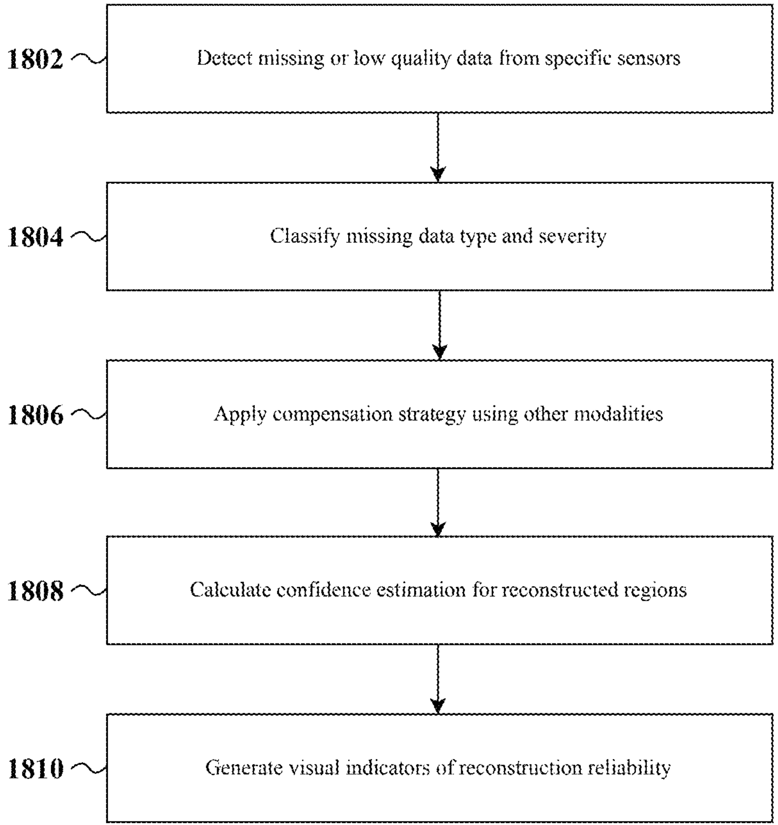
FIG. 18 is a flow diagram illustrating a missing data compensation mechanism for multi-modal sensor data, according to an embodiment.

FIG. 18 illustrates the missing data compensation mechanism, a sophisticated process designed to address the critical challenge of incomplete or degraded sensor data in multi-modal hyperspectral image reconstruction by implementing intelligent detection, classification, and compensation strategies that leverage the complementary nature of different sensor modalities to maintain reconstruction quality even when individual sensors fail or provide corrupted data, according to an embodiment. The mechanism operates as a comprehensive quality assurance and data recovery system that automatically identifies problematic data regions, categorizes the nature and severity of data deficiencies, and applies appropriate compensation strategies using information from reliable sensor modalities to ensure robust reconstruction performance across diverse operational conditions.

The compensation mechanism begins with the detection of missing or low-quality data from specific sensors 1802, wherein the system employs a comprehensive suite of quality assessment algorithms that continuously monitor all sensor modalities for data integrity, completeness, and reliability. The detection process implements multiple parallel analysis approaches including signal-to-noise ratio evaluation that computes $\text{SNR}=10\cdot\log_{10}(\text{P\_signal}/\text{P\_noise})$ for each sensor modality, where P_signal represents the power of the desired signal content and P_noise represents the power of unwanted variations or corruption artifacts. Coverage pattern analysis examines the spatial and temporal completeness of sensor data acquisition, identifying regions where sensors fail to provide measurements due to occlusions, hardware malfunctions, or environmental interference.

Sensor-specific quality metrics are applied to evaluate each modality according to its unique characteristics and failure modes. RGB sensor evaluation includes analysis of exposure levels, color balance consistency, focus quality assessment using gradient-based sharpness metrics, and detection of optical artifacts such as lens flare, chromatic aberration, or motion blur that could compromise spectral reconstruction accuracy. LiDAR sensor assessment examines point cloud density distribution, range measurement accuracy validation through statistical analysis of neighboring points, detection of multi-path reflections that create false distance measurements, and identification of regions with insufficient point coverage due to surface properties or geometric occlusion.

Thermal sensor quality evaluation analyzes temperature measurement stability through temporal consistency checks, thermal noise characterization using statistical analysis of uniform temperature regions, detection of thermal reflection artifacts that create false temperature readings, and assessment of calibration drift through comparison with reference temperature sources. NIR sensor evaluation includes spectral response validation across the near-infrared range, atmospheric correction verification to account for absorption and scattering effects, reflectance measurement consistency checks through cross-validation with overlapping spectral bands, and detection of saturation or under-exposure conditions that limit measurement dynamic range.

Following detection, the system proceeds to classify the missing data type and severity 1804, implementing a hierarchical classification scheme that categorizes data deficiencies based on their fundamental characteristics, spatial distribution patterns, and potential impact on reconstruction quality. The classification process employs decision tree algorithms that systematically evaluate multiple data quality dimensions to determine the most appropriate compensation strategy for each identified deficiency.

Complete data absence classification identifies regions where sensors provide no usable information due to complete hardware failure, total occlusion, or environmental conditions that prevent data acquisition entirely. This classification triggers cross-modal reconstruction strategies that rely entirely on alternative sensor modalities to provide spectral information for the affected regions. Partial data degradation classification identifies regions where sensors provide corrupted or unreliable information that contains some useful content mixed with artifacts, noise, or systematic errors. This classification enables selective correction approaches that preserve valid data components while replacing or correcting degraded elements.

Systematic noise classification identifies patterns of consistent interference or bias that affect sensor measurements across multiple spatial or temporal regions, such as electromagnetic interference, thermal drift, or calibration errors that introduce predictable distortions. This classification triggers calibration adjustment strategies that apply corrective transformations to compensate for systematic measurement errors while preserving the underlying signal content.

The classification process also evaluates spatial extent characteristics, distinguishing between isolated pixel defects that affect individual measurement points, contiguous region corruption that affects connected spatial areas, and systematic pattern degradation that follows predictable geometric or spectral patterns. Temporal extent analysis categorizes deficiencies as instantaneous events affecting single time frames, persistent problems affecting extended time periods, or intermittent issues that appear and disappear according to environmental or operational conditions.

Based on the classification results, the system applies appropriate compensation strategies using information from other modalities 1806, implementing sophisticated algorithms that leverage the complementary nature of different sensor types to reconstruct missing or corrupted information while maintaining physical plausibility and spectral consistency. The compensation process employs multiple specialized strategies tailored to different types of data deficiencies and available alternative sensor information.

Cross-modal reconstruction for complete data loss utilizes advanced machine learning techniques to predict missing sensor information based on correlated measurements from available modalities. For regions missing RGB information, the system extracts color content from corresponding hyperspectral bands using learned spectral-to-RGB mapping functions derived from extensive training data. The reconstruction employs convolutional neural networks trained on paired hyperspectral-RGB datasets to learn the complex non-linear relationships between spectral signatures and visible color appearance under various illumination conditions.

For areas with degraded LiDAR information, structural geometry is inferred from RGB edge detection combined with thermal discontinuity analysis, using computer vision algorithms that identify depth boundaries based on visual cues and temperature gradients that often correlate with geometric transitions. The reconstruction process implements stereo vision techniques when multiple RGB sensors are available, or monocular depth estimation using deep learning networks trained on RGB-depth paired datasets.

For corrupted thermal data regions, temperature distributions are estimated using material properties identified through NIR spectral analysis combined with environmental context derived from RGB imagery. The compensation employs heat transfer modeling that predicts temperature patterns based on material thermal properties, solar illumination patterns derived from scene geometry, and ambient environmental conditions measured by functional thermal sensors in unaffected regions. Selective correction for partial corruption implements sophisticated filtering and restoration algorithms that distinguish between valid signal content and degradation artifacts within partially corrupted sensor data. The correction process employs statistical analysis to identify noise characteristics, spatial filtering using adaptive algorithms that preserve signal features while suppressing artifacts, and temporal filtering for video sequences that leverages correlation between consecutive frames to identify and correct temporary degradation events.

Noise filtering for degraded data quality utilizes advanced signal processing techniques including Wiener filtering for additive noise suppression, morphological filtering for impulse noise removal, and adaptive filtering algorithms that adjust their characteristics based on local signal and noise statistics. The filtering process employs multi-scale wavelet decomposition to separate signal and noise components at different frequency scales, enabling targeted noise suppression that preserves important signal features while removing degradation artifacts.

Calibration adjustment for systematic sensor errors implements mathematical correction models that compensate for predictable measurement biases and distortions. The adjustment process employs polynomial correction functions for non-linear sensor response characteristics, affine transformations for geometric calibration errors, and lookup table corrections for complex non-parametric systematic distortions that cannot be modeled using simple mathematical functions. Following compensation application, the system calculates confidence estimations for the reconstructed regions 1808, implementing comprehensive reliability assessment algorithms that quantify the uncertainty and expected accuracy of compensated data regions. The confidence estimation process employs multiple statistical and machine learning techniques to provide quantitative measures of reconstruction reliability that can guide downstream processing decisions and inform users about data quality limitations.

Statistical confidence measures are computed using error propagation analysis that traces uncertainty from input sensor measurements through the compensation algorithms to final reconstructed values, employing Monte Carlo simulation techniques that sample from estimated input uncertainty distributions to characterize output uncertainty patterns. Cross-validation confidence assessment compares reconstruction results obtained using different available sensor combinations, computing agreement statistics that indicate consistency between alternative compensation approaches. Machine learning confidence estimation employs neural networks trained to predict reconstruction accuracy based on input data characteristics, compensation strategy employed, and quality metrics of available alternative sensor data. The confidence networks are trained using extensive datasets with ground truth references that enable supervised learning of the complex relationships between input conditions and expected reconstruction quality.

Hierarchical confidence assessment provides uncertainty quantification at multiple spatial scales, computing pixel-level confidence scores for fine-grained quality assessment, region-level confidence measures for spatially coherent areas, and global confidence statistics that characterize overall reconstruction reliability across the entire compensated dataset. The hierarchical approach enables appropriate confidence weighting for different downstream applications that may require different levels of spatial detail or quality assurance.

The final step involves generating visual indicators of reconstruction reliability 1810, creating intuitive visual representations that communicate reconstruction quality and uncertainty information to users and downstream processing systems. The visualization system implements multiple complementary approaches to convey complex quality information in easily interpretable formats. Color-coded overlay generation creates false-color representations where different colors indicate various levels of reconstruction confidence, with green regions representing high-confidence reconstructions based on reliable cross-modal information, yellow regions indicating moderate confidence with some uncertainty due to limited alternative sensor data, and red regions marking low-confidence areas where reconstruction quality may be compromised due to insufficient or poor-quality compensating information.

Transparency gradient visualization implements alpha channel modulation where the opacity of reconstructed regions varies according to confidence levels, allowing users to visually assess reconstruction reliability by observing how clearly reconstructed content appears relative to original sensor data. High-confidence regions appear with full opacity, while low-confidence areas become increasingly transparent to indicate uncertainty. Interactive visualization elements provide user-controllable interfaces that enable detailed examination of reconstruction quality, including hover-over tooltips that display quantitative confidence scores and uncertainty statistics, toggle controls that allow switching between original sensor data and compensated reconstructions, and zoom functionality that enables detailed inspection of specific regions with quality concerns.

Confidence map overlays generate separate visualization layers that can be displayed independently or combined with reconstructed data, providing spatial maps of reconstruction quality that highlight areas requiring additional attention or validation. These maps employ continuous color scales or discrete confidence categories to convey quality information at appropriate levels of detail for different user needs and application requirements. This comprehensive missing data compensation mechanism provides several significant technical advantages over conventional approaches that simply exclude corrupted sensor data or employ basic interpolation techniques. The intelligent detection and classification system enables targeted compensation strategies that are optimized for specific types of data degradation, maximizing reconstruction quality while minimizing computational overhead. The cross-modal compensation leverages the complementary nature of different sensor types to provide robust reconstruction capability even when individual sensors experience significant failures or degradation.

The confidence estimation and visualization components provide essential feedback that enables informed decision-making about reconstruction reliability and appropriate use of compensated data in downstream applications. The hierarchical quality assessment enables appropriate confidence weighting for different processing stages and application requirements, ensuring that uncertainty information is properly propagated through the complete hyperspectral reconstruction pipeline. This comprehensive approach significantly enhances the robustness and reliability of multi-modal hyperspectral reconstruction systems, enabling continued operation and high-quality results even under challenging conditions where individual sensor modalities experience failures or degradation.

Figure 19:
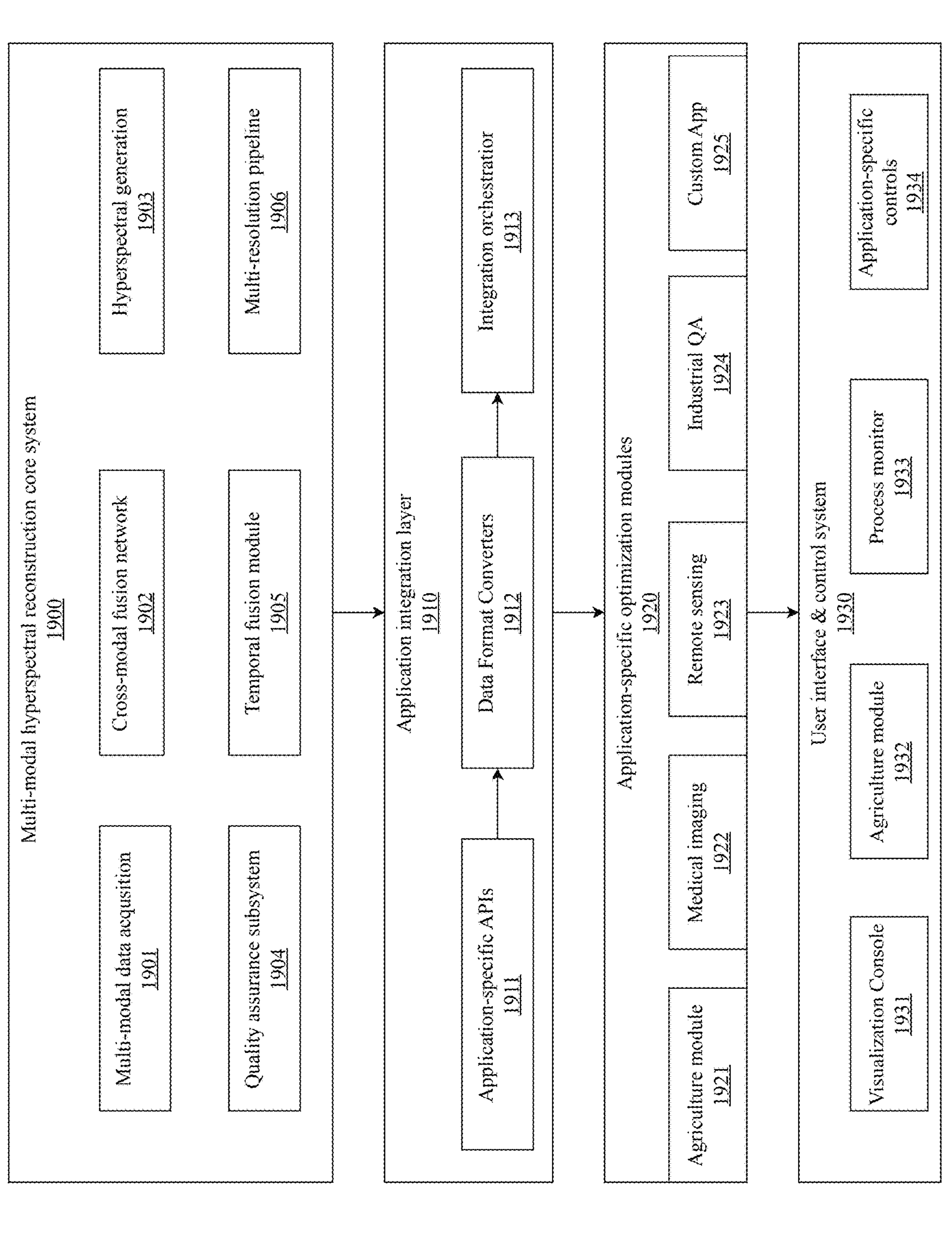
FIG. 19 is a block diagram of an end-to-end system integration with application-specific components, according to an embodiment.

FIG. 19 illustrates the end-to-end system integration with application-specific components, a comprehensive architecture that enables the multi-modal hyperspectral reconstruction technology to serve diverse domain-specific applications while maintaining adaptability, scalability, and centralized control through a layered integration framework that bridges core reconstruction capabilities with specialized application requirements, according to an embodiment. The architecture implements a modular design philosophy that separates core hyperspectral processing functionality from application-specific optimizations, enabling efficient deployment across multiple domains while maintaining consistent reconstruction quality and providing specialized interfaces tailored to unique workflow requirements of different application areas.

At the foundation of the architecture lies the multi-modal hyperspectral reconstruction core system 1900, which encompasses the fundamental processing capabilities that provide high-quality hyperspectral image generation from multi-modal sensor inputs. The core system comprises six essential subsystems that work in coordinated fashion to deliver comprehensive reconstruction functionality. The multi-modal data acquisition module 1901 handles sensor integration, calibration, and synchronization across different sensing modalities including RGB cameras, LiDAR scanners, thermal imagers, and NIR sensors, implementing standardized data acquisition protocols that ensure consistent data quality and temporal alignment regardless of specific sensor hardware configurations.

The cross-modal fusion network 1902 implements sophisticated attention mechanisms and feature integration algorithms that combine information from diverse sensors through learned cross-modal relationships, employing neural network architectures specifically designed to leverage complementary information while mitigating individual sensor limitations. The hyperspectral generation module 1903 performs the core spectral reconstruction and refinement processes, implementing advanced neural networks that map multi-modal sensor inputs to complete hyperspectral representations while maintaining spectral accuracy and spatial consistency.

The quality assurance subsystem 1904 provides comprehensive validation and error correction capabilities that ensure reconstruction accuracy through multi-dimensional quality assessment including spectral consistency analysis, cross-modal validation, noise characterization, and artifact detection. The temporal fusion module 1905 processes video sequences to maintain consistency across frames while adapting to dynamic scene content, implementing motion compensation, temporal filtering, and scene change detection algorithms that optimize reconstruction quality for video applications.

The multi-resolution pipeline 1906 harmonizes inputs from sensors with different spatial resolutions through sophisticated feature pyramid processing that preserves information from all resolution levels while enabling efficient cross-scale information exchange. These core subsystems communicate through high-speed internal data buses and shared memory architectures that minimize latency while maintaining data integrity throughout the processing pipeline.

The core system connects to the application integration layer 1910, which serves as the critical bridge between fundamental reconstruction technology and domain-specific applications by providing standardized interfaces, data transformation capabilities, and workflow orchestration services. The application integration layer implements a service-oriented architecture that enables flexible deployment configurations while maintaining consistent access to core reconstruction capabilities.

The application-specific APIs 1911 provide standardized programming interfaces that enable diverse software applications to access hyperspectral reconstruction services through well-defined function calls and data exchange protocols. These APIs implement RESTful web service architectures that support both synchronous and asynchronous processing modes, enabling integration with existing application workflows while accommodating different performance requirements and computational constraints. The APIs include comprehensive error handling, authentication, and authorization mechanisms that ensure secure and reliable access to reconstruction services.

The data format converters 1912 handle the complex task of translating between different data representations used by various application domains and the standardized formats required by the core reconstruction system. These converters implement bidirectional transformation algorithms that can convert common image formats (JPEG, TIFF, PNG), scientific data formats (HDF5, NetCDF, ENVI), and domain-specific formats (DICOM for medical imaging, GeoTIFF for remote sensing) into the multi-modal data structures required by the reconstruction pipeline. The converters also perform metadata enrichment by extracting relevant information from source data files and mapping it to standardized metadata schemas that preserve application-specific information throughout the processing workflow.

The integration orchestrator 1913 manages complex workflows that coordinate processes between the core reconstruction system and downstream applications, implements task scheduling algorithms that optimize resource utilization while meeting application-specific timing requirements, and provides process monitoring capabilities that track system performance and detect potential issues before they impact application operations. The orchestrator employs workflow definition languages that enable customization of processing pipelines for different application domains while maintaining compatibility with the core reconstruction architecture.

The architecture branches into application-specific optimization modules 1920, which customize the reconstruction process for different domains by implementing specialized algorithms, parameter sets, and quality criteria that optimize performance for specific use cases. These modules represent the domain expertise component of the system, incorporating knowledge about application-specific requirements, performance criteria, and quality standards that enable optimal reconstruction results for each target application area.

The agriculture module 1921 optimizes spectral band selection and processing parameters for crop health analysis, vegetation monitoring, and precision agriculture applications. This module implements spectral vegetation indices calculation including NDVI (Normalized Difference Vegetation Index), SAVI (Soil-Adjusted Vegetation Index), and custom indices specifically designed for different crop types and growth stages. The module incorporates agricultural domain knowledge including crop phenology models, irrigation planning algorithms, and pest detection capabilities that leverage the enhanced spectral information provided by the reconstruction system to deliver actionable insights for farming operations.

The medical imaging module 1922 enhances reconstruction parameters and quality criteria specifically for tissue characterization, diagnostic imaging, and clinical applications where accuracy and reliability are paramount. This module implements medical imaging standards compliance including DICOM integration, patient privacy protection, and clinical workflow compatibility that enables seamless integration with existing medical imaging infrastructure. The module incorporates medical domain expertise including tissue optical properties, pathology detection algorithms, and clinical decision support capabilities that leverage hyperspectral information to enhance diagnostic accuracy and treatment planning.

The remote sensing module 1923 focuses on environmental monitoring, land use classification, and geospatial analysis applications that require large-scale processing capabilities and specialized atmospheric correction algorithms. This module implements geographic information system (GIS) integration capabilities, satellite data processing workflows, and environmental monitoring protocols that enable analysis of large geographic areas using hyperspectral reconstruction techniques. The module incorporates remote sensing domain knowledge including atmospheric correction models, land cover classification algorithms, and change detection capabilities that support environmental monitoring and natural resource management applications.

The industrial quality assurance (QA) module 1924 specializes in defect detection, material verification, and manufacturing quality control applications where precision and repeatability are critical requirements. This module implements statistical process control algorithms, defect classification systems, and material property analysis capabilities that leverage hyperspectral information to detect subtle variations in manufactured products that might not be visible using conventional imaging techniques. The module incorporates industrial domain knowledge including material science principles, manufacturing process models, and quality control standards that enable automated inspection and quality verification in manufacturing environments.

The custom application interface 1925 provides an extension framework and plugin system for developing specialized applications beyond the pre-configured domain modules, enabling organizations to create tailored solutions that address unique requirements not covered by standard application modules. This interface implements a software development kit (SDK) that includes documentation, code examples, and development tools that enable rapid creation of custom applications while maintaining compatibility with the core reconstruction architecture.

The architecture is completed by the user interface and control system 1930, which provides interactive tools for system operation, visualization, and parameter adjustment that enable users to effectively utilize the reconstruction capabilities while maintaining appropriate control over processing parameters and quality settings. The user interface system implements modern web-based technologies that provide cross-platform compatibility and remote access capabilities while maintaining responsive performance for real-time applications.

The visualization console 1931 offers an interactive data explorer that enables users to examine reconstruction results through multiple visualization modes including false-color spectral representations, band-specific imagery, spectral signature plots, and quality assessment overlays. The console implements advanced visualization techniques including multi-dimensional data rendering, interactive spectral analysis tools, and comparison capabilities that enable users to evaluate reconstruction quality and extract meaningful information from hyperspectral datasets. The visualization system supports both two-dimensional image displays and three-dimensional scene reconstruction when depth information is available from LiDAR or stereo imaging systems.

The parameter controls 1932 allow users to adjust reconstruction settings and optimization parameters to achieve optimal results for specific use cases, implementing intuitive interfaces that provide access to critical system parameters while preventing invalid configurations that could compromise reconstruction quality. The controls include preset configurations for common application scenarios, advanced parameter adjustment capabilities for expert users, and automatic parameter optimization algorithms that can adapt system settings based on input data characteristics and desired output quality.

The process monitors 1933 displays real-time status information during reconstruction operations including processing progress indicators, system resource utilization metrics, quality assessment results, and performance statistics that enable users to monitor system operation and identify potential issues. The monitor implements alert systems that notify users of exceptional conditions, performance degradation, or quality issues that require attention, while providing detailed diagnostic information that enables troubleshooting and system optimization.

The application-specific controls 1934 provide domain-optimized interfaces tailored to the unique workflows and requirements of each application area, implementing specialized parameter sets, visualization modes, and analysis tools that are specifically designed for agricultural, medical, remote sensing, or industrial applications. These controls incorporate domain-specific terminology, units of measurement, and analysis procedures that enable domain experts to effectively utilize the system without requiring extensive training on general-purpose hyperspectral imaging techniques.

The architecture incorporates four critical bidirectional feedback pathways that enable continuous optimization and adaptation of system performance based on user feedback and application requirements. Quality feedback from the user interface to the quality assurance subsystem allows for manual quality assessment, correction guidance, and refinement of automatic quality criteria based on user expertise and application-specific requirements. Parameter adjustment feedback from the user interface to the application optimization modules enables fine-tuning of domain-specific parameters based on user experience and changing application requirements.

Performance metrics feedback from the process monitor to the integration layer provides quantitative data on system performance, resource utilization, and processing efficiency that enables automatic optimization of workflow scheduling, resource allocation, and processing strategies. Application requirements feedback from custom applications to the core system communicates evolving domain-specific needs and performance requirements that guide development of new features and optimization strategies for the fundamental reconstruction algorithms.

This comprehensive end-to-end system integration architecture provides several significant advantages over monolithic or loosely integrated approaches to hyperspectral image processing. The layered architecture enables independent optimization of core reconstruction algorithms and application-specific functionality, allowing improvements in either area without requiring modifications to the entire system. The standardized API and data format conversion capabilities enable integration with existing application ecosystems while minimizing the effort required to deploy hyperspectral reconstruction capabilities in new domains.

The modular design philosophy supports scalable deployment configurations ranging from single-user desktop applications to large-scale distributed processing systems that can handle high-volume production workloads. The comprehensive user interface and control systems enable effective utilization by users with varying levels of technical expertise, from domain experts who require specialized analysis tools to general users who need straightforward access to reconstruction capabilities. The bidirectional feedback mechanisms ensure continuous improvement of system performance and adaptation to evolving application requirements, creating a dynamic platform that becomes more effective over time through accumulated usage experience and user feedback.

Detailed Description of Exemplary Aspects

Figure 9:
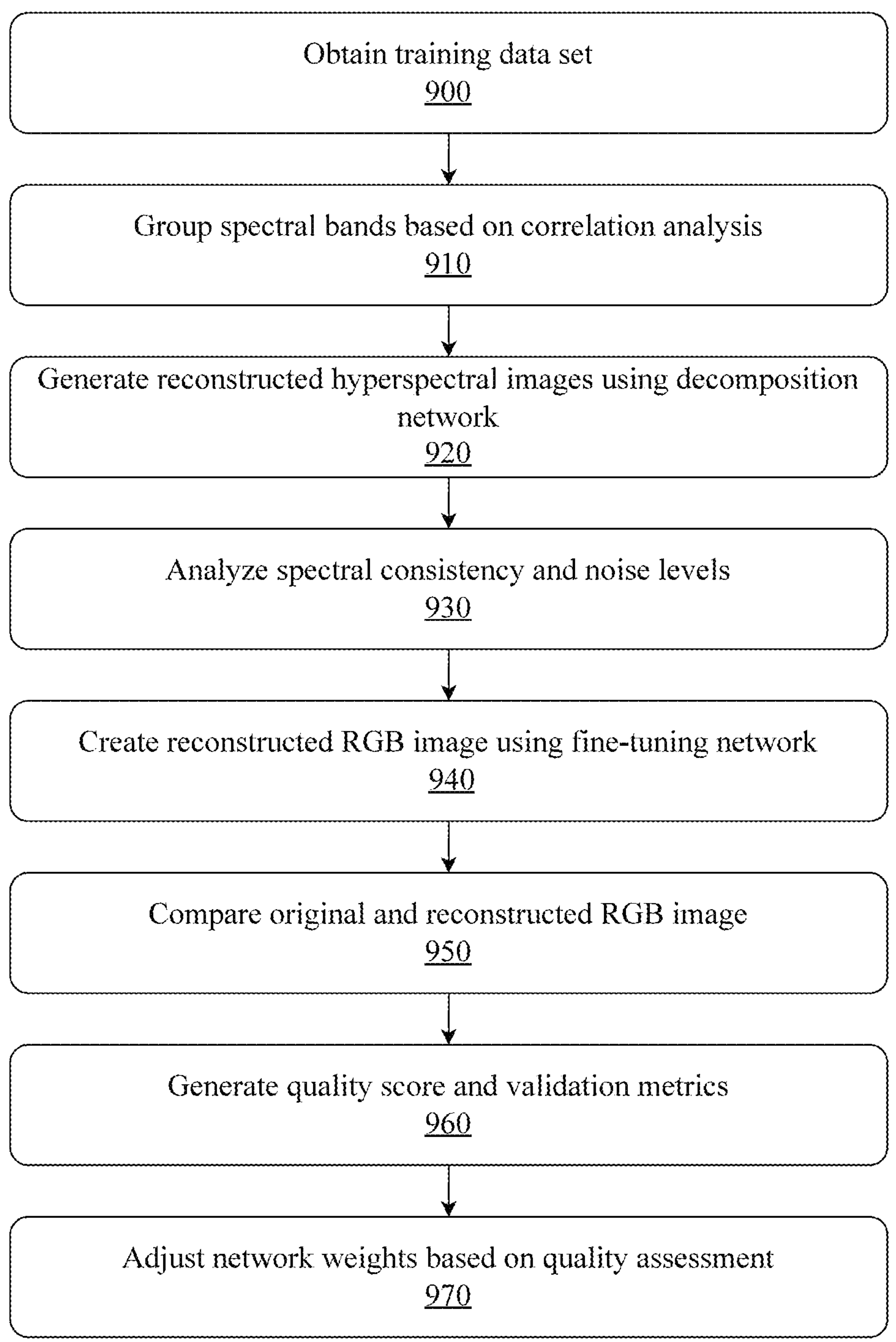
FIG. 9 is a flow diagram illustrating an exemplary method for hyperspectral image generation with quality assurance, according to an embodiment.

FIG. 9 is a flow diagram illustrating an exemplary method for hyperspectral image generation with quality assurance, according to an embodiment. In a first step 900, a training data set is obtained comprising input RGB images and their corresponding hyperspectral images.

The input RGB images may be in various formats, including bayer format which comprises multiple sets of four pixels, where each set includes a red pixel, a blue pixel, and two green pixels.

In a step 910, spectral bands are grouped based on correlation analysis. This step involves computing correlation coefficients between pairs of spectral bands in the training hyperspectral images. The process includes vectorizing two spectral bands and computing their correlation coefficient, which quantifies the degree to which the bands are related. This process is repeated for all hyperspectral images in the training set to derive an averaged correlation matrix. A predetermined grouping threshold is used to determine if spectral bands should be in the same group.

In a step 920, reconstructed hyperspectral images are generated using the decomposition network. This network processes the input RGB image using various convolutional and residual blocks, incorporating the spectral band grouping information to generate a reconstructed hyperspectral image. The network's architecture enables it to learn the complex mapping relationship between RGB images and their corresponding hyperspectral representations. In a step 930, spectral consistency and noise levels are analyzed in the reconstructed hyperspectral image. This analysis includes computing band-to-band correlations to ensure smooth spectral transitions, evaluating the signal-to-noise ratio across different spectral bands, and detecting any artifacts or anomalies in the reconstruction. The analysis provides quantitative measures of the reconstruction quality from a spectral perspective.

In a step 940, a reconstructed RGB image is created using the fine-tuning network. This network processes the reconstructed hyperspectral image through its own set of convolutional and residual blocks to generate an RGB representation. The fine-tuning network serves as both a validation mechanism and a means to improve the quality of the hyperspectral reconstruction. In a step 950, the original and reconstructed RGB images are compared using multiple metrics. This comparison includes pixel-wise differences, structural similarity analysis, and color accuracy evaluation. These comparisons help quantify how well the reconstruction process preserves the original image information through the complete processing pipeline.

In a step 960, quality scores and validation metrics are generated based on the various analyses performed. These metrics combine the spectral consistency measurements, noise level assessments, and RGB comparison results using predetermined weights to create comprehensive quality indicators. The metrics are evaluated against established thresholds to determine if the reconstruction meets quality standards. In a step 970, network weights are adjusted based on the quality assessment results. These adjustments affect both the decomposition network and fine-tuning network, with the adjustments guided by the specific quality metrics that indicate areas needing improvement. This feedback loop enables continuous refinement of the reconstruction process, helping to maintain high-quality output in the generated hyperspectral images.

Figure 10:
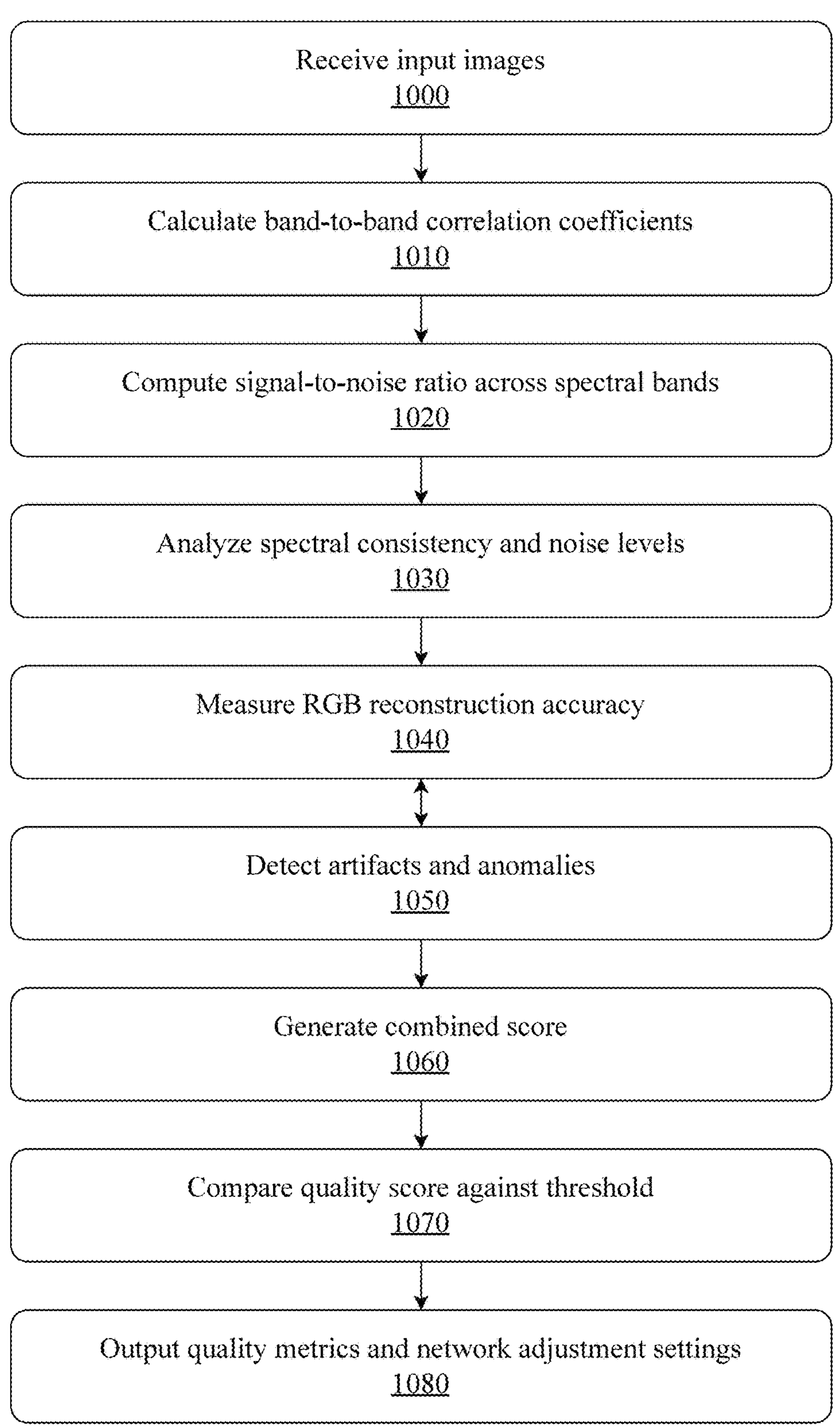
FIG. 10 is a flow diagram illustrating an exemplary method for calculating quality assessment scores for hyperspectral image generation, according to an embodiment.

FIG. 10 is a flow diagram illustrating an exemplary method for calculating quality assessment scores for hyperspectral image generation, according to an embodiment. In a first step 1000, quality assurance subsystem receives the original input RGB image, the reconstructed hyperspectral image generated by the decomposition network, and the reconstructed RGB image produced by the fine-tuning network. The input RGB image serves as the reference for quality assessment, while the reconstructed images represent the outputs to be evaluated.

In a step 1010, band-to-band correlation coefficients are calculated across the spectral bands of the reconstructed hyperspectral image. This calculation involves vectorizing adjacent spectral bands and computing their correlation coefficients. The process quantifies the relationship between neighboring wavelengths and helps identify any discontinuities or anomalies in the spectral reconstruction. The correlation analysis provides a measure of how well the spectral relationships are preserved in the reconstructed hyperspectral image. In a step 1020, the signal-to-noise ratio is computed across the spectral bands of the reconstructed hyperspectral image. This computation involves analyzing the relationship between the desired signal content and unwanted variations or noise in each spectral band. The signal-to-noise ratio provides a quantitative measure of image quality and helps identify bands that may require additional attention during the reconstruction process.

In a step 1030, spectral consistency and noise levels are analyzed using multiple metrics. This analysis examines the smoothness of transitions between spectral bands, evaluates the overall shape of spectral signatures, and assesses the presence of any systematic distortions or artifacts. The analysis helps ensure that the reconstructed hyperspectral image maintains physical validity and consistency across its spectral range. In a step 1040, RGB reconstruction accuracy is measured through multiple comparative analyses. This includes pixel-wise comparison between the original and reconstructed RGB images, evaluation of structural similarity to ensure preservation of image features and patterns, and specific assessment of color accuracy to verify proper reproduction of color relationships and intensities.

In a step 1050, artifacts and anomalies are detected in both the reconstructed hyperspectral image and the reconstructed RGB image. This detection process involves analyzing local variations, identifying unexpected patterns or distortions, and characterizing any reconstruction artifacts that may impact image quality. The process helps ensure the integrity of both spectral and spatial information in the reconstructed images. In a step 1060, a combined quality score is generated by integrating the various quality metrics using predetermined weights. This weighted combination takes into account the relative importance of different quality aspects, including spectral consistency, noise levels, RGB accuracy, and artifact presence. The combined score provides a comprehensive measure of reconstruction quality.

In a step 1070, the generated quality score is compared against predetermined thresholds to determine if the reconstruction meets quality standards. These thresholds are established based on application requirements and desired quality levels. The comparison helps ensure that only reconstructions meeting minimum quality standards are accepted. In a step 1080, quality metrics and network adjustment settings are output. These outputs include both the detailed quality metrics for documentation and specific feedback signals for adjusting the weights of the decomposition and fine-tuning networks. The feedback signals are designed to guide targeted improvements in the reconstruction process, enabling continuous refinement of the system's performance.

Figure 6:
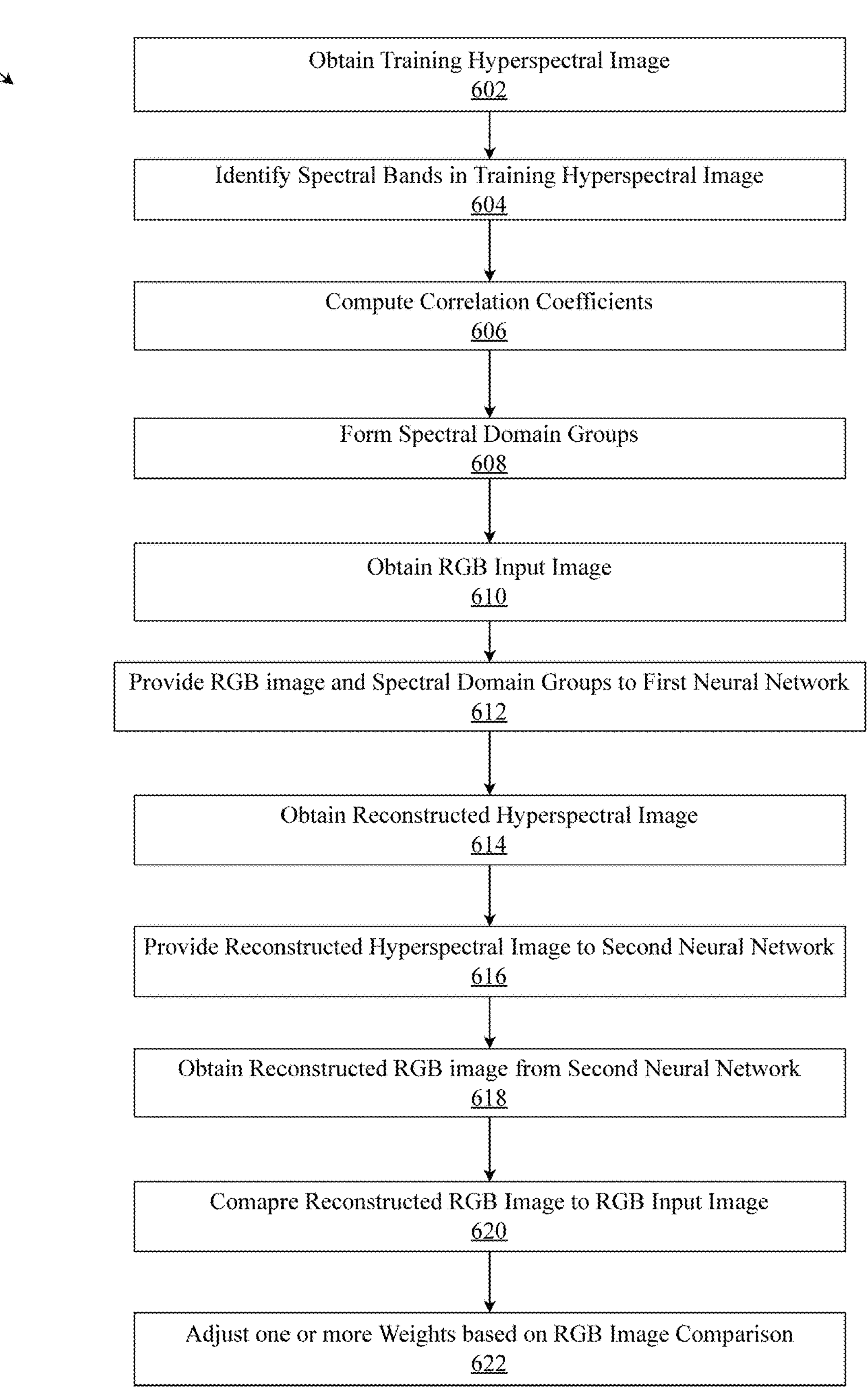
FIG. 6 is a flow diagram illustrating an exemplary method for hyperspectral image generation, according to an embodiment.

FIG. 6 is a flow diagram illustrating an exemplary method 600 for hyperspectral image generation, according to an embodiment. According to the embodiment, the process begins at step 602 where a training hyperspectral image is obtained. At step 604, spectral bands are identified in the training hyperspectral image. In one or more embodiments, the training hyperspectral image can include 20 bands covering a range from 500 nm to 700 nm, where each band is 10 nm wide. Other embodiments can include more or fewer bands, and cover different ranges. At step 606, correlation coefficients amongst pairs of spectral bands are computed. In one or more embodiments, computing correlation coefficients includes vectorizing two spectral bands, and then computing the correlation coefficient of the vector pairs. Embodiments can further include acquiring a correlation matrix with a dimension of L×L, where L is the number of spectral bands in the hyperspectral image used for training. This process can be repeated for all hyperspectral images in the training set, and an averaged correlation matrix can be derived. Based on the averaged correlation matrix, a predetermined grouping threshold can be derived. As an example, in one or more embodiments, a threshold of 0.8 is used as a grouping threshold to determine if spectral bands should be in the same group.

The method 600 continues to step 608 where spectral domain groups are formed based on the grouping threshold previously determined. The method 600 then continues to step 610, where the RGB input image is obtained. The RGB input image is part of the training data set, and corresponds to the training hyperspectral image that was obtained at step 602. At step 612, the RGB input image that was obtained at step 610, and the corresponding training hyperspectral image obtained at step 602, are input to a first neural network. The first neural network can include a decomposition network, such as shown at 106 of FIG. 1. The method 600 continues with obtaining a reconstructed hyperspectral image at step 614, such as reconstructed hyperspectral image 138 as shown in FIG. 1.

The method 600 continues with providing the reconstructed hyperspectral image to a second neural network at step 616. In one or more embodiments, the second neural network can include a fine-tuning network, such as shown at 140 in FIG. 1. The method 600 continues with providing the reconstructed hyperspectral image to the second neural network in step 616. The method 600 then continues with obtaining the reconstructed RGB image from the second network at step 618, followed by comparing the reconstructed RGB image to the RGB input image at step 620. Based on differences between the reconstructed RGB image and the RGB input image, one or more weights corresponding to the first neural network and/or second neural network are adjusted at step 622 to enable the reconstructed RGB image to increase in similarity to the RGB input image. Thus, the fine-tuning network of disclosed embodiments can serve to improve the efficacy of the decomposition network.

Figure 20:
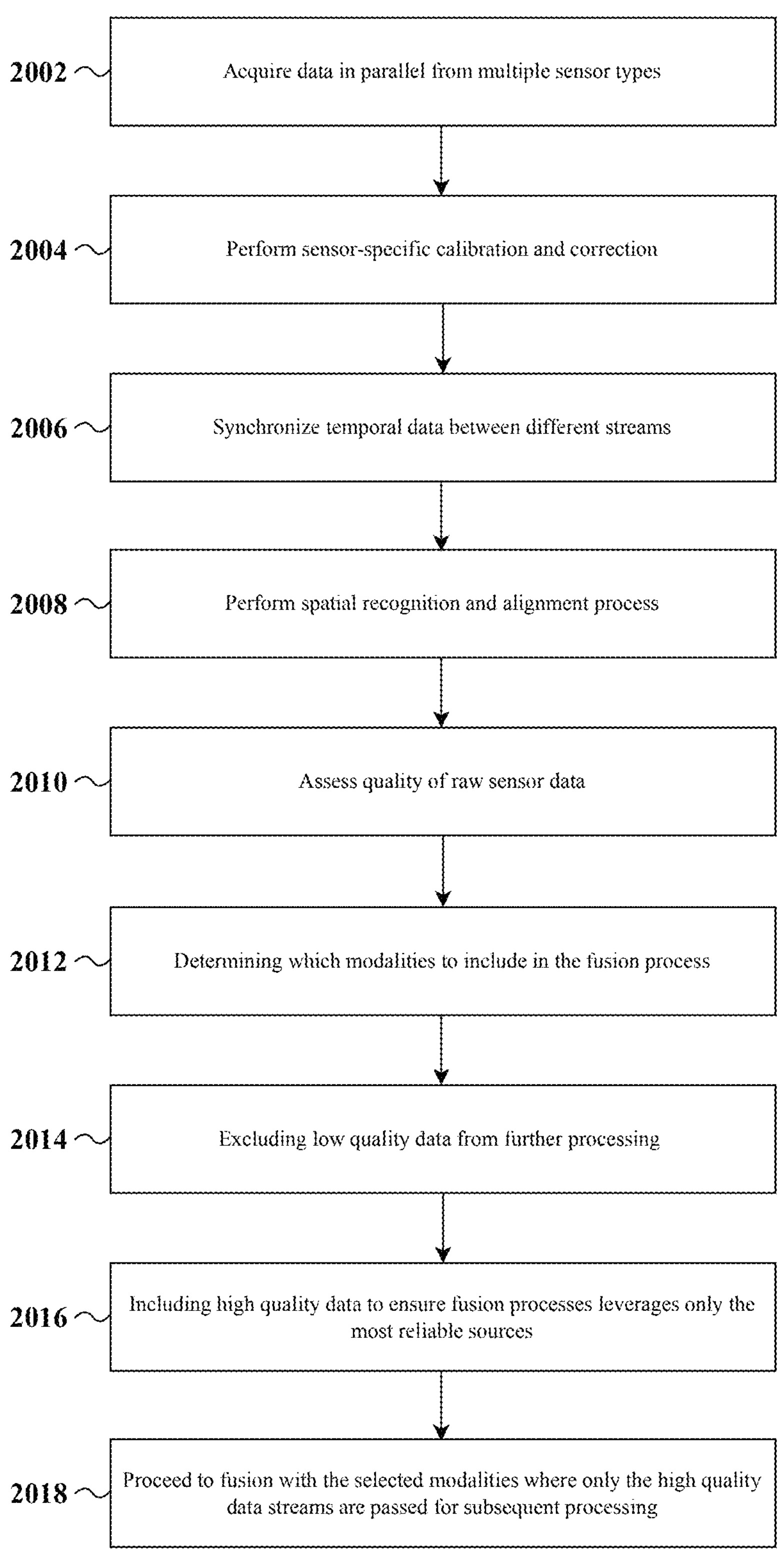
FIG. 20 is a flow diagram illustrating a multi-modal data acquisition and preprocessing method, according to an embodiment.

FIG. 20 illustrates the multi-modal data acquisition and preprocessing method, a sophisticated workflow that addresses the critical initial stages of the hyperspectral reconstruction process when working with diverse sensor types by implementing coordinated acquisition, calibration, synchronization, and quality assessment procedures that transform raw multi-modal sensor data into a unified, high-quality dataset suitable for subsequent hyperspectral reconstruction processing, according to an embodiment. The method establishes a robust foundation for multi-modal processing by ensuring that data from different sensor types is temporally aligned, spatially registered, properly calibrated, and quality-validated before entering the reconstruction pipeline, thereby maximizing the effectiveness of cross-modal fusion while minimizing artifacts and inconsistencies that could compromise reconstruction accuracy.

The method begins with parallel acquisition of data from multiple sensor types 2002, where RGB cameras, LiDAR scanners, thermal imagers, and NIR sensors simultaneously capture information about the same scene to ensure temporal coherence across modalities while maximizing information density available for subsequent processing. The parallel acquisition process implements sophisticated coordination algorithms that manage the timing, synchronization, and resource allocation required to operate multiple sensors concurrently without interference or resource conflicts.

The coordination system employs a master timing controller that generates synchronized trigger signals for all connected sensors, ensuring that data capture occurs at precisely coordinated time intervals that account for individual sensor exposure times, readout delays, and processing latencies. For sensors with different native frame rates, the system implements intelligent frame scheduling that captures data at the highest common temporal resolution while interpolating intermediate frames for slower sensors when necessary to maintain temporal continuity.

Resource management algorithms dynamically allocate computational bandwidth, memory buffers, and communication channels to prevent bottlenecks that could cause data loss or synchronization errors during high-volume acquisition periods. The system implements priority-based resource scheduling that ensures critical sensors receive guaranteed access to system resources while optimizing overall throughput through efficient utilization of available computational capacity.

Multi-sensor interference mitigation employs frequency coordination for sensors that emit electromagnetic radiation, spatial coordination to prevent cross-illumination artifacts between active sensors, and thermal management to prevent heat-generating sensors from affecting temperature-sensitive measurements. The system continuously monitors sensor performance metrics including data rates, signal quality, and synchronization accuracy to detect and correct potential acquisition problems in real-time.

Once acquired, each data stream undergoes sensor-specific calibration and correction procedures 2004, addressing the unique characteristics and limitations of each sensing modality to transform raw sensor readings into physically meaningful measurements that establish a common radiometric and geometric framework across all modalities. The calibration process implements comprehensive correction algorithms tailored to the specific error sources and measurement characteristics of each sensor type.

RGB camera calibration procedures include geometric distortion correction using camera calibration matrices derived from checkerboard pattern analysis, implementing the standard camera calibration model: x_corrected=K[R|t] X_world, where K represents the intrinsic camera matrix, [R|t] represents the extrinsic rotation and translation parameters, and X_world represents world coordinates. Color normalization algorithms compensate for illumination variations and sensor spectral response characteristics using white balance correction, gamma correction, and chromatic adaptation transforms that ensure consistent color representation across different lighting conditions and camera sensors.

Optical aberration correction algorithms compensate for lens distortions including barrel distortion, pincushion distortion, and chromatic aberration using polynomial correction models: $r\_corrected=r(1+k_1r^2+k_2r^4+k_3r^6)$, where r represents the radial distance from the optical center and $k_1$, $k_2$, $k_3$ represent distortion coefficients determined during camera calibration procedures.

LiDAR sensor calibration implements point cloud density normalization algorithms that compensate for distance-dependent measurement density variations, range accuracy calibration using known reference targets at precisely measured distances, and systematic error correction for beam divergence, atmospheric attenuation, and multi-path interference effects. The calibration process employs statistical analysis of point cloud data to identify and correct systematic measurement biases while preserving the geometric accuracy essential for spatial registration with other sensor modalities.

Noise filtering algorithms remove spurious measurements caused by atmospheric particles, reflective surfaces, or sensor electronics noise using statistical outlier detection methods including RANSAC (Random Sample Consensus) algorithms and local neighborhood consistency analysis that preserve valid measurements while eliminating erroneous data points.

Thermal imaging calibration procedures include temperature measurement accuracy calibration using blackbody reference sources at known temperatures, implementing calibration curves that relate sensor digital counts to absolute temperature measurements: $T\_absolute=a_0+a_1\cdot DN+a_2\cdot DN^2+a_3\cdot DN^3$, where DN represents digital number output from the sensor and $a_0$, $a_1$, $a_2$, $a_3$ represent calibration coefficients determined through multi-point calibration procedures.

Emissivity correction algorithms account for surface material properties that affect thermal radiation measurements, implementing lookup tables and adaptive correction algorithms that adjust temperature measurements based on material identification from other sensor modalities. Non-uniformity correction compensates for pixel-to-pixel sensitivity variations across the thermal sensor array using flat-field correction techniques and periodic recalibration procedures.

NIR sensor calibration implements reflectance measurement standardization using calibrated reference panels with known spectral characteristics, atmospheric correction algorithms that compensate for water vapor absorption and aerosol scattering effects using radiative transfer models, and spectral response calibration that ensures accurate measurement of material reflectance properties across the near-infrared spectral range.

The calibrated data streams then undergo temporal synchronization between different data streams 2006, which aligns data temporally despite varying acquisition rates and potential timing offsets between sensors to ensure that data from all modalities represents the same temporal snapshot of the scene. The synchronization process is crucial for accurate fusion, particularly in dynamic environments where even slight temporal misalignments could lead to significant reconstruction errors.

The synchronization system employs high-precision timestamp analysis that examines metadata timestamps associated with each sensor measurement, implementing clock synchronization algorithms that account for systematic timing offsets between different sensor systems and drift correction procedures that compensate for gradual timing variations over extended operation periods.

Frame interpolation techniques generate intermediate data frames for sensors with lower acquisition rates using temporal prediction algorithms that estimate sensor values at arbitrary time points based on surrounding measurements. The interpolation employs motion-compensated prediction that accounts for scene dynamics and sensor movement, ensuring that interpolated data maintains spatial and temporal consistency with actual measurements.

Cross-correlation analysis validates temporal alignment by computing correlation coefficients between corresponding features in different sensor modalities, using the correlation function: $R_{xy}(\tau)=\int x(t)y(t-\tau)dt$, where x(t) and y(t) represent signals from different sensors and τ represents the time delay. The analysis identifies optimal time delays that maximize correlation between sensor measurements, enabling precise temporal alignment even when sensor clocks are not perfectly synchronized.

Adaptive synchronization algorithms continuously monitor temporal alignment quality and automatically adjust synchronization parameters based on changing conditions including sensor performance variations, environmental factors that affect sensor timing, and scene dynamics that influence the effectiveness of different synchronization approaches.

Following temporal alignment, the method performs spatial registration and alignment processing 2008, which addresses the varying spatial resolutions, fields of view, and geometric perspectives inherent to different sensor types by transforming all data into a unified spatial coordinate system that enables accurate pixel-level correspondence between different modalities.

The spatial registration process employs both feature-based and intensity-based registration techniques that accommodate the diverse characteristics of different sensor types. Feature-based registration identifies distinctive landmarks or patterns that are visible across multiple sensor modalities, using algorithms such as SIFT (Scale-Invariant Feature Transform), SURF (Speeded-Up Robust Features), or ORB (Oriented FAST and Rotated BRIEF) to detect keypoints that remain consistent across different imaging modalities despite variations in spectral response, spatial resolution, or measurement characteristics.

The registration algorithm computes geometric transformations that align corresponding features between sensor modalities using transformation models including rigid transformations for sensors with fixed relative positions: $[x'; y']=[\cos(\theta)-\sin(\theta); \sin(\theta)\ \cos(\theta)][x; y]+[tx; ty]$, where θ represents rotation angle and tx, ty represent translation parameters, affine transformations for sensors with perspective differences, and non-rigid transformations for complex geometric relationships between sensor viewpoints.

Intensity-based registration utilizes statistical properties of overlapping image regions to establish spatial correspondence, employing similarity metrics such as normalized cross-correlation, mutual information, and mean squared error to quantify alignment quality between different sensor modalities. The registration optimization employs gradient descent algorithms, genetic algorithms, or simulated annealing to find transformation parameters that maximize similarity metrics while maintaining geometric consistency.

Multi-resolution registration techniques perform alignment at multiple spatial scales, beginning with coarse alignment using downsampled data to establish approximate correspondence, then refining alignment at progressively higher resolutions to achieve sub-pixel accuracy. This hierarchical approach improves computational efficiency while ensuring robust registration even when sensors have significantly different spatial resolutions or fields of view.

With aligned data in hand, the method proceeds to assess the quality of raw sensor data 2010, employing modality-specific metrics to evaluate the reliability of each data source and generate quantitative confidence scores that guide subsequent processing decisions. The quality assessment process implements comprehensive analysis algorithms that examine multiple aspects of data quality including signal characteristics, spatial coverage, temporal consistency, and measurement accuracy.

Signal-to-noise ratio analysis computes SNR metrics for each sensor modality using statistical analysis of measurement variance in regions of expected uniform response, implementing the formula: $SNR=20\cdot\log_{10}(\mu\_signal/\sigma\_noise)$, where μ_signal represents the mean signal level and σ_noise represents the standard deviation of noise measurements. The analysis accounts for sensor-specific noise characteristics including thermal noise in infrared sensors, shot noise in optical sensors, and quantization noise in digital acquisition systems.

Coverage completeness assessment evaluates the spatial and temporal extent of valid measurements from each sensor, identifying regions where sensors fail to provide reliable data due to occlusions, hardware limitations, or environmental conditions. The assessment employs spatial analysis algorithms that compute coverage percentage, identify gaps or missing data regions, and evaluate the distribution uniformity of valid measurements across the sensor field of view.

Feature distinctiveness analysis evaluates the information content provided by each sensor modality by examining the presence of distinctive features, texture patterns, and spatial variations that contribute to reconstruction quality. The analysis employs statistical measures including entropy, gradient magnitude distributions, and frequency domain analysis to quantify the richness of information available from each sensor source.

Cross-modal consistency evaluation compares measurements from different sensors in overlapping spectral ranges or spatial regions to identify potential calibration errors, systematic biases, or measurement inconsistencies that could compromise fusion quality. The evaluation employs correlation analysis, statistical hypothesis testing, and outlier detection algorithms to quantify agreement between sensor measurements and identify potential data quality issues.

The quality assessment results feed into a critical decision point where the method determines which modalities to include in the fusion process 2012, applying adaptive thresholding to the quality scores to make binary decisions for each modality in each spatial region. The decision process employs multi-criteria analysis that considers multiple quality dimensions including signal quality, spatial coverage, temporal consistency, and cross-modal agreement to determine optimal sensor combinations for different regions of the scene.

The decision algorithm implements threshold comparison logic that evaluates each quality metric against predetermined acceptance criteria: if (SNR>SNR_threshold) AND (Coverage>Coverage_threshold) AND (Consistency>Consistency_threshold) then include_modality=true, else include_modality=false. The thresholds are adaptive parameters that can be adjusted based on application requirements, environmental conditions, and available computational resources.

For regions where a modality's quality falls below acceptable thresholds, the method excludes that specific modality from further processing in that region 2014, preventing low-quality data from contaminating the reconstruction while documenting the exclusion for quality assurance purposes. The exclusion process implements spatial masking that identifies excluded regions, temporal tracking that monitors exclusion patterns over time for video sequences, and alternative processing strategies that compensate for missing modalities using enhanced processing of remaining high-quality sensors.

Conversely, regions where modalities demonstrate high-quality data are marked for inclusion 2016, ensuring that the fusion process leverages only the most reliable information sources while maximizing the utilization of available high-quality sensor data. The inclusion process implements confidence weighting that assigns relative importance to different modalities based on their quality scores, spatial prioritization that emphasizes regions with the highest quality data availability, and optimization algorithms that determine optimal sensor combinations for different spatial regions.

The method concludes by proceeding to fusion with the selected modalities 2018, where only the high-quality, well-aligned, and properly calibrated data streams are passed to subsequent multi-modal fusion processing stages. This selective approach significantly enhances the robustness of the hyperspectral reconstruction process by ensuring that only reliable, high-quality sensor data contributes to the final reconstruction while maintaining detailed quality metadata that enables traceability and quality assurance throughout the processing pipeline.

The data packaging for fusion includes standardized data structures that maintain sensor identification, quality scores, spatial registration parameters, and temporal alignment information necessary for subsequent processing stages. Metadata preservation ensures that quality information, calibration parameters, and processing history accompany the data throughout the reconstruction pipeline, enabling quality-aware processing and result validation.

This comprehensive multi-modal data acquisition and preprocessing method provides several significant advantages over conventional single-sensor or loosely coordinated multi-sensor approaches. The coordinated parallel acquisition ensures optimal temporal coherence between sensor modalities while preventing resource conflicts and interference effects that could compromise data quality. The comprehensive calibration and correction procedures establish consistent measurement frameworks across diverse sensor types, enabling effective cross-modal fusion while maintaining measurement accuracy and traceability.

The robust temporal synchronization and spatial registration procedures ensure that multi-modal data represents coherent spatial and temporal snapshots suitable for fusion processing, while the comprehensive quality assessment and adaptive modality selection mechanisms optimize reconstruction quality by leveraging only the most reliable sensor information available for each spatial and temporal region. This systematic approach significantly enhances the effectiveness and reliability of multi-modal hyperspectral reconstruction by providing a robust foundation of high-quality, well-coordinated sensor data that maximizes the benefits of cross-modal information fusion while minimizing artifacts and inconsistencies that could compromise reconstruction accuracy.

Figure 21:
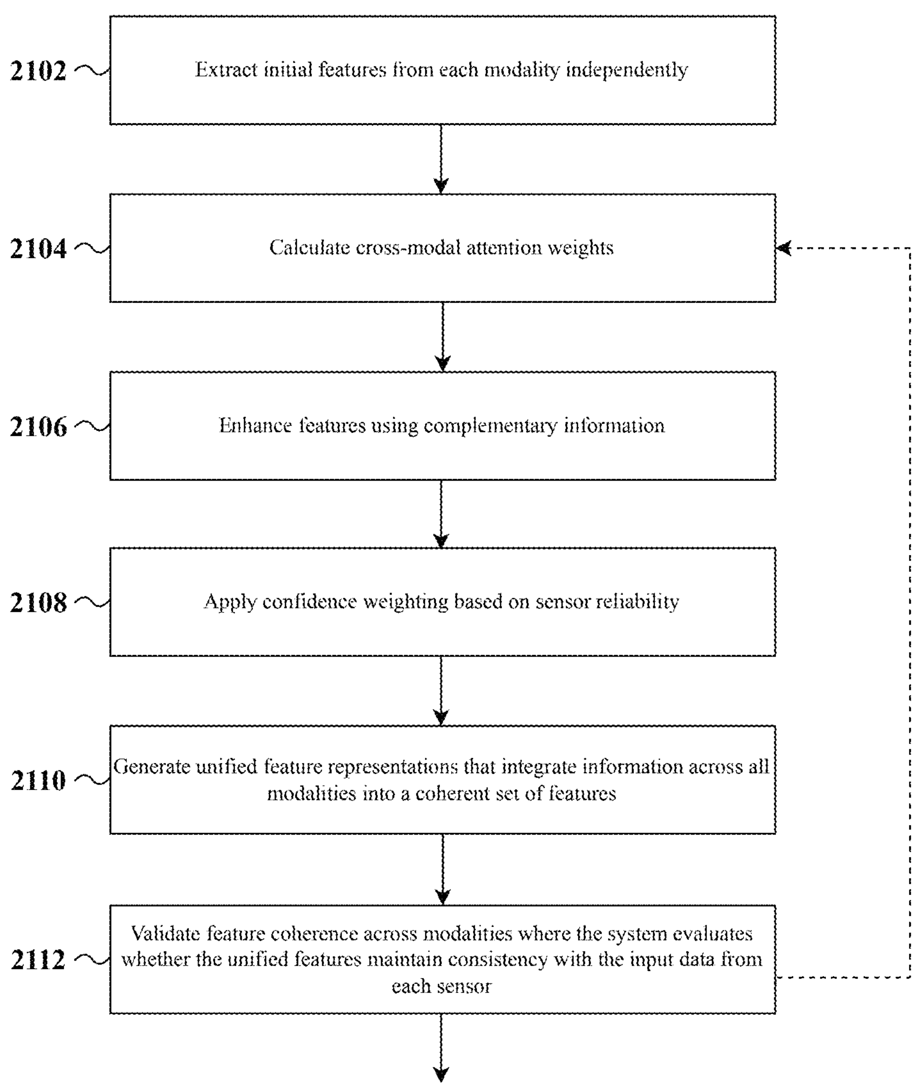
FIG. 21 is a flow diagram of a cross-modal feature extraction method, according to an embodiment.

FIG. 21 illustrates the cross-modal feature extraction method, a sophisticated process that leverages complementary information across different sensing modalities to generate rich, coherent feature representations for hyperspectral image reconstruction by implementing systematic cross-modal interactions, attention-based feature enhancement, and iterative refinement procedures that maximize the utilization of multi-modal sensor information while ensuring consistency and physical plausibility across all sensing modalities, according to an embodiment. The method addresses the fundamental challenge of effectively combining disparate sensor information by establishing learned relationships between different modalities that enable each sensor type to enhance and refine the feature representations derived from other sensors, creating unified feature spaces that capture the full complementary potential of multi-modal sensing while maintaining individual modality strengths.

The method begins by extracting initial features from each modality independently 2102, where specialized neural network encoders process data from each sensor type according to its unique characteristics and information content, establishing baseline feature representations that serve as the foundation for subsequent cross-modal interaction and enhancement procedures. This initial extraction phase implements modality-specific processing architectures that are optimized to capture the most relevant information from each sensor type while preparing the features for effective cross-modal fusion.

RGB feature extraction employs advanced convolutional neural network architectures specifically designed for processing high-resolution color imagery, implementing multi-scale feature extraction through hierarchical convolutional blocks that capture both fine-grained texture details and large-scale structural patterns. The RGB encoder implements residual connections using the architectural pattern: $F\_RGB(x)=x+Conv_2(ReLU(Conv_1(x)))$, where $Conv_1$ and $Conv_2$ represent sequential convolutional operations with different kernel sizes optimized for color and texture feature extraction. The network employs attention mechanisms within the RGB processing pathway to emphasize the most informative spatial regions and color channels, using channel attention: $A\_channel=\sigma(W_2(ReLU(W_1(GAP(F\_RGB)))))$, where GAP represents global average pooling, $W_1$ and $W_2$ represent learnable weight matrices, and σ represents the sigmoid activation function.

LiDAR feature extraction utilizes three-dimensional convolutional networks specifically designed to process point cloud data and extract geometric structural information, implementing 3D convolutions that capture spatial relationships in the depth dimension while preserving geometric accuracy essential for spatial context understanding. The LiDAR encoder employs voxel-based representation conversion that transforms irregular point clouds into regular 3D grids suitable for convolutional processing: $V(i,j,k)=\Sigma^p w\_p\cdot\delta(\lfloor p\_x/v\_x\rfloor-i, \lfloor p\_y/v\_y\rfloor-j, \lfloor p\_z/v\_z\rfloor-k)$, where p represents individual points, w_p represents point weights, v_x, v_y, v_z represent voxel dimensions, and δ represents the Kronecker delta function. The processing implements geometric feature extraction including surface normal estimation, curvature analysis, and local geometric descriptors that capture the three-dimensional structure essential for spatial understanding.

Thermal feature extraction applies specialized convolutional architectures designed for infrared imagery processing, implementing temperature-sensitive feature extraction that emphasizes thermal gradients, boundary detection, and heat signature patterns while compensating for the typically lower spatial resolution of thermal sensors through advanced interpolation and feature enhancement techniques. The thermal encoder implements adaptive filtering that adjusts processing parameters based on temperature range and thermal contrast: $F\_thermal=Conv(AdaptiveFilter(T\_input, \mu\_temp, \sigma\_temp))$, where T_input represents thermal input data, μ_temp and σ_temp represent local temperature statistics, and AdaptiveFilter represents temperature-dependent filtering operations that optimize feature extraction for different thermal conditions.

NIR feature extraction employs spectral processing networks optimized for near-infrared data analysis, implementing spectral convolution operations that capture material-specific reflectance characteristics and spectral signature patterns essential for material identification and classification. The NIR encoder applies spectral attention mechanisms that emphasize the most discriminative wavelength bands: $A\_spectral(\lambda)=softmax(W\_spectral\cdot F\_NIR(\lambda))$, where λ represents wavelength index, W_spectral represents learnable spectral weights, and F_NIR represents NIR feature maps. The processing implements spectral derivative analysis and band ratio computations that enhance material discrimination capabilities while preserving spectral fidelity necessary for accurate hyperspectral reconstruction.

Following initial feature extraction, the method proceeds to calculate cross-modal attention weights 2104, determining how features from one modality should influence the representation of others through sophisticated attention mechanisms that quantify the relevance and complementary nature of information across different sensor types. The attention calculation implements a comprehensive matrix of cross-modal relationships that enables bidirectional information flow between all possible modality pairs.

The cross-modal attention computation implements scaled dot-product attention adapted for multi-modal feature fusion: $Attention(Q\_i, K\_j, V\_j)=softmax(Q\_i\ K\_j\^{}T/\sqrt{d\_k})\ V\_j$, where Q_i represents query features from target modality i, K_j and V_j represent key and value features from source modality j, and d_k represents the key dimension scaling factor. The attention mechanism computes separate attention matrices for each modality pair: A_RGB→LiDAR, A_RGB→Thermal, A_RGB→NIR, A_LiDAR→RGB, A_LIDAR→Thermal, A_LiDAR→NIR, A_Thermal→RGB, A_Thermal→LiDAR, A_Thermal→NIR, A_NIR→RGB, A_NIR→LiDAR, A_NIR→Thermal, creating a comprehensive 4×4 interaction matrix that enables full cross-modal information exchange.

Multi-head attention mechanisms implement parallel attention computations that capture different types of cross-modal relationships: $MultiHead(Q\_i, K\_j, V\_j)=Concat(head_1, head_2, \ldots, \ldots, head\_h)W\^{}O$, where each $head\_k=Attention(Q\_i\ W\_k\^{}Q, K\_j\ W\_k\^{}K, V\_j\ W\_k\^{}V)$ represents independent attention computations with different learned projection matrices W_k^Q, W_k^K, W_k^V that focus on different aspects of cross-modal relationships such as spatial correspondence, spectral similarity, and semantic consistency.

Position-aware attention incorporates spatial location information to ensure that cross-modal attention respects geometric relationships between different sensor measurements: $A\_positional(i,j)=A\_feature(i,j)\cdot\exp(-\|pos\_i-pos\_j\|^2/2\sigma^2)$, where pos_i and pos_j represent spatial positions, σ represents a learned position sensitivity parameter, and A_feature represents the feature-based attention weights. This position-aware mechanism ensures that cross-modal attention focuses on spatially corresponding regions while allowing for appropriate spatial flexibility to accommodate registration uncertainties.

The computed attention weights then guide the feature enhancement process using complementary information 2106, where features from each modality are refined and augmented based on relevant information extracted from other sensor types through learned cross-modal transformation functions that preserve the unique characteristics of each modality while incorporating valuable complementary information from other sensors.

Cross-modal feature enhancement implements attention-weighted feature transformation: $F\_enhanced\_i=F\_original\_i+\Sigma\_j\ A\_i\leftarrow j\cdot Transform\_j\rightarrow i(F\_j)$, where F_original_i represents the original features from modality i, A_i←j represents attention weights from modality j to modality i, Transform_j→i represents learned transformation functions that map features from modality j to the feature space of modality i, and F_j represents features from source modality j. The transformation functions implement learnable neural network layers that adapt cross-modal information to the specific characteristics and requirements of each target modality.

RGB feature enhancement incorporates structural information from LiDAR to improve edge definition and geometric accuracy, thermal information to enhance material boundary detection in challenging lighting conditions, and NIR information to improve material classification and surface property understanding. The RGB enhancement implements depth-guided spatial attention: $F\_RGB\_enhanced=F\_RGB+A\_depth\cdot Conv(Concat(F\_RGB, Depth\_LiDAR))$, where Depth_LiDAR represents depth information projected from LiDAR features and A_depth represents learned depth attention weights.

LiDAR feature enhancement utilizes RGB visual information to improve surface material understanding and texture characterization, thermal information to enhance material property discrimination based on temperature characteristics, and NIR spectral information to provide material-specific reflectance properties that complement geometric measurements. The LiDAR enhancement implements color-guided geometric refinement:

$F\_LiDAR\_enhanced=F\_LiDAR+A\_color\cdot GeometricRefinement(F\_LiDAR, Color\_RGB)$, where Color_RGB represents color information from RGB features and GeometricRefinement represents learned geometric processing functions.

Thermal feature enhancement leverages RGB visual context to improve spatial resolution and boundary definition, LiDAR geometric information to enhance three-dimensional thermal understanding, and NIR material properties to improve emissivity correction and temperature measurement accuracy. The thermal enhancement implements multi-modal temperature refinement: $F\_Thermal\_enhanced=F\_Thermal+A\_spatial\cdot SpatialUpsampling(F\_Thermal, Context\_RGB,LiDAR)$, where Context_RGB,LiDAR represents combined spatial context from RGB and LiDAR modalities.

NIR feature enhancement incorporates RGB visual context for improved spatial understanding, LiDAR geometric information for three-dimensional spectral analysis, and thermal temperature information for enhanced material property characterization through temperature-dependent spectral modeling. The NIR enhancement implements spectral-spatial refinement: $F\_NIR\_enhanced=F\_NIR+A\_spectral\cdot SpectralRefinement(F\_NIR, Spatial\_RGB,LiDAR, Thermal\_context)$, where the refinement combines spectral and spatial information from multiple modalities.

Following feature enhancement, the method applies confidence weighting based on sensor reliability 2108, where the contribution of each modality to the final feature representation is adjusted according to its estimated reliability, data quality, and environmental suitability, ensuring that more reliable sensor information receives greater emphasis while maintaining balanced representation across all available modalities.

Sensor reliability assessment computes confidence scores for each modality based on multiple quality indicators including signal-to-noise ratio analysis, spatial coverage evaluation, temporal consistency assessment, and cross-modal agreement metrics. The reliability computation implements multi-factor confidence scoring: $C\_modality=w\_SNR\cdot SNR\_score+w\_coverage\cdot Coverage\_score+w\_consistency\cdot Consistency\_score+w\_agreement\cdot Agreement\_score$, where w_SNR, w_coverage, w_consistency, w_agreement represent learned weighting coefficients that balance different quality aspects.

Environmental adaptation mechanisms adjust confidence scores based on real-time environmental conditions that affect sensor performance, implementing adaptive weighting that increases thermal sensor confidence in low-light conditions, emphasizes LiDAR information in geometrically complex scenes, prioritizes RGB information in well-illuminated conditions with good color contrast, and enhances NIR weighting when material discrimination is critical for the specific scene content.

Dynamic confidence adjustment implements temporal filtering that tracks sensor performance over time and adapts confidence scores based on historical reliability patterns: $C\_adaptive(t)=\alpha\cdot C\_current(t)+(1-\alpha)\cdot C\_filtered(t-1)$, where a represents an adaptation rate parameter, C_current(t) represents current confidence assessment, and C_filtered(t−1) represents temporally filtered confidence from the previous time step.

The confidence-weighted features are then used to generate unified feature representations 2110 that integrate information across all modalities into coherent feature spaces specifically optimized for hyperspectral reconstruction while preserving the most relevant aspects of each individual modality and maintaining consistent representation quality across different spatial regions and imaging conditions.

Unified feature generation implements confidence-weighted feature concatenation: $F\_unified=[C\_RGB\cdot F\_RGB\_enhanced, C\_LiDAR\cdot F\_LiDAR\_enhanced, C\_Thermal\cdot F\_Thermal\_enhanced, C\_NIR\cdot F\_NIR\_enhanced]$, where C_modality represents confidence weights and F_modality_enhanced represents enhanced features from each modality. The concatenation preserves modality-specific information while enabling cross-modal feature interactions through subsequent processing layers.

Dimensionality reduction applies learned projection matrices that compress the high-dimensional concatenated features into compact representations optimized for hyperspectral reconstruction: $F\_compact=W\_projection\cdot F\_unified+b\_projection$, where W_projection and b_projection represent learned transformation parameters that preserve the most reconstruction-relevant information while reducing computational complexity and memory requirements.

Feature normalization ensures consistent representation scales across different modalities and spatial regions: $F\_normalized=(F\_compact-\mu\_features)/\sigma\_features$, where μ_features and σ_features represent learned or computed normalization parameters that standardize feature distributions while preserving relative feature relationships essential for reconstruction quality.

Cross-modal consistency enforcement implements regularization terms that encourage coherent feature representations across different modalities: $L\_consistency=>\_i,j\|Similarity(F\_i, F\_j)-Expected\_similarity(modality\_i, modality\_j)\|^2$, where Similarity represents learned similarity functions and Expected_similarity represents prior knowledge about modality relationships.

The final step involves validating feature coherence across modalities 2112, ensuring that the unified features maintain consistency with the input data from each sensor while exhibiting the cross-modal enhancements expected from the fusion process, and implementing iterative refinement procedures that adjust feature representations when inconsistencies or quality issues are detected.

Feature coherence validation implements multiple consistency checks including reconstruction error analysis that verifies whether the unified features can accurately reconstruct the original input data from each modality: $E\_reconstruction=>\_modality\|F\_modality-Reconstruct(F\_unified)\|^2$, where Reconstruct represents learned reconstruction functions that map unified features back to individual modality feature spaces.

Physical plausibility validation ensures that cross-modal feature relationships respect known physical principles and sensor characteristics: $V\_physical=CheckPhysical(F\_RGB, F\_LiDAR, F\_Thermal, F\_NIR)$, where CheckPhysical implements validation functions that verify consistency with electromagnetic radiation principles, geometric relationships, and material property constraints.

Cross-modal agreement assessment quantifies the consistency of enhanced features with expectations based on known sensor relationships: $A\_agreement=>\_i,j\ Correlation(F\_enhanced\_i, Expected\_i(F\_j))$, where Expected_i(F_j) represents predicted features for modality i based on features from modality j using learned or physics-based prediction models.

Statistical consistency validation examines feature distributions and statistical properties to identify anomalies or inconsistencies that might indicate processing errors: S_consistency=KL_divergence(P_features, P_expected)+Jensen_Shannon(P_cross_modal, P_reference), where KL_divergence and Jensen_Shannon represent statistical distance measures between actual and expected feature distributions.

If coherence validation identifies inconsistencies exceeding predetermined thresholds, the method implements iterative refinement by returning to the attention weight calculation step 2104 with adjusted parameters and refined attention mechanisms. The refinement process implements gradient-based optimization that adjusts attention weights to minimize inconsistency measures: W_attention_new=W_attention_old-$\eta \cdot \nabla$_W(L_inconsistency), where $\eta$ represents a learning rate parameter and L_inconsistency represents the total inconsistency loss combining reconstruction error, physical plausibility, cross-modal agreement, and statistical consistency measures.

Convergence criteria determine when the iterative refinement process should terminate based on consistency improvement rates, maximum iteration limits, and quality threshold satisfaction: Converged=($\Delta$Consistency<$\varepsilon$_convergence) OR (Iterations>Max_iterations) OR (Quality>Threshold_acceptable), where $\varepsilon$_convergence represents a small consistency improvement threshold indicating convergence.

When coherence validation passes all consistency checks or convergence criteria are met, the method outputs the validated unified features that represent optimal cross-modal feature representations incorporating complementary information from all available sensor modalities while maintaining consistency with physical principles and sensor characteristics.

This comprehensive Cross-modal Feature Extraction Method provides several significant advantages over conventional single-modality feature extraction or simple feature concatenation approaches. The systematic cross-modal attention mechanisms enable intelligent information sharing between sensor modalities that maximizes the utilization of complementary information while preserving the unique strengths of each sensor type. The confidence-based weighting ensures that feature representations adapt to varying sensor reliability and environmental conditions, maintaining consistent reconstruction quality across diverse imaging scenarios.

The iterative refinement and validation procedures ensure that cross-modal feature representations maintain consistency with physical principles and sensor characteristics while achieving optimal cross-modal enhancement, preventing artifacts or inconsistencies that could compromise reconstruction accuracy. The unified feature generation creates comprehensive representations that enable superior hyperspectral reconstruction compared to single-modality approaches while maintaining computational efficiency through optimized dimensionality reduction and feature normalization procedures. This systematic approach significantly enhances the effectiveness of multi-modal hyperspectral reconstruction by providing robust, coherent, and information-rich feature representations that fully leverage the complementary potential of diverse sensor modalities.

Figure 22:
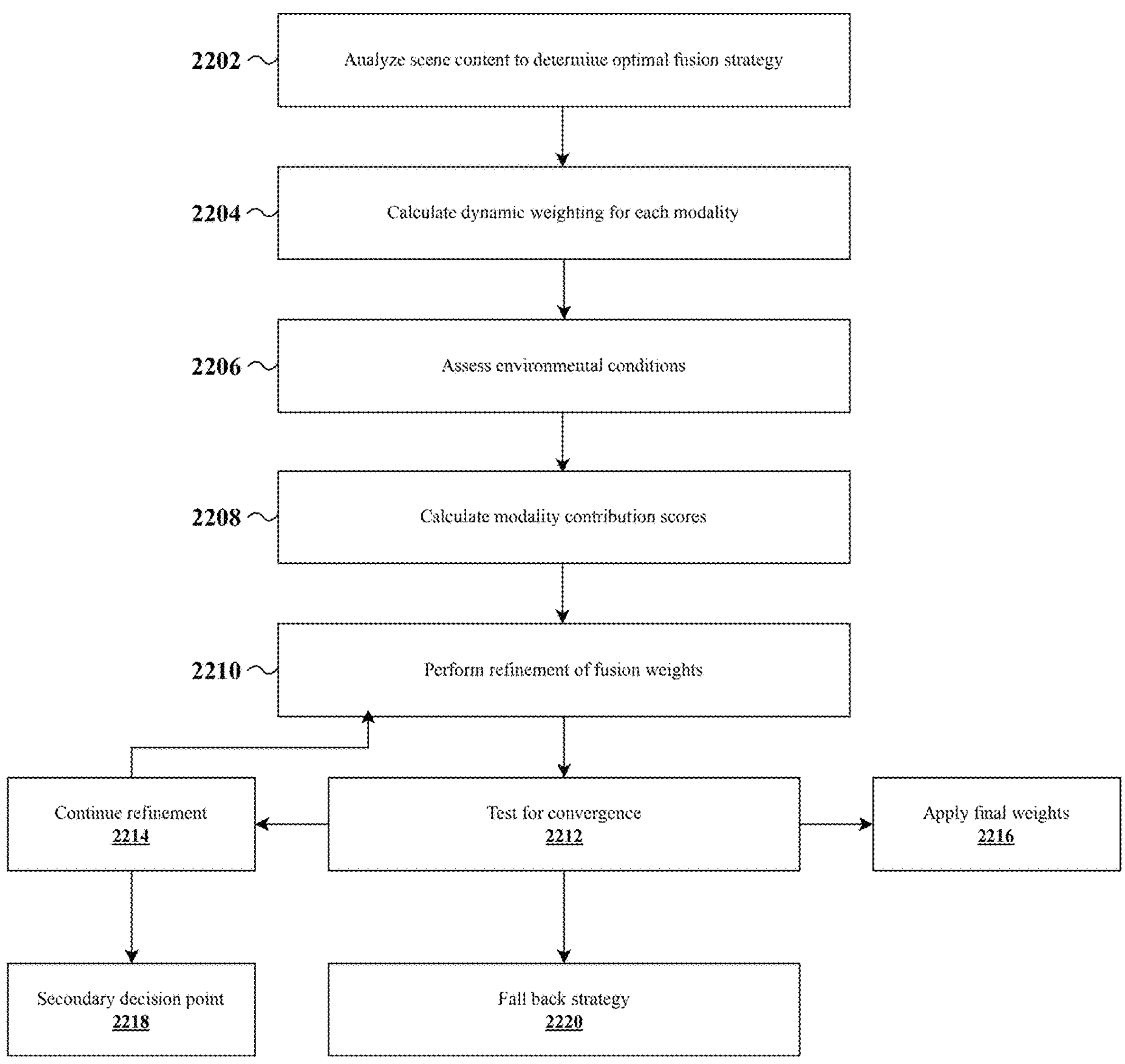
FIG. 22 is a flow diagram of an adaptive fusion algorithm with dynamic weighting, according to an embodiment.

FIG. 22 illustrates the adaptive fusion algorithm flow, a sophisticated iterative process that dynamically optimizes the combination of multi-modal sensor data based on real-time analysis of scene characteristics and environmental conditions by implementing intelligent scene understanding, dynamic weight calculation, environmental adaptation, and iterative refinement procedures that continuously improve fusion quality through gradient-based optimization while providing robust fallback mechanisms for challenging scenarios where optimal convergence cannot be achieved, according to an embodiment. The algorithm represents a significant advancement over static fusion approaches by automatically adapting fusion parameters to maximize reconstruction quality for each unique combination of scene content, environmental conditions, and sensor availability, ensuring optimal performance across diverse operational scenarios while maintaining computational efficiency and system stability.

The algorithm begins by analyzing scene content to determine the optimal fusion strategy 2202, employing advanced computer vision and machine learning techniques to classify scene characteristics, identify key objects and materials, and assess the complexity of spatial and spectral features that influence the effectiveness of different sensor modalities for hyperspectral reconstruction. The scene analysis process provides essential context information that guides subsequent fusion parameter optimization by establishing expectations for sensor performance and information content under the specific conditions encountered.

Scene classification algorithms implement hierarchical content analysis that categorizes scenes across multiple dimensions including indoor versus outdoor environments, urban versus natural settings, static versus dynamic content, and simple versus complex spatial arrangements. The classification employs convolutional neural networks trained on diverse scene datasets: Scene_class=argmax(CNN_classifier(RGB_input)), where CNN_classifier represents a pre-trained scene classification network that outputs probability distributions across predefined scene categories, enabling the system to select fusion strategies optimized for specific environmental contexts.

Object detection and material identification utilize advanced computer vision algorithms including YOLO (You Only Look Once) object detection, semantic segmentation networks, and material classification systems that identify key scene elements affecting sensor performance: Objects=YOLO_detector(RGB_input), Materials=Material_classifier(Multi_modal_features), where the detected objects and materials provide context for predicting which sensor modalities will be most effective for different spatial regions within the scene.

Complexity assessment algorithms analyze spatial frequency content, texture variation, edge density, and spectral diversity to quantify scene complexity factors that influence reconstruction difficulty: Complexity_spatial=$\Sigma|\nabla I|^2+\Sigma|\nabla^2 I|$, Complexity_spectral=Entropy(Spectral_features), where $\nabla I$ represents spatial gradients, $\nabla^2 I$ represents second-order derivatives indicating edge complexity, and Entropy quantifies spectral information content. These complexity measures guide the allocation of computational resources and the selection of fusion strategies appropriate for different levels of scene difficulty.

Illumination analysis evaluates lighting conditions including light source direction, intensity uniformity, color temperature, and shadow patterns that significantly affect the performance of different sensor modalities: Illumination_params=Analyze_lighting(RGB_input, Temporal_sequence), where the analysis considers both instantaneous lighting conditions and temporal variations that affect sensor reliability and information quality.

Based on the scene understanding, the algorithm proceeds to calculate dynamic weighting for each modality 2204, computing initial weights that reflect the expected contribution of each sensor type to reconstruction quality under the identified scene conditions. The dynamic weighting process employs learned mappings between scene characteristics and modality effectiveness derived from extensive training on diverse datasets that establish relationships between environmental conditions and optimal sensor utilization patterns.

Initial weight calculation implements multi-criteria decision analysis that considers scene-specific factors: W_initial_modality=f(Scene_type, Lighting_conditions, Material_complexity, Spatial_features), where f represents learned mapping functions trained on datasets correlating scene characteristics with optimal modality weights. The mapping functions employ neural networks or gradient boosting algorithms that capture complex non-linear relationships between scene parameters and sensor effectiveness.

Modality effectiveness prediction utilizes historical performance data and physics-based models to estimate expected information quality from each sensor under current conditions: Effectiveness_RGB=g(Illumination, Contrast, Texture_density), Effectiveness_LiDAR=h(Surface_geometry, Reflectance_properties, Range_conditions), Effectiveness_Thermal=i(Temperature_contrast, Emissivity_variation, Atmospheric_conditions), Effectiveness_NIR=j(Material_types, Spectral_diversity, Atmospheric_transmission), where g, h, i, j represent sensor-specific effectiveness prediction functions calibrated using extensive validation datasets.

Priority weighting algorithms combine effectiveness predictions with application-specific requirements to generate initial modality weights: W_modality=α·Effectiveness_modality+β·Application_priority_modality+γ·Resource_availability_modality, where α, β, γ represent learned balancing coefficients that optimize the trade-off between reconstruction quality, computational efficiency, and application-specific requirements.

The algorithm then assesses environmental conditions 2206, evaluating factors that affect sensor performance including ambient lighting levels, weather conditions, atmospheric visibility, and electromagnetic interference levels that influence the reliability and information content available from different sensor modalities. Environmental assessment provides critical context for adjusting fusion parameters to compensate for adverse conditions that could compromise reconstruction quality.

Lighting condition analysis implements comprehensive illumination assessment including ambient light level measurement using photometric analysis of RGB imagery: Light_level=Mean(Luminance_channel)+Std(Luminance_channel), where the mean provides average illumination and standard deviation indicates lighting uniformity. Color temperature analysis determines the spectral characteristics of illumination sources: Color_temp=Estimate_CCT(RGB_white_balance_coefficients), where CCT represents correlated color temperature that affects color accuracy and sensor calibration requirements.

Weather condition assessment analyzes atmospheric clarity, precipitation effects, and visibility conditions that impact sensor performance: Weather_conditions=Classify_weather (RGB_temporal_sequence, Thermal_atmospheric), where classification algorithms identify clear, hazy, rainy, or foggy conditions that differently affect various sensor modalities. Atmospheric visibility estimation quantifies the effective range and clarity for different sensing modalities: Visibility_range=Estimate_visibility (Contrast_attenuation, Distance_markers), where contrast attenuation analysis determines how atmospheric conditions reduce sensor effectiveness at different distances.

Electromagnetic interference detection monitors the electromagnetic environment for sources of interference that could affect sensor measurements: EMI_level=Analyze_EMI(Sensor_noise_characteristics, Frequency_spectrum), where noise analysis identifies systematic interference patterns that might compromise data quality from specific sensor types.

Environmental impact assessment quantifies how current conditions affect each sensor modality: Impact_modality=Environmental_impact_function (Weather, Lighting, EMI, Temperature), where impact functions are calibrated based on extensive characterization of sensor performance under various environmental conditions.

Using the environmental assessment, the algorithm calculates modality contribution scores 2208, quantifying the expected reliability and information content of each sensor under current conditions by combining initial effectiveness predictions with environmental correction factors. The contribution scoring process generates quantitative measures that guide dynamic weight adjustment and optimization procedures.

Reliability scoring combines sensor-specific performance metrics with environmental factors: Reliability_modality=Base_reliability_modality×Environmental_correction_factor_modality×Calibration_confidence_modality, where base reliability represents intrinsic sensor characteristics, environmental correction adjusts for current conditions, and calibration confidence accounts for sensor maintenance and calibration status.

Information content quantification estimates the expected contribution of each modality to reconstruction quality: Information_content_modality=Mutual_information(Sensor_data_modality, Target_spectral_bands)×Quality_weight_modality, where mutual information measures the statistical dependence between sensor measurements and target reconstruction outputs, providing quantitative estimates of reconstruction relevance.

Contribution score integration combines reliability and information content measures: Contribution_score_modality=w_reliability×Reliability_modality+w_information×Information_content_modality+w_computational×Computational_efficiency_modality, where w_reliability, w_information, w_computational represent learned weighting coefficients that balance different aspects of modality contribution based on application requirements and system constraints.

Dynamic weight calculation updates initial weights based on contribution scores: W_dynamic_modality=W_initial_modality×Contribution_score_modality/Σ_all_modalities(Contribution_score_modality), where normalization ensures that weights sum to unity while preserving relative contribution relationships.

The algorithm then performs iterative refinement of fusion weights 2210, employing gradient-based optimization techniques that continuously adjust fusion parameters to maximize reconstruction quality metrics while monitoring convergence indicators and quality improvement rates. The iterative refinement process represents the core optimization component that enables adaptive fusion performance superior to static parameter approaches.

Gradient-based weight optimization implements backpropagation-style parameter updates: W_new=W_old−η×∇_W(Loss_reconstruction+λ×Regularization_term), where η represents the learning rate, ∇_W represents gradients of the loss function with respect to fusion weights, Loss_reconstruction quantifies reconstruction quality, and Regularization_term prevents overfitting or extreme weight values that could compromise robustness.

Quality metric computation evaluates intermediate reconstruction results using multiple assessment criteria: Quality_total=w_spectral×Quality_spectral+w_spatial×Quality_spatial+w_consistency×Quality_consistency+w_efficiency×Quality_efficiency, where individual quality components assess different aspects of reconstruction performance including spectral accuracy, spatial fidelity, cross-modal consistency, and computational efficiency.

Reconstruction quality assessment implements comprehensive evaluation including spectral similarity measures: Quality_spectral=SSIM(Reconstructed_spectrum, Reference_spectrum)+PSNR(Reconstructed_spectrum, Reference_spectrum), spatial quality evaluation: Quality_spatial=Edge_preservation_metric+Texture_consistency_metric, and cross-modal consistency assessment: Quality_consistency=Correlation (RGB_reconstructed, RGB_original)×Correlation (Cross_modal_features).

Gradient computation employs automatic differentiation or finite difference methods to calculate parameter sensitivities: ∇_W_i=∂Quality_total/∂W_i≈(Quality(W_i+ε)−Quality (W_i−ε))/(2ε), where & represents a small perturbation value used for numerical gradient estimation when analytical gradients are not available.

Adaptive learning rate adjustment modifies optimization step sizes based on convergence behavior: η_new=η_old×Learning_rate_scheduler(Iteration, Quality_improvement_rate, Gradient_magnitude), where the scheduler implements decay schedules, momentum terms, or adaptive methods like Adam optimization that improve convergence reliability and speed.

Following each optimization iteration, the algorithm tests for convergence 2212 by evaluating multiple convergence criteria including quality improvement rates, parameter stability, gradient magnitudes, and iteration limits that indicate when optimization should terminate. The convergence testing process ensures that optimization concludes when further iterations would not provide significant quality improvements while preventing infinite loops in challenging optimization scenarios.

Convergence criteria evaluation implements multiple termination conditions: Converged=(|Quality_new−Quality_old|<ε_quality) AND(||W_new−W_old||<ε_weights) AND (||∇_W||<ε_gradients), where ε_quality, ε_weights, ε_gradients represent convergence thresholds for quality improvement, weight stability, and gradient magnitude respectively.

Quality improvement rate analysis tracks the rate of quality enhancement over recent iterations: Improvement_rate=(Quality_current−Quality_history)/Iteration_window, where Quality_history represents quality metrics from previous iterations and Iteration_window defines the temporal scope for rate calculation. Declining improvement rates indicate approaching convergence.

Parameter stability assessment monitors weight variation patterns: Stability_metric=Std(W_recent_iterations)/Mean (W_recent_iterations), where standard deviation relative to mean weight values quantifies parameter stability across recent optimization iterations.

Oscillation detection identifies potential optimization instabilities: Oscillation_detected=Detect_cycles(Quality_history, Weight_history), where cycle detection algorithms identify repetitive patterns in optimization trajectories that indicate instability requiring learning rate reduction or alternative optimization strategies.

If convergence criteria are not satisfied, the algorithm continues refinement 2214, returning to the iterative weight optimization process with updated parameters and potentially modified optimization strategies based on convergence analysis results. The continuation process implements adaptive strategies that modify optimization behavior based on observed convergence characteristics.

Optimization strategy adaptation modifies refinement approaches based on convergence difficulties: if (Slow_convergence_detected) then Reduce_learning_rate( ); if (Oscillation_detected) then Apply_momentum_damping( ); if (Gradient_explosion_detected) then Implement_gradient_clipping( ) where adaptive modifications address specific convergence challenges encountered during optimization.

Parameter perturbation strategies introduce controlled randomization to escape local optima: W_perturbed=W_current+Random_perturbation×Perturbation_magnitude, where perturbation magnitude is calibrated based on optimization progress and convergence difficulty.

When convergence is achieved within iteration limits, the algorithm applies the final optimized weights 2216 to perform actual multi-modal fusion using the carefully tuned parameters that maximize reconstruction quality for the specific scene and environmental conditions. The final weight application represents the culmination of the adaptive optimization process.

Final weight validation ensures that optimized parameters remain within acceptable bounds: W_final=Clamp(W_optimized, W_min, W_max), where clamping prevents extreme weight values that could compromise system stability or violate physical constraints.

Weight normalization ensures mathematical consistency: W_normalized=W_final/ΣW_final, maintaining unit sum constraint while preserving relative weight relationships determined through optimization.

Quality assurance verification performs final reconstruction quality assessment: Final_quality=Comprehensive_quality_assessment(Reconstruction_with_final_weights), documenting achieved quality levels and optimization effectiveness.

However, to prevent infinite optimization loops, the algorithm includes safeguards that check whether maximum iterations have been reached at a secondary decision point 2218. When iteration limits are exceeded without achieving convergence, the system transitions to fallback strategies that ensure reasonable fusion results even when optimal convergence cannot be achieved.

Maximum iteration detection implements simple counting logic: if (Current_iteration>=Max_iterations) then Trigger_fallback_strategy( ), where Max_iterations represents a predetermined limit based on computational constraints and application timing requirements.

Iteration limit calibration adapts maximum iteration values based on scene complexity and available computational resources: Max_iterations_adaptive=Base_max_iterations×Complexity_factor×Resource_availability_factor, where adaptive limits provide more optimization time for complex scenes while respecting computational constraints.

Progress assessment evaluates optimization effectiveness even when convergence is not achieved: Progress_score=(Quality_current−Quality_initial)/(Quality_theoretical_maximum−Quality_initial), where theoretical maximum estimates the best possible quality achievable under current conditions.

When maximum iterations are exceeded, the algorithm applies fallback strategy 2220, implementing conservative fusion approaches that provide reasonable reconstruction quality using predetermined parameter sets, simplified optimization methods, or robust default configurations that have been validated across diverse scenarios.

Fallback strategy selection chooses appropriate recovery methods: if (Partial_convergence_achieved) then Use_best_weights_found( ); else if (Scene_classification_successful) then Apply_scene_specific_defaults( ); else Apply_universal_conservative_weights( ), where strategy selection is based on optimization progress and available scene information.

Conservative weight calculation implements robust parameter sets: W_conservative=Conservative_weight_function(Scene_type, Environmental_conditions, Available_modalities), where conservative functions provide stable fusion parameters that may not be optimal but ensure acceptable reconstruction quality across diverse conditions.

Quality estimation for fallback results provides performance expectations: Estimated_quality_fallback=Predict_quality(W_conservative, Scene_characteristics, Environmental_conditions), where quality prediction helps users understand expected performance when fallback strategies are employed.

Error logging and diagnostic information capture optimization difficulties: Log_optimization_failure(Scene_description, Environmental_conditions, Convergence_metrics, Final_weights), where comprehensive logging enables system improvement and failure analysis for future algorithm enhancement.

This comprehensive adaptive fusion algorithm provides several significant advantages over static fusion approaches and simple parameter adjustment methods. The intelligent scene analysis and environmental assessment enable fusion parameter optimization that is specifically tailored to current conditions, maximizing reconstruction quality while adapting to changing sensor performance and environmental factors. The iterative refinement process with gradient-based optimization enables continuous improvement of fusion parameters that would be impossible to achieve through manual tuning or simple heuristic approaches.

The robust convergence testing and fallback strategies ensure system reliability and prevent optimization failures from compromising reconstruction quality, while the comprehensive quality assessment and parameter validation procedures maintain consistent performance across diverse operational scenarios. The adaptive learning rate adjustment and optimization strategy modification enable the algorithm to handle challenging optimization landscapes while maintaining computational efficiency and convergence reliability. This systematic approach significantly enhances the effectiveness and robustness of multi-modal hyperspectral reconstruction by providing intelligent, adaptive fusion capabilities that continuously optimize system performance based on real-time analysis of scene characteristics and environmental conditions.

Figure 23:
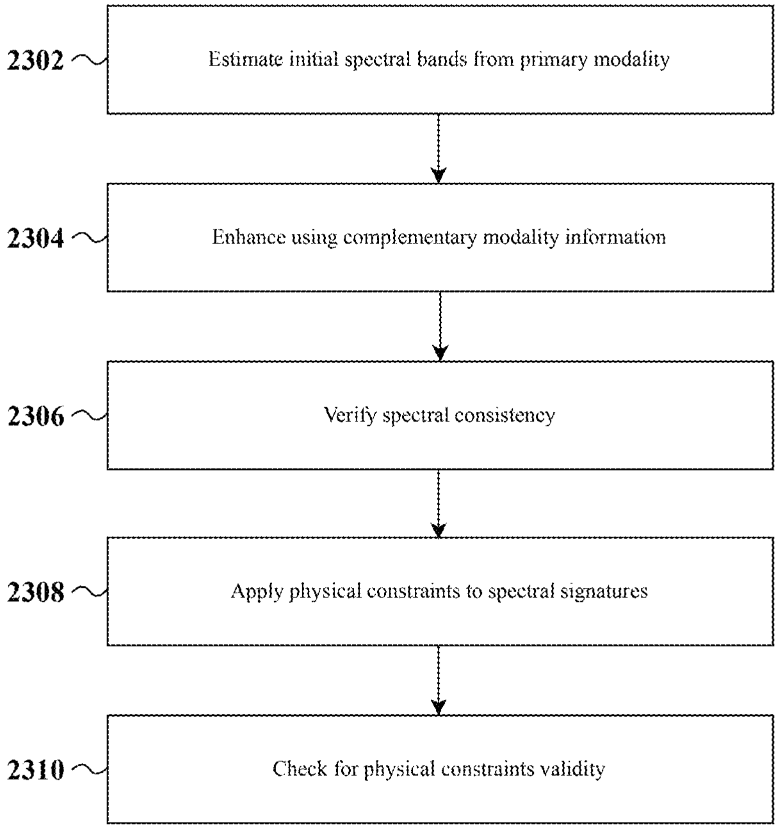
FIG. 23 is a flow diagram of a multi-modal hyperspectral reconstruction process, according to an embodiment.

FIG. 23 illustrates a multi-modal hyperspectral reconstruction process, a comprehensive method that systematically transforms multi-modal sensor data into high-quality hyperspectral images through iterative refinement and rigorous validation procedures by implementing initial spectral estimation, multi-modal enhancement, consistency verification, physical constraint enforcement, and iterative optimization techniques that ensure both spectral accuracy and physical plausibility while maintaining computational efficiency and reconstruction reliability across diverse imaging conditions, according to an embodiment. The process represents a significant advancement in hyperspectral reconstruction by providing a systematic framework that leverages complementary information from multiple sensor modalities while enforcing physical constraints and quality standards that ensure the reconstructed hyperspectral images maintain both scientific accuracy and practical utility for downstream applications.

The reconstruction process begins by estimating initial spectral bands from the primary modality 2302, typically using the highest-quality or most spectrally rich sensor data available to establish a foundation of spectral measurements that serves as the baseline for subsequent enhancement and refinement procedures. The initial estimation process employs sophisticated neural network architectures and spectral mapping algorithms that have been trained to establish relationships between primary sensor measurements and target hyperspectral band values based on extensive datasets of paired sensor and hyperspectral measurements.

Primary modality selection implements intelligent sensor prioritization based on spectral coverage, spatial resolution, signal quality, and information content assessment: Primary_modality=argmax(Spectral_coverage_i×Spatial_resolution_i×Signal_quality_i×Information_content_i), where each factor is normalized and weighted according to the specific reconstruction requirements and available sensor characteristics. The selection process considers both static sensor properties and dynamic quality assessments that account for current environmental conditions and sensor performance.

Neural network spectral mapping employs deep learning architectures specifically designed for spectral reconstruction, implementing encoder-decoder networks that learn complex non-linear relationships between primary sensor measurements and hyperspectral band values: Spectral_initial=SpectraNet(Primary_sensor_data, Spatial_context, Environmental_parameters), where SpectraNet represents a trained neural network that incorporates spatial context information and environmental parameters to improve reconstruction accuracy and reduce artifacts.

The neural network architecture implements residual connections and attention mechanisms optimized for spectral reconstruction: F_spectral(x)=x+ResidualBlock(AttentionLayer(ConvLayer(x))), where ResidualBlock enables gradient flow through deep networks, AttentionLayer focuses on the most relevant spectral features, and ConvLayer processes spatial and spectral information simultaneously to preserve both spatial and spectral relationships.

Baseline spectral profile generation creates initial hyperspectral representations across all target spectral bands using interpolation, extrapolation, and learned mapping functions: Spectral_profile_initial($\lambda$)=Interpolate(Known_bands)+Extrapolate(Spectral_model)+Neural prediction(Primary_data), where $\lambda$ represents wavelength, interpolation fills gaps between known spectral measurements, extrapolation extends coverage beyond measured ranges, and neural prediction provides spectral estimates based on learned sensor-to-hyperspectral relationships.

Initial quality assessment evaluates the reliability and expected accuracy of baseline spectral estimates using multiple quality metrics: Quality_initial=w_coverage×Coverage_metric+w_accuracy×Accuracy_estimate+w_consistency×Consistency_score, where coverage quantifies spectral band completeness, accuracy estimates expected reconstruction fidelity, and consistency measures spectral signature plausibility based on material property databases.

Following initial estimation, the process enhances these estimates using complementary modality information 2304, where data from secondary sensors such as LiDAR, thermal, and NIR sources are used to refine and augment the preliminary spectral bands through sophisticated cross-modal fusion algorithms that leverage the unique information content of each sensor modality to improve overall reconstruction quality and spatial consistency.

Cross-modal information integration implements attention-based fusion mechanisms that selectively incorporate relevant information from each secondary modality: Enhanced_spectral=Initial_spectral+Σ_modalities A_modality×Enhancement_modality, where A_modality represents learned attention weights that determine the contribution of each modality to spectral enhancement, and Enhancement_modality represents modality-specific enhancement contributions computed through specialized processing networks.

LiDAR structural enhancement utilizes three-dimensional geometric information to improve spectral reconstruction in regions with complex geometry, shadow patterns, or geometric occlusion: Enhancement_LiDAR=GeometricRefinement (Spectral_initial, Depth_information, Surface_normals, Geometric_context), where geometric refinement algorithms account for surface orientation, shadowing effects, and three-dimensional spatial relationships that influence spectral measurements and reconstruction accuracy.

Thermal material property enhancement leverages temperature information to improve spectral reconstruction through temperature-dependent spectral modeling and emissivity correction: Enhancement_thermal=TemperatureSpectralModel(Spectral_initial, Temperature_data, Material_classification, Emissivity_correction), where temperature-spectral models incorporate known relationships between material temperature and spectral emission characteristics to refine reconstruction accuracy, particularly in the infrared spectral range.

NIR spectral extension utilizes near-infrared measurements to enhance spectral reconstruction beyond the visible range and improve material discrimination capabilities: Enhancement_NIR=SpectralExtension(Spectral_initial, NIR_measurements, Material_properties, Atmospheric_correction), where spectral extension algorithms use NIR data to refine material identification and extend spectral coverage into wavelength ranges not directly measured by primary sensors.

Multi-modal spatial alignment ensures that enhancement information from different modalities is spatially consistent with the primary spectral reconstruction: Aligned_enhancement=SpatialAlignment(Enhancement_modalities, Spatial_registration_parameters, Confidence_maps), where spatial alignment algorithms account for viewpoint differences, resolution variations, and geometric distortions between different sensor modalities.

The enhanced spectral estimates then undergo spectral consistency verification 2306, ensuring that the reconstructed hyperspectral signatures conform to known physical principles and material properties through comprehensive analysis of spectral relationships, smoothness characteristics, and adherence to established spectral signature libraries and physical constraints.

Band-to-band correlation analysis evaluates the relationships between adjacent spectral bands to ensure smooth spectral transitions and physically plausible spectral signatures: Correlation_analysis=Σ_bands Correlation(Band_i, Band_{i+1})×Smoothness_weight(λ_i, λ_{i+1}), where correlation coefficients quantify the relationships between neighboring spectral bands and smoothness weights emphasize the importance of smooth transitions based on wavelength separation and expected material properties.

Spectral smoothness assessment implements derivative analysis and gradient-based smoothness metrics: Smoothness_metric=Σ_λ|$d^2S(\lambda)/d\lambda^2$|+Penalty_function (Discontinuities), where the second derivative quantifies spectral curvature, discontinuity penalties identify abrupt spectral transitions that may indicate reconstruction artifacts, and the combined metric provides quantitative assessment of spectral signature plausibility.

Material signature validation compares reconstructed spectral profiles against established spectral libraries and material property databases: Validation_score=max_materials Similarity(Reconstructed_spectrum, Library_spectrum_material)×Material_probability(Scene_context), where similarity measures quantify the agreement between reconstructed and reference spectra, material probability accounts for the likelihood of specific materials appearing in the current scene context, and the maximum operation identifies the best material match.

Physical plausibility assessment ensures that spectral signatures conform to fundamental electromagnetic and thermodynamic principles: Plausibility_check=EnergyConservation(Spectrum)×ReflectanceBounds(Spectrum)×ThermodynamicConsistency (Spectrum, Temperature), where energy conservation verifies that total reflected and absorbed energy does not exceed incident energy, reflectance bounds ensure that reflectance values remain within physically realistic ranges (0-100%), and thermodynamic consistency verifies that spectral emission characteristics align with measured temperature data.

Consistency threshold evaluation determines whether spectral signatures meet quality standards: Consistency_passed=(Correlation_score>Threshold_correlation) AND (Smoothness_score>Threshold_smoothness) AND (Validation_score>Threshold_validation) AND (Plausibility_score>Threshold_plausibility), where multiple thresholds ensure comprehensive quality assessment across different aspects of spectral signature validity.

If consistency verification identifies signatures that do not meet established criteria, the process performs iterative refinement 2308, adjusting reconstruction parameters and re-processing the multi-modal data to improve spectral coherence through gradient-based optimization algorithms that modify feature fusion weights, cross-modal attention mechanisms, and spectral mapping parameters based on specific inconsistencies identified during the validation process.

Gradient-based spectral optimization implements parameter adjustment strategies that target specific consistency deficiencies: Parameters_new=Parameters_old−η×∇_Parameters(Loss_consistency+Loss_reconstruction+Loss_regularization), where n represents the learning rate, Loss_consistency quantifies spectral consistency violations, Loss_reconstruction measures reconstruction accuracy relative to input sensor data, and Loss_regularization prevents overfitting and maintains parameter stability.

Inconsistency-specific refinement adapts optimization strategies based on the types of consistency violations detected: if (Correlation_deficiency) then Enhance_spectral_smoothing( ); if (Validation_failure) then Adjust_material_classification ( ) if (Plausibility_violation) then Enforce_physical_constraints( ) where targeted refinement addresses specific quality issues through specialized optimization procedures.

Attention mechanism adjustment modifies cross-modal attention weights to improve spectral consistency: Attention_weights_new=Attention_weights_old+Learning_rate×∇_Attention(Consistency_loss), where attention gradients guide the adjustment of fusion parameters to emphasize sensor modalities that contribute to improved spectral consistency while reducing the influence of modalities that introduce artifacts or inconsistencies.

Convergence monitoring tracks the effectiveness of iterative refinement: Convergence_metric=|Consistency_score_new−Consistency_score_old|+|Parameters_change|, where convergence is achieved when consistency improvements and parameter changes fall below predetermined thresholds, indicating that further refinement iterations would not provide significant quality improvements.

Maximum iteration safeguards prevent infinite refinement loops: if (Iterations>Max_iterations) OR (Convergence_achieved) then Proceed_to_validation( ); else Continue_refinement( ), where iteration limits ensure computational efficiency while convergence criteria ensure adequate reconstruction quality.

Following iterative refinement, the process validates physical constraints of the spectral signatures 2310, ensuring that the reconstructed spectra conform to fundamental physical laws including energy conservation, thermodynamic consistency, and material property bounds that govern electromagnetic radiation interactions with matter.

Reflectance bounds validation ensures that all spectral reflectance values remain within physically realistic ranges: Reflectance_valid=ALL($0 \leq R(\lambda) \leq 1.0$) for all wavelengths λ, where R(λ) represents spectral reflectance at wavelength 2, and bound violations indicate reconstruction errors that require correction through constraint enforcement algorithms.

Energy conservation verification ensures that the total energy balance of reflected, absorbed, and transmitted radiation remains physically consistent: Energy_balance=$\int(R(\lambda)+A(\lambda)+T(\lambda))I(\lambda)d\lambda \leq \int I(\lambda)d\lambda$, where R(λ), A(λ), T(λ) represent reflectance, absorptance, and transmittance respectively, I(λ) represents incident illumination, and the integral constraint ensures that output energy does not exceed input energy.

Material property consistency validates that reconstructed spectral signatures align with known material characteristics: Material_consistency=Validate_material_properties (Reconstructed_spectrum, Temperature_data, Geometric_context, Environmental_conditions), where validation algorithms compare spectral signatures against material property databases while accounting for environmental factors that affect material appearance and spectral characteristics.

Thermodynamic constraint enforcement ensures that spectral emission characteristics conform to Planck's law and other thermodynamic principles: Thermodynamic_valid=Validate_Planck_distribution(Thermal_emission_spectrum, Temperature)×Validate_Stefan_Boltzmann(Total_emission, Temperature), where validation functions verify that thermal emission spectra conform to established physical relationships between temperature and electromagnetic radiation.

Physical constraint violation detection identifies specific constraint failures: Violations=Detect_bound_violations (Reflectance)+Detect_energy_violations(Energy_balance)+ Detect_material_violations(Material_consistency)+ Detect_thermodynamic_violations(Thermodynamic_constraints), where violation detection algorithms identify specific physical inconsistencies that require correction.

If physical constraints are found to be invalid, indicating that the constraint restrictions have created unrealistic spectral profiles, the process adjusts the constraint parameters, relaxing overly restrictive bounds or modifying constraint weights to achieve a better balance between physical plausibility and reconstruction accuracy, then returns to reapply the modified constraints to ensure both physical validity and reconstruction quality.

Constraint parameter adjustment implements adaptive constraint relaxation: Constraint_parameters_new=Constraint_parameters_old× Relaxation_factor(Violation_severity, Reconstruction_quality), where relaxation factors are computed based on the severity of constraint violations and the impact of constraint enforcement on overall reconstruction quality, enabling dynamic balance between physical plausibility and reconstruction fidelity.

Iterative constraint enforcement applies modified constraints with updated parameters: Apply_modified_constraints(Spectral_signatures, Constraint_parameters_new), where constraint application algorithms enforce physical bounds while allowing appropriate flexibility based on reconstruction requirements and data quality considerations.

Constraint convergence assessment determines when appropriate constraint parameters have been identified: Constraint_converged=(Physical_validity_achieved) AND (Reconstruction_quality_maintained), where convergence criteria ensure that both physical plausibility and reconstruction accuracy requirements are satisfied simultaneously.

When physical constraints are validated as appropriate, the process generates the final spectral profile, producing a complete hyperspectral image that combines complementary information from all available modalities while maintaining both spectral consistency and physical plausibility through comprehensive normalization, metadata integration, and quality documentation procedures.

Spectral normalization ensures consistent units and dynamic ranges across all spectral bands: Normalized_spectrum (λ)=(Raw_spectrum(λ)−Min_value)/(Max_value−Min_value)×Scale_factor+Offset_value, where normalization parameters are determined based on target application requirements and standard spectral data formats to ensure compatibility with downstream processing and analysis applications.

Spatial smoothing eliminates remaining artifacts while preserving important spectral features: Smoothed_spectrum=SpatialFilter(Normalized_spectrum, Smoothing_kernel, Preservation_mask), where spatial filtering algorithms apply appropriate smoothing to reduce noise and artifacts while preservation masks protect important spectral features such as absorption lines, emission peaks, and material boundaries from excessive smoothing.

Metadata integration documents confidence levels, source contributions, processing parameters, and quality metrics for each reconstructed spectral band: Metadata={Confidence_scores, Modality_contributions, Processing_parameters, Quality_metrics, Calibration_information, Environmental_conditions}, where comprehensive metadata enables traceability, quality assessment, and appropriate utilization of reconstructed hyperspectral data in downstream applications.

Quality documentation provides quantitative assessment of reconstruction performance: Quality_report=Generate_quality_report(Spectral_accuracy, Spatial_consistency, Physical_plausibility, Cross_modal_agreement, Computational_efficiency), where quality reports enable users to assess reconstruction reliability and make informed decisions about data utilization for specific applications.

Output format standardization ensures compatibility with standard hyperspectral data formats and analysis software: Standardized_output=Format_conversion(Final_spectral_profile, Target_format, Metadata, Quality_information), where format conversion algorithms generate outputs compatible with common hyperspectral analysis tools and data standards while preserving all essential spectral, spatial, and quality information.

This comprehensive multi-modal hyperspectral reconstruction process provides several significant technical advantages over conventional single-modality reconstruction approaches and simple sensor fusion techniques. The systematic integration of multiple sensor modalities through attention-based fusion mechanisms enables superior reconstruction quality by leveraging complementary information sources while mitigating individual sensor limitations through cross-modal enhancement and validation procedures.

The iterative refinement and physical constraint enforcement ensure that reconstructed hyperspectral images maintain both spectral accuracy and physical plausibility, preventing artifacts and inconsistencies that could compromise scientific validity or downstream application performance. The comprehensive quality assessment and validation procedures provide quantitative measures of reconstruction reliability that enable appropriate utilization of reconstructed data across diverse application domains.

The adaptive constraint adjustment mechanisms enable optimal balance between physical plausibility and reconstruction fidelity, ensuring that constraint enforcement enhances rather than compromises reconstruction quality while maintaining scientific validity. The systematic metadata integration and quality documentation provide essential information for data interpretation, analysis, and integration with existing hyperspectral analysis workflows and applications. This comprehensive approach significantly enhances the effectiveness and reliability of hyperspectral image reconstruction by providing a robust framework that combines the complementary strengths of multiple sensor modalities while maintaining rigorous quality standards and physical consistency throughout the reconstruction process.

Figure 24:
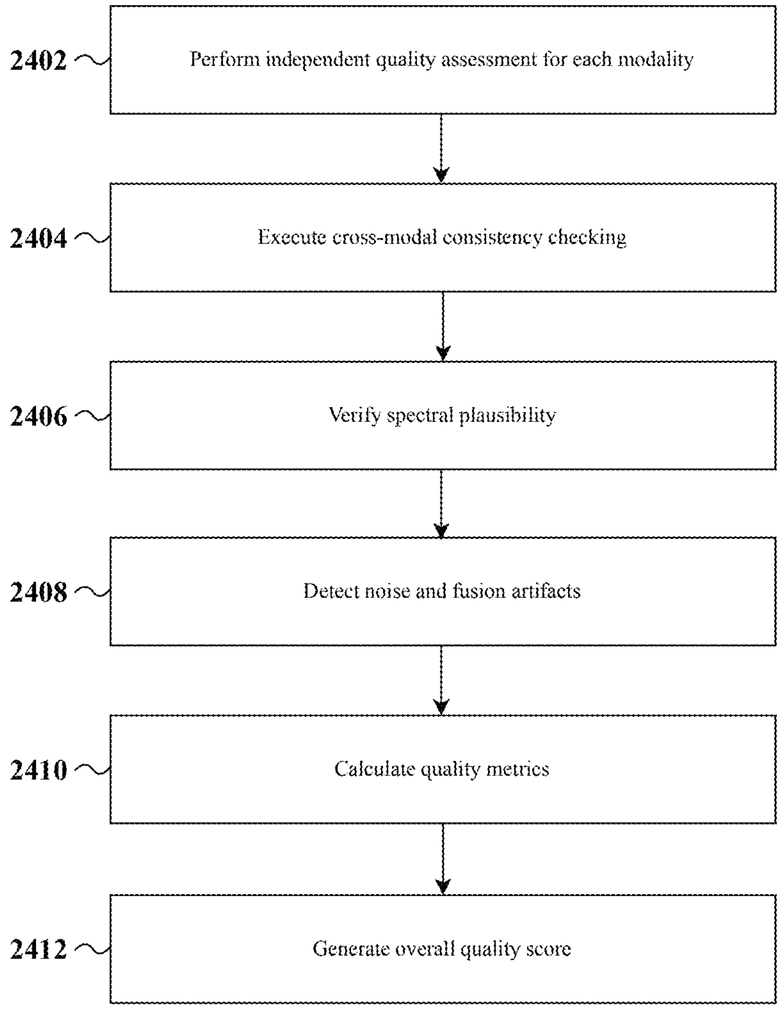
FIG. 24 is a flow diagram of a multi-modal quality assurance workflow, according to an embodiment.

FIG. 24 illustrates the multi-modal quality assurance workflow, a comprehensive evaluation framework that systematically assesses the quality of hyperspectral reconstruction results through multiple complementary analysis approaches before accepting or rejecting the final output. The workflow begins by performing independent quality assessment for each modality 2402, where RGB, LiDAR, thermal, and NIR data streams are evaluated separately using modality-specific quality metrics that account for the unique characteristics and potential failure modes of each sensor type. RGB assessments focus on color accuracy, spatial resolution preservation, and freedom from visual artifacts; LiDAR evaluations examine point cloud density, depth accuracy, and geometric consistency; thermal assessments verify temperature measurement accuracy and thermal gradient preservation; and NIR evaluations check spectral signature fidelity and material discrimination capability. These parallel assessments provide baseline quality scores for each input modality, establishing the foundation for subsequent cross-modal analysis. The workflow then executes cross-modal consistency checking 2404, examining how well information from different modalities aligns and complements each other by computing correlation measures between corresponding features across modalities, evaluating geometric registration accuracy between sensors with different viewpoints, assessing spectral-spatial consistency between modalities that capture overlapping wavelength ranges, and identifying potential conflicts or inconsistencies that might indicate fusion errors. This cross-modal analysis is crucial for detecting problems that might not be apparent when examining individual modalities in isolation, such as misalignment artifacts, temporal synchronization errors, or inappropriate weighting of modalities during fusion. Following consistency verification, the system proceeds to verify spectral plausibility 2406, ensuring that the reconstructed hyperspectral signatures conform to known physical principles and material properties. This verification includes checking that reflectance values fall within physically realistic ranges (typically 0-100%), confirming that spectral curves exhibit reasonable smoothness and continuity between adjacent bands, validating that material-specific absorption features appear at expected wavelengths, and ensuring that the reconstructed spectra are consistent with known spectral libraries for identified materials. Any violations of these physical constraints indicate potential reconstruction errors that require attention. The workflow then detects noise and fusion artifacts 2408, specifically targeting problems that arise from the multi-modal fusion process itself rather than from individual sensor limitations. This detection focuses on identifying fusion-induced spectral artifacts such as discontinuities or unrealistic spectral features that result from improper modality combination, spatial artifacts including edge effects, ghosting, or misregistration-induced distortions, temporal artifacts in video sequences such as flickering or inconsistent reconstruction across frames, and systematic biases that might be introduced by the fusion algorithm. These fusion-specific artifacts require specialized detection algorithms that understand the characteristics of multi-modal reconstruction processes. The workflow then branches to calculate quality metrics 2410 through two parallel paths that provide complementary perspectives on reconstruction quality. The reference-based path performs PSNR and SSIM analysis, computing Peak Signal-to-Noise Ratio and Structural Similarity Index measures that require access to ground truth hyperspectral data for comparison, providing quantitative measures of reconstruction accuracy when reference data is available. Simultaneously, the reference-free path conducts BRISQUE and NIQE analysis, employing Blind/Referenceless Image Spatial Quality Evaluator and Natural Image Quality Evaluator algorithms that assess image quality based on statistical properties and naturalness metrics without requiring ground truth data, making them applicable in operational scenarios where reference hyperspectral images are unavailable. Both metric calculation paths converge to generate an overall quality score 2412, where the various quality measures are combined using learned weighting schemes that account for the relative importance and reliability of different assessment approaches. This integration process considers the availability and reliability of reference data, the specific application requirements and quality tolerances, the confidence levels associated with each individual metric, and the historical performance of different quality measures in predicting user satisfaction or downstream application success. The combined quality score provides a comprehensive assessment that incorporates both objective measurements and perceptual quality indicators. Finally, the workflow evaluates whether the quality threshold is met, comparing the overall quality score against predetermined thresholds that are established based on application requirements, user expectations, and historical performance data. If the quality threshold is not met, indicating that the reconstruction does not meet acceptable standards, the system triggers reprocessing, returning to the beginning of the workflow with modified parameters, alternative fusion strategies, or different modality combinations in an attempt to achieve better results. This reprocessing loop ensures that substandard reconstructions are not accepted, maintaining high quality standards even if multiple processing iterations are required. If the quality threshold is met, demonstrating that the reconstruction achieves acceptable quality levels, the system accepts the final result, completing the quality assurance process and releasing the validated hyperspectral reconstruction for use in downstream applications. This comprehensive workflow ensures that only high-quality reconstructions that meet both objective quality criteria and subjective perceptual standards are accepted, while providing a systematic framework for identifying and addressing quality issues through iterative refinement when necessary.

Figure 25:
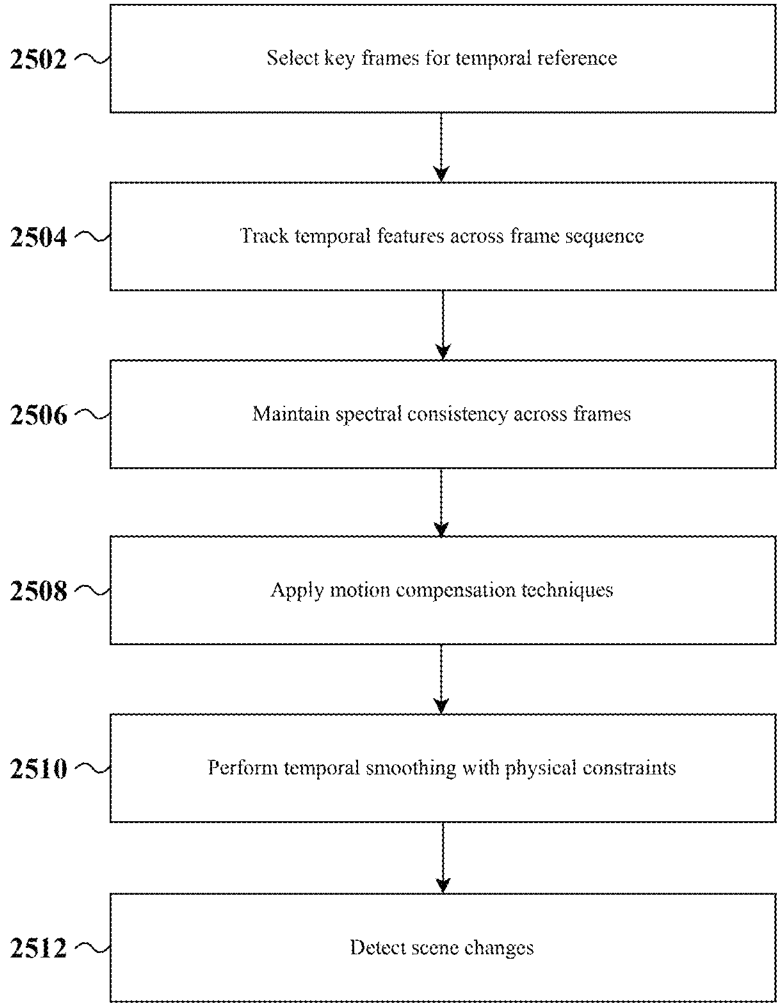
FIG. 25 is a flow diagram of a temporal integration method for video hyperspectral reconstruction, according to an embodiment.

FIG. 25 illustrates the temporal integration method for video hyperspectral reconstruction, a sophisticated workflow that extends static hyperspectral reconstruction techniques to video sequences by leveraging temporal coherence and continuity across frames while adapting to dynamic scene changes. The method begins by selecting key frames for temporal reference 2502, where the system analyzes the video sequence to identify frames that serve as stable temporal anchors based on criteria such as image quality, scene stability, motion characteristics, and spectral diversity. These key frames are chosen using algorithms that evaluate factors including sharpness metrics to avoid blurry frames, scene complexity measures to ensure representative content, temporal distribution to provide even coverage across the sequence, and spectral richness to maximize information content for subsequent reconstruction. Once key frames are established, the system proceeds to track temporal features across the frame sequence 2504, employing advanced computer vision techniques to follow distinctive features, objects, and regions through the video timeline. This tracking process utilizes optical flow algorithms to estimate pixel-level motion between consecutive frames, feature matching techniques to establish correspondences between frames that are temporally distant, Kalman filtering to predict and correct feature trajectories over time, and robust estimation methods to handle occlusions, appearance changes, and temporary feature disappearances. The tracked features provide a foundation for understanding how scene content evolves temporally, enabling more informed decisions about how to propagate and combine spectral information across frames. With temporal correspondences established, the method maintains spectral consistency across frames 2506, ensuring that the spectral signatures of materials and objects remain coherent throughout the video sequence while allowing for natural variations due to changing illumination or viewing angles. This consistency maintenance involves cross-frame spectral correlation analysis to identify and preserve stable spectral relationships, adaptive spectral signature propagation that accounts for gradual changes in appearance, temporal filtering of spectral noise while preserving genuine spectral variations, and validation against material property databases to ensure physical plausibility of spectral evolution. The system then applies motion compensation techniques 2508, correcting for camera movement, object motion, and geometric distortions that could otherwise compromise the temporal integration process. Motion compensation employs global motion estimation to account for camera movement through techniques such as homography estimation, local motion modeling to handle object movement and deformation using block-matching or optical flow methods, sub-pixel registration to achieve precise alignment between frames, and motion-adaptive processing that adjusts reconstruction parameters based on the magnitude and type of motion detected. Following motion compensation, the method performs temporal smoothing with physical constraints 2510, applying smoothing filters to reduce temporal noise and inconsistencies while enforcing physical laws that govern how spectral properties can change over time. This smoothing process incorporates knowledge of material properties to constrain allowable spectral variations, illumination models to account for natural lighting changes, physics-based constraints on reflectance and emissivity evolution, and adaptive smoothing kernels that vary their strength based on motion magnitude and scene dynamics. The system continuously monitors for scene changes through detection algorithms 2512 that identify significant alterations in scene content, such as cuts, fades, object appearance or disappearance, lighting changes, or camera perspective shifts. When scene changes are detected, the system adapts to the scene change, modifying its processing approach to handle the new conditions appropriately. This adaptation process includes a critical decision point about whether to reset the temporal context, which determines the scope of adaptation required. For major scene changes such as cuts to completely different scenes or dramatic lighting changes, the system resets the temporal context, returning to the key frame selection process to establish new temporal references and restart the integration process with parameters appropriate for the new scene content. For minor changes such as gradual lighting variations or small object movements, the system continues processing with adapted parameters that account for the detected changes while maintaining temporal continuity with previous frames. When no scene changes are detected, the system continues temporal fusion, proceeding with normal temporal integration that leverages the established temporal relationships and accumulated spectral information from previous frames. A continuous processing loop may check whether more frames remain to process, and if additional frames exist, the system returns to the temporal feature tracking step to continue processing the sequence, maintaining the established temporal context and accumulated knowledge. This iterative process continues until all frames in the video sequence have been processed, at which point the system completes video processing, finalizing the temporal integration and producing a complete hyperspectral video sequence with enhanced quality through temporal coherence. Throughout this workflow, the temporal integration method significantly improves reconstruction quality by leveraging information from multiple frames to reduce noise, fill in missing data, enhance spatial resolution, and maintain spectral consistency, while remaining robust to the dynamic nature of video content through adaptive processing strategies that respond appropriately to varying degrees of scene change.

Figure 26:
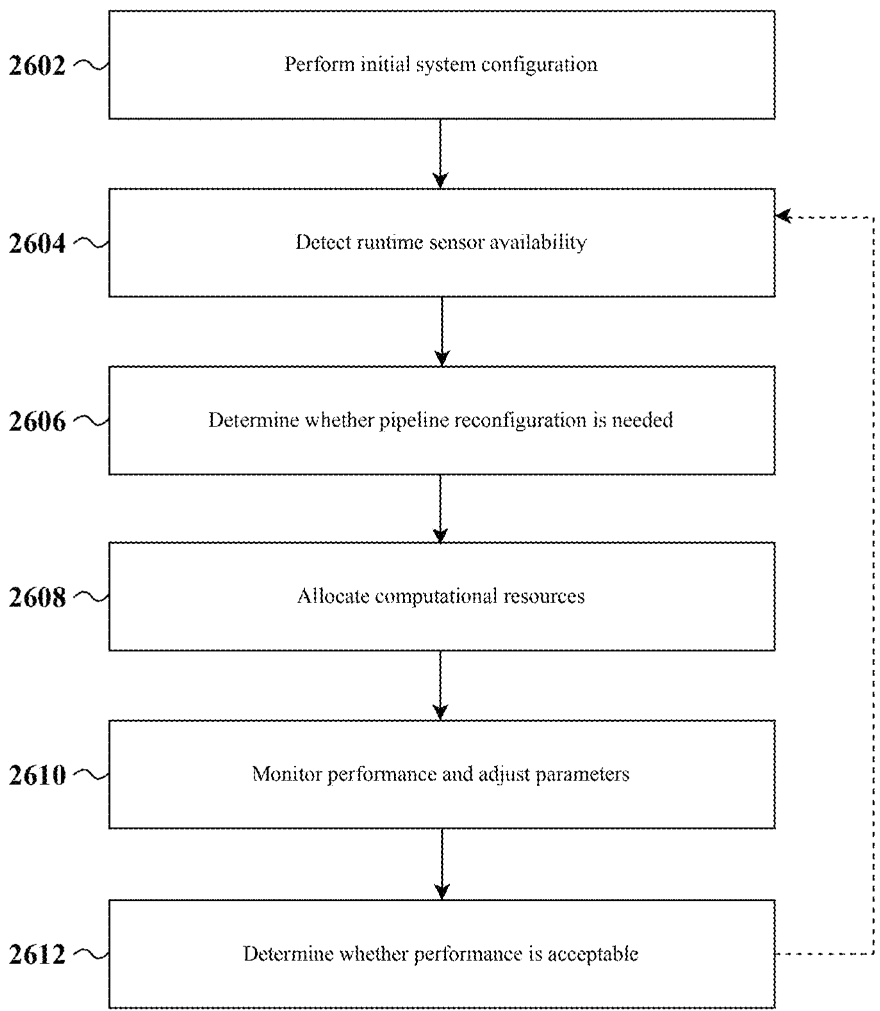
FIG. 26 is a flow diagram of a deployment and runtime adaptation method, according to an embodiment.

FIG. 26 illustrates the deployment and runtime adaptation Method, a comprehensive framework that ensures robust operation of the multi-modal hyperspectral reconstruction system through continuous monitoring, dynamic adaptation, and intelligent failure recovery mechanisms. The method begins with performing initial system configuration 2602, where the system establishes baseline operational parameters including sensor calibration settings, network architecture parameters, computational resource allocation strategies, quality thresholds for acceptable performance, and default processing pipeline configurations optimized for the expected operating environment. This initial configuration process includes hardware discovery to identify available sensors and computational resources, software initialization to load neural network models and processing algorithms, communication protocol establishment to ensure reliable data flow between system components, and validation testing to verify that all subsystems are functioning correctly before entering operational mode. Once configured, the system continuously detects runtime sensor availability 2604, employing automated monitoring algorithms that periodically query each sensor to verify operational status, assess data quality metrics such as signal-to-noise ratios and coverage completeness, detect hardware failures or connectivity issues, and evaluate environmental conditions that might affect sensor performance. This detection process utilizes health monitoring protocols that check sensor responsiveness, data integrity validation to ensure incoming sensor data meets quality standards, bandwidth and latency monitoring to verify communication performance, and predictive failure analysis that can anticipate potential sensor issues before they become critical. Based on the sensor availability assessment, the system determines whether pipeline reconfiguration is needed 2606, comparing the current sensor configuration against the optimal configuration for the present conditions. If reconfiguration is required due to sensor failures, environmental changes, or performance optimization opportunities, the system proceeds to reconfigure the pipeline, dynamically adjusting the processing workflow to optimize performance with the available sensors. This reconfiguration process involves modality weight adjustment to compensate for missing or degraded sensors, neural network parameter adaptation to account for changed input characteristics, processing pathway modification to bypass failed components or utilize alternative processing routes, and quality threshold adjustment to maintain acceptable output standards with reduced sensor inputs. If no reconfiguration is needed, the system uses the current configuration, maintaining existing processing parameters while continuing to monitor for changes that might necessitate future adjustments. Both configuration paths converge to allocate computational resources 2608, where the system dynamically distributes available processing power, memory, and bandwidth among different processing components based on current operational requirements, sensor data rates, quality targets, and real-time performance constraints. This resource allocation employs load balancing algorithms that distribute computational tasks across available processing units, priority management systems that ensure critical processing components receive adequate resources, dynamic scaling mechanisms that can adjust resource allocation based on changing workloads, and optimization algorithms that maximize overall system throughput while maintaining quality standards. The system then continuously monitors performance and adjusts parameters 2610, tracking key performance indicators including processing latency, reconstruction quality metrics, resource utilization levels, and error rates across all system components. This monitoring process employs real-time analytics to identify performance trends and anomalies, adaptive control algorithms that automatically adjust parameters to maintain optimal performance, predictive modeling to anticipate performance issues before they impact system operation, and logging mechanisms that record performance data for later analysis and system improvement. Following performance monitoring, the system evaluates whether performance is acceptable 2612 by comparing current metrics against established thresholds and quality standards. If performance is deemed acceptable, the system continues operation, maintaining current processing parameters while continuing the monitoring loop to detect any future changes in system performance or environmental conditions. However, if performance issues are detected, the system triggers recovery procedures, initiating a systematic failure analysis and response protocol. The recovery process begins with failure type analysis, which categorizes detected issues into hardware failures involving sensor malfunctions, communication breakdowns, or computational hardware problems, versus software failures including algorithm convergence issues, parameter drift, or configuration errors. For hardware failures, the system implements sensor failover procedures, automatically switching to backup sensors when available, adjusting processing algorithms to compensate for missing sensor inputs, recalibrating remaining sensors to maintain system accuracy, and notifying system administrators of hardware issues requiring attention. For software failures, the system performs parameter reset operations, restoring processing parameters to known good configurations, reinitializing neural network weights if necessary, clearing accumulated state that might be causing processing errors, and restarting affected software components to restore normal operation. Both recovery procedures loop back to the sensor availability detection phase to verify that the recovery actions have resolved the identified issues. Throughout normal operation, the system also continuously checks whether shutdown has been requested, monitoring for user commands, scheduled maintenance windows, emergency stop signals, or critical system failures that require immediate shutdown. If shutdown is requested, the system executes a graceful shutdown procedure that safely terminates all processing operations, saves current system state and accumulated learning parameters, closes sensor connections and releases computational resources, and generates final status reports documenting system performance during the operational session. If no shutdown is requested, the system continues the operational loop, returning to performance monitoring to maintain continuous surveillance of system health and performance. This comprehensive deployment and runtime adaptation framework ensures that the multi-modal hyperspectral reconstruction system operates reliably across varying conditions, automatically adapts to changing sensor availability and environmental factors, recovers gracefully from both hardware and software failures, and maintains high-quality reconstruction performance throughout extended operational periods while providing transparent reporting of system status and performance metrics to operators and downstream applications.

Figure 27:
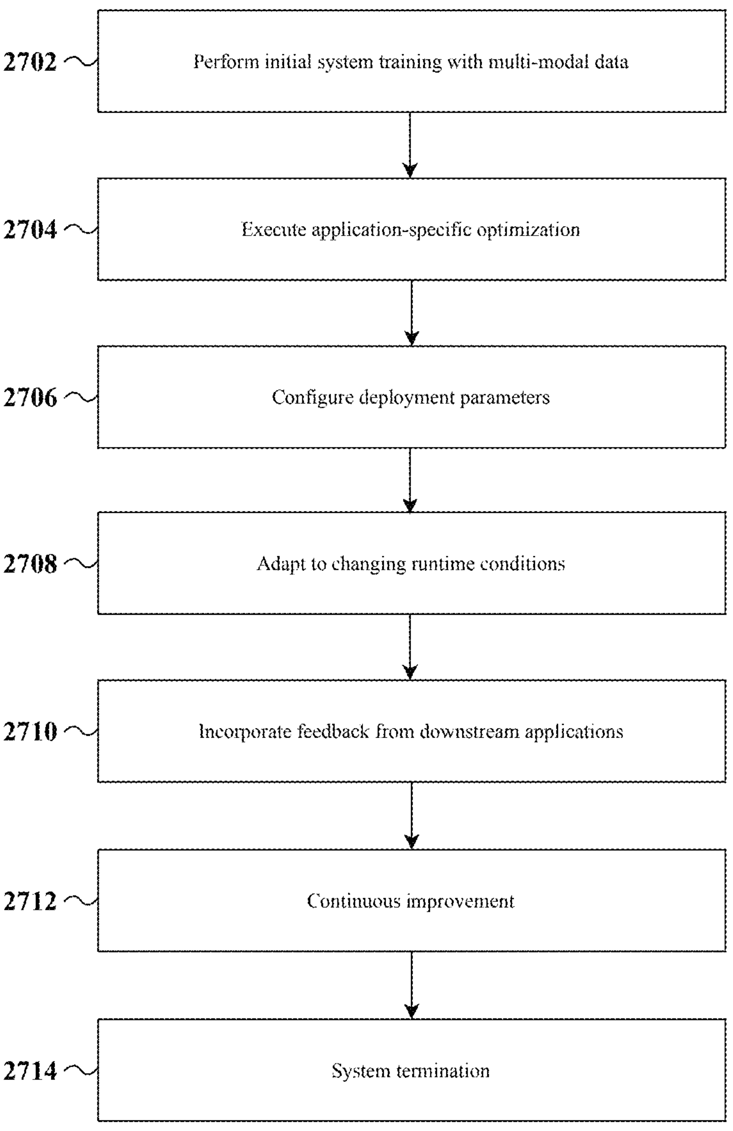
FIG. 27 is a flow diagram of an end-to-end application integration workflow, according to an embodiment.

FIG. 27 illustrates the end-to-end application integration workflow, a comprehensive lifecycle management system that guides the multi-modal hyperspectral reconstruction technology from initial development through continuous operational improvement in real-world applications. The workflow begins by performing initial system training with multi-modal data 2702, where the core neural networks are trained using diverse datasets that encompass the full range of expected sensor modalities, environmental conditions, and application scenarios. This training phase employs large-scale datasets containing synchronized RGB, LiDAR, thermal, and NIR data collected across various geographic locations, lighting conditions, weather patterns, and seasonal variations to ensure robust generalization capabilities. The training process utilizes advanced machine learning techniques including transfer learning from pre-trained models, multi-task learning to optimize for multiple application domains simultaneously, adversarial training to improve robustness against sensor noise and environmental variations, and progressive training strategies that gradually increase the complexity of reconstruction tasks. Following initial training, the system executes application-specific optimization 2704, where the general-purpose reconstruction models are fine-tuned and customized for specific application domains such as agriculture, medical imaging, remote sensing, or industrial quality assurance. This optimization process involves domain-specific data augmentation to enhance performance on target applications, specialized loss function design that emphasizes metrics most relevant to the specific use case, architecture modifications to optimize computational efficiency for deployment constraints, and validation using domain-specific benchmarks and quality metrics. The optimization phase also includes extensive collaboration with domain experts to ensure that the reconstructed hyperspectral data meets the specific requirements and quality standards expected by practitioners in each field. Once optimized, the system proceeds to configure deployment parameters 2706, establishing the operational settings that will govern system behavior in the target environment. This configuration process encompasses hardware resource allocation based on available computational capacity and performance requirements, sensor configuration protocols that specify how different modalities should be prioritized and combined, quality threshold establishment that defines acceptable reconstruction standards for the specific application, and integration interface setup that ensures seamless communication with downstream applications and user systems. The configuration phase also includes extensive testing in simulated deployment environments to validate system performance under realistic operational conditions. With deployment configuration complete, the system adapts to changing runtime conditions 2708, continuously monitoring and adjusting its behavior based on real-time feedback from performance metrics, environmental sensors, and system diagnostics. This adaptation process employs machine learning algorithms that can detect shifts in data distribution, environmental changes, or sensor degradation, automatically adjusting processing parameters to maintain optimal performance. The adaptation mechanisms include real-time performance monitoring that tracks reconstruction quality, processing latency, and resource utilization; environmental condition assessment that monitors factors such as lighting, weather, and electromagnetic interference; sensor health monitoring that detects degradation or failure in individual sensors; and predictive modeling that anticipates future performance issues and proactively adjusts system parameters. Throughout operation, the system incorporates feedback from downstream applications 2710, collecting performance data and user assessments from the applications that consume the reconstructed hyperspectral data. This feedback collection includes quantitative metrics such as classification accuracy for image analysis applications, detection rates for surveillance systems, diagnostic accuracy for medical applications, and yield prediction accuracy for agricultural systems. The feedback also encompasses qualitative assessments from human users regarding the visual quality, spectral fidelity, and practical utility of the reconstructed data for their specific tasks. This comprehensive feedback collection enables the system to understand how well the reconstruction serves real-world applications and identifies areas where improvements would have the greatest impact on end-user satisfaction and application performance. Based on accumulated performance data and user feedback, the system implements continuous improvement mechanisms 2712 through four distinct pathways that address different levels of system enhancement. For major performance issues or significant changes in application requirements, the system retrains models, returning to the initial training phase with updated datasets that incorporate new data types, environmental conditions, or application scenarios identified through operational experience. For moderate improvements in processing algorithms or reconstruction techniques, the system updates algorithms, implementing enhanced neural network architectures, improved fusion techniques, or advanced quality assessment methods while maintaining the existing trained model weights where possible. For fine-tuning performance characteristics or addressing specific operational issues, the system adjusts parameters, modifying processing thresholds, quality criteria, or resource allocation strategies based on observed performance patterns and user feedback. When system performance is satisfactory and no improvements are needed, the system continues operation, maintaining current configuration while continuing to monitor for changes that might require future adjustments. Each improvement pathway creates a feedback loop that returns to the appropriate stage in the workflow, ensuring that enhancements are properly integrated and validated before being deployed operationally. Throughout the continuous operation cycle, the system maintains vigilance for termination signals through regular evaluation of whether system termination is requested 2714, monitoring for user shutdown commands, scheduled maintenance windows, critical system failures, or end-of-lifecycle conditions. When termination is requested, the system executes a graceful shutdown procedure that safely concludes all processing operations, saves accumulated learning and performance data for future use, generates comprehensive operational reports documenting system performance and improvement recommendations, and releases all computational and hardware resources in an orderly manner. If no termination is requested, the system continues the operational cycle, returning to the runtime adaptation phase to maintain continuous monitoring and improvement capabilities. This end-to-end application integration workflow ensures that the multi-modal hyperspectral reconstruction system not only performs effectively in initial deployment but continuously evolves and improves its performance based on real-world operational experience, user feedback, and changing application requirements, ultimately providing a robust foundation for long-term deployment in diverse application environments while maintaining the highest standards of reconstruction quality and operational reliability.

Exemplary Computing Environment

Figure 11:
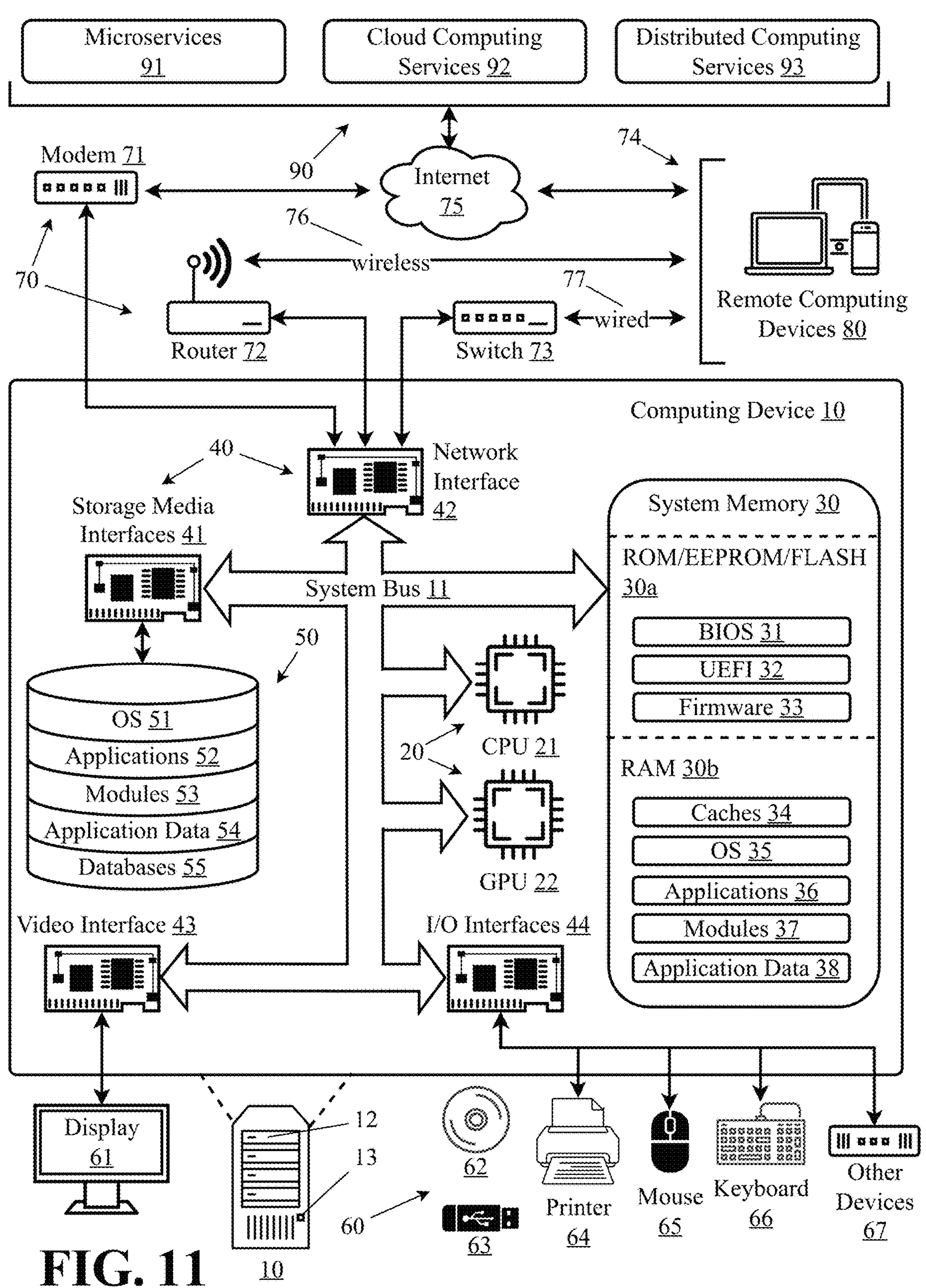
FIG. 11 illustrates an exemplary computing environment on which an embodiment described herein may be implemented, in full or in part.

FIG. 11 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed, or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed and includes memory types such as read only memory (ROM), electronically erasable programmable memory (EEPROM), and rewritable solid-state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containers or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

As can now be appreciated, disclosed embodiments provide effective techniques for generating hyperspectral images utilizing input RGB images that can be acquired from low-cost, readily available digital cameras. The hyperspectral images that are generated from disclosed embodiments can have a wide variety of applications and practical uses. These can include identifying various features in ariel photography images. The features can include, but are not limited to, healthy grass, stressed grass, synthetic grass, evergreen trees, deciduous trees, soil, water, roads, railways, crosswalks, cars, trains, and so on. Disclosed embodiments improve the technical field of hyperspectral image acquisition by enabling a decomposition network and a fine-tuning network operating in conjunction as part of a training and/or image analysis process.

The skilled person will be aware of a range of possible modifications of the various aspects described above. Accordingly, the present invention is defined by the claims and their equivalents.

What is claimed is:

1. A computer system for hyperspectral image generation with multi-modal quality assurance, comprising:

a hardware memory, wherein the computer system is configured to execute software instructions on nontransitory machine-readable storage media that:

identify a plurality of spectral bands in a training hyperspectral image;

compute a correlation coefficient of each spectral band of the plurality of spectral bands to at least one other spectral band of the plurality of spectral bands; and form a plurality of spectral domain groups based on the computed correlation coefficients;

obtain multi-modal sensor data comprising RGB, LiDAR, thermal, and NIR inputs;

perform cross-modal attention calculations between the multi-modal sensor data to determine feature relationships;

provide the multi-modal sensor data and a plurality of spectral domain groups to a first neural network, wherein the first neural network includes at least one convolutional block, at least one residual block, and cross-modal attention mechanisms;

obtain as an output of the first neural network, a reconstructed hyperspectral image, based on the multi-modal sensor data; and detect missing or corrupted data regions in the multi-modal sensor data and apply compensation strategies using information from other modalities;

analyze a spectral consistency of the reconstructed hyperspectral image;

perform cross-modal consistency evaluation between different sensor modalities;

evaluate a RGB reconstruction accuracy between original and reconstructed RGB images;

detect fusion artifacts specific to multi-modal processing;

analyze a plurality of noise characteristics in the reconstructed hyperspectral image and the reconstructed RGB image;

calculate reference-based and reference-free quality metrics;

generate a plurality of quality scores based on the spectral consistency, cross-modal consistency, RGB reconstruction accuracy, and noise characteristics;

compare the plurality of quality scores against a predetermined quality threshold; and update the first neural network based on the quality score comparisons.

2. The system of claim 1, further comprising a fine-tuning module comprising a third plurality of programming instructions that, when operating on the processor, cause the computing device to:

provide the reconstructed hyperspectral image to a second neural network, wherein the second neural network includes at least one convolutional block, and at least one residual block;

obtain as an output of the second neural network, a reconstructed RGB image;

compare the reconstructed RGB image to the RGB input image by computing a spectral similarity metric between the reconstructed RGB image and the RGB input image, wherein the spectral similarity metric is based on correlation coefficients between corresponding spectral bands of the images; and adjust one or more weights of the first neural network based on the computed spectral similarity metric to minimize spectral distortion between the reconstructed RGB image to the RGB input image.

3. The computer system of claim 1, wherein the at least one residual block of the first neural network comprises at least two convolutional layers.

4. The computer system of claim 2, wherein the first neural network further comprises an activation function.

5. The computer system of claim 4, wherein the activation function comprises a ReLU layer.

6. The computer system of claim 2, wherein the second neural network comprises a self-supervised network.

7. The computer system of claim 6, wherein a first convolutional layer from the at least two convolutional layers is configured to perform feature extraction.

8. The computer system of claim 6, wherein a second convolutional layer from the at least two convolutional layers is configured to perform feature map dimension reduction.

9. The computer system of claim 1, wherein the cross-modal attention mechanisms:

calculate attention weights between modalities using scaled dot-product attention;

enhance features from one modality using complementary information from other modalities;

apply confidence weighting based on sensor reliability for each modality; and generate unified feature representations that incorporate cross-modal information.

10. The computer system of claim 1, further comprising temporal fusion capabilities that:

select key frames for temporal reference in video sequences;

track temporal features across frame sequences;

maintain spectral consistency across frames;

apply motion compensation techniques; and perform temporal smoothing with physical constraints.

11. The computer system of claim 1, wherein the compensation strategies comprise:

cross-modal reconstruction for complete data loss using information from available modalities;

selective correction for partial corruption while preserving valid data;

noise filtering for degraded data quality; and calibration adjustment for systematic sensor errors.

12. The computer system of claim 1, further comprising multi-resolution processing capabilities that:

handle data from sensors with different spatial resolutions;

perform upsampling and downsampling operations between resolution levels;

align features across different resolution levels; and implement bidirectional information flow with coarse-to-fine and fine-to-coarse paths.

13. A computer-implemented method for hyperspectral image generation with multi-modal quality assurance, comprising steps of:

identifying a plurality of spectral bands in a training hyperspectral image;

computing a correlation coefficient of each spectral band of the plurality of spectral bands to at least one other spectral band of the plurality of spectral bands;

forming a plurality of spectral domain groups based on the computed correlation coefficients;

obtaining multi-modal sensor data comprising RGB, LiDAR, thermal, and NIR inputs;

performing cross-modal attention calculations between the multi-modal sensor data to determine feature relationships;

providing the multi-modal sensor data and plurality of spectral domain groups to a first neural network, wherein the first neural network includes at least one convolutional block, at least one residual block, and cross-modal attention mechanisms;

obtaining as an output of the first neural network, a reconstructed hyperspectral image, based on the multi-modal sensor data;

detecting missing or corrupted data regions in the multi-modal sensor data and applying compensation strategies using information from other modalities;

analyzing a spectral consistency of the reconstructed hyperspectral image;

performing cross-modal consistency evaluation between different sensor modalities;

evaluating a RGB reconstruction accuracy between original and reconstructed RGB images;

detect fusion artifacts specific to multi-modal processing;

analyzing a plurality of noise characteristics in the reconstructed hyperspectral image and the reconstructed RGB image;

calculating reference-based and reference-free quality metrics;

generating a plurality of quality scores based on the spectral consistency, cross-modal consistency, RGB reconstruction accuracy, and noise characteristics;

comparing the plurality of quality scores against a predetermined quality threshold; and updating the first neural network based on the quality score comparisons.

14. The computer-implemented method of claim 13, further comprising the steps of:

providing the reconstructed hyperspectral image to a second neural network, wherein the second neural network includes at least one convolutional block, and at least one residual block;

obtaining as an output of the second neural network, a reconstructed RGB image;

comparing the reconstructed RGB image to the RGB input image by computing a spectral similarity metric between the reconstructed RGB image and the RGB input image, wherein the spectral similarity metric is based on correlation coefficients between corresponding spectral bands of the images; and adjusting one or more weights of the first neural network based on the computed spectral similarity metric to minimize spectral distortion between the reconstructed RGB image to the RGB input image.

15. The computer-implemented method of claim 13, wherein the cross-modal attention mechanisms:

calculate attention weights between modalities using scaled dot-product attention;

enhance features from one modality using complementary information from other modalities;

apply confidence weighting based on sensor reliability for each modality; and generate unified feature representations that incorporate cross-modal information.

16. The computer-implemented method of claim 13, further comprising temporal fusion capabilities that:

select key frames for temporal reference in video sequences;

track temporal features across frame sequences;

maintain spectral consistency across frames;

apply motion compensation techniques; and perform temporal smoothing with physical constraints.

17. The computer-implemented method of claim 13, wherein the compensation strategies comprise:

cross-modal reconstruction for complete data loss using information from available modalities;

selective correction for partial corruption while preserving valid data;

noise filtering for degraded data quality; and calibration adjustment for systematic sensor errors.

18. The computer-implemented method of claim 13, further comprising multi-resolution processing capabilities that:

handle data from sensors with different spatial resolutions;

perform upsampling and downsampling operations between resolution levels;

align features across different resolution levels; and implement bidirectional information flow with coarse-to-fine and fine-to-coarse paths.

* * * * *